(12) United States Patent
Beaumier et al.

(10) Patent No.: US 10,228,897 B2
(45) Date of Patent: Mar. 12, 2019

(54) DIGITAL JUKEBOX DEVICE WITH IMPROVED USER INTERFACES, AND ASSOCIATED METHODS

(71) Applicant: TouchTunes Music Corporation, New York, NY (US)

(72) Inventors: Francois Beaumier, Montreal (CA); Remi Desmarais, Montreal (CA); Sebastien Hebert, Montreal (CA); Loic Gratton, Montreal (CA); Mounir Khenfir, Montreal (CA); Ed Rivera, New York, NY (US); Michael Tooker, Montreal (CA); Christian Pompidor, Montreal (CA)

(73) Assignee: TOUCHTUNES MUSIC CORPORATION, New York, NY (US)

( * ) Notice: Subject to any disclaimer, the term of this patent is extended or adjusted under 35 U.S.C. 154(b) by 89 days.

(21) Appl. No.: 14/729,392

(22) Filed: Jun. 3, 2015

(65) Prior Publication Data

US 2015/0268849 A1 Sep. 24, 2015

Related U.S. Application Data

(62) Division of application No. 12/929,466, filed on Jan. 26, 2011, now Pat. No. 9,521,375.

(Continued)

(51) Int. Cl.
*G06F 3/0484* (2013.01)
*G06F 3/16* (2006.01)
(Continued)

(52) U.S. Cl.
CPC ............ *G06F 3/165* (2013.01); *G06F 3/0481* (2013.01); *G06F 3/0482* (2013.01);
(Continued)

(58) Field of Classification Search
None
See application file for complete search history.

(56) References Cited

U.S. PATENT DOCUMENTS

| 3,807,541 A | 4/1974 | Kortenhaus |
| 3,982,620 A | 9/1976 | Kotenhaus |

(Continued)

FOREIGN PATENT DOCUMENTS

| AU | 199954012 | 4/2000 |
| CN | 1340939 | 3/2002 |

(Continued)

OTHER PUBLICATIONS

European Examination Report dated Aug. 17, 2016 in European Appln No. 12 075 107.8.

(Continued)

*Primary Examiner* — Tuan S Nguyen
(74) *Attorney, Agent, or Firm* — Nixon & Vanderhye, P.C.

(57) ABSTRACT

Certain exemplary embodiments relate to entertainment systems that interact with users to provide access to media appropriate to and/or customized for a particular user using the entertainment system, the location at which the entertainment system is being accessed, and/or a predefined event. For example, in certain exemplary embodiments, an entertainment system in a location is configured to provide jukebox-related and entertainment system mediated services that are accessible from within and from the outside of the location, and provide (1) attract or flight media operations, (2) browsing services, and/or (3) search screens appropriate to and/or customized for a particular user using the entertainment system, the location at which the entertainment system is being accessed, and/or a predefined event. Such (Continued)

screens may be provided with a three-dimensional look-and-feel in certain exemplary embodiments.

25 Claims, 27 Drawing Sheets

Related U.S. Application Data

(60) Provisional application No. 61/431,036, filed on Jan. 9, 2011, provisional application No. 61/298,509, filed on Jan. 26, 2010.

(51) Int. Cl.

| | | |
|---|---|---|
| *G07F 11/00* | (2006.01) | |
| *G07F 17/30* | (2006.01) | |
| *G11B 27/34* | (2006.01) | |
| *G06Q 30/02* | (2012.01) | |
| *G06Q 50/00* | (2012.01) | |
| *G11B 27/10* | (2006.01) | |
| *H05B 37/02* | (2006.01) | |
| *G06F 3/0488* | (2013.01) | |
| *H05B 33/08* | (2006.01) | |
| *H05B 33/10* | (2006.01) | |
| *G08B 13/196* | (2006.01) | |
| *H04N 7/18* | (2006.01) | |
| *H04N 21/239* | (2011.01) | |
| *H04N 21/422* | (2011.01) | |
| *H04N 21/4223* | (2011.01) | |
| *H04N 21/4788* | (2011.01) | |
| *G06F 3/0481* | (2013.01) | |
| *G06F 3/0482* | (2013.01) | |
| *G06F 3/0485* | (2013.01) | |

(52) U.S. Cl.
CPC .......... *G06F 3/0485* (2013.01); *G06F 3/0488* (2013.01); *G06F 3/04847* (2013.01); *G06Q 30/02* (2013.01); *G06Q 50/01* (2013.01); *G07F 11/002* (2013.01); *G07F 17/305* (2013.01); *G08B 13/19632* (2013.01); *G11B 27/105* (2013.01); *G11B 27/34* (2013.01); *H04N 7/183* (2013.01); *H04N 21/239* (2013.01); *H04N 21/4223* (2013.01); *H04N 21/42203* (2013.01); *H04N 21/4788* (2013.01); *H05B 33/0854* (2013.01); *H05B 33/0863* (2013.01); *H05B 33/10* (2013.01); *H05B 37/029* (2013.01); *G06F 3/04883* (2013.01); *G11B 2220/41* (2013.01); *Y10T 29/49005* (2015.01)

(56) References Cited

U.S. PATENT DOCUMENTS

| | | |
|---|---|---|
| 4,008,369 A | 2/1977 | Theurer et al. |
| 4,186,438 A | 1/1980 | Benson |
| 4,232,295 A | 11/1980 | McConnell |
| 4,335,809 A | 6/1982 | Wain |
| 4,335,908 A | 6/1982 | Burge |
| 4,336,935 A | 6/1982 | Goldfarb |
| 4,356,509 A | 10/1982 | Skerlos et al. |
| 4,369,442 A | 1/1983 | Werth et al. |
| 4,375,287 A | 3/1983 | Smith |
| 4,412,292 A | 10/1983 | Sedam |
| 4,413,260 A | 11/1983 | Siegel et al. |
| 4,521,014 A | 6/1985 | Sitrick |
| 4,528,643 A | 7/1985 | Freeny |
| 4,558,413 A | 12/1985 | Schmidt et al. |
| 4,572,509 A | 2/1986 | Sitrick |
| 4,577,333 A | 3/1986 | Lewis et al. |
| 4,582,324 A | 4/1986 | Koza |
| 4,588,187 A | 5/1986 | Dell |
| 4,593,904 A | 6/1986 | Graves |
| 4,597,058 A | 6/1986 | Izumi |
| 4,636,951 A | 1/1987 | Harlick |
| 4,652,998 A | 3/1987 | Koza |
| 4,654,799 A | 3/1987 | Ogaki |
| 4,658,093 A | 4/1987 | Hellman |
| 4,667,802 A | 5/1987 | Verduin et al. |
| 4,674,055 A | 6/1987 | Ogaki et al. |
| 4,675,538 A | 6/1987 | Epstein |
| 4,677,311 A | 6/1987 | Morita |
| 4,677,565 A | 6/1987 | Ogaki |
| 4,703,465 A | 10/1987 | Parker |
| 4,704,725 A | 11/1987 | Harvey et al. |
| 4,707,804 A | 11/1987 | Leal |
| 4,722,053 A | 1/1988 | Dubno |
| 4,761,684 A | 8/1988 | Clark |
| 4,766,581 A | 8/1988 | Korn et al. |
| 4,787,050 A | 11/1988 | Suzuki |
| 4,792,849 A | 12/1988 | McCalley |
| 4,807,052 A | 2/1989 | Amano |
| 4,811,325 A | 3/1989 | Sharples |
| 4,814,972 A | 3/1989 | Winter et al. |
| 4,825,054 A | 4/1989 | Rust |
| 4,829,570 A | 5/1989 | Schotz |
| 4,852,154 A | 7/1989 | Lewis et al. |
| 4,857,714 A | 8/1989 | Sunyich |
| 4,868,832 A | 9/1989 | Marrington |
| 4,885,694 A | 12/1989 | Pray et al. |
| 4,905,279 A | 2/1990 | Nishio |
| 4,920,432 A | 4/1990 | Eggers |
| 4,922,420 A | 5/1990 | Nakagawa |
| 4,924,378 A | 5/1990 | Hershey |
| 4,926,485 A | 5/1990 | Yamashita |
| 4,937,807 A | 6/1990 | Weitz |
| 4,949,187 A | 8/1990 | Cohen |
| 4,953,159 A | 8/1990 | Hayden et al. |
| 4,956,768 A | 9/1990 | Sidi |
| 4,958,835 A | 9/1990 | Tashiro |
| 4,965,675 A | 10/1990 | Masashi et al. |
| 4,977,593 A | 12/1990 | Ballance |
| 4,999,806 A | 3/1991 | Chernow |
| 5,008,814 A | 4/1991 | Mathur |
| 5,012,121 A | 4/1991 | Hammond |
| 5,027,426 A | 6/1991 | Chiocca |
| 5,041,921 A | 8/1991 | Scheffler |
| 5,046,093 A | 9/1991 | Wachob |
| 5,053,758 A | 10/1991 | Cornett et al. |
| 5,058,089 A | 10/1991 | Yoshimara |
| 5,077,607 A | 12/1991 | Johnson et al. |
| 5,081,534 A | 1/1992 | Geiger et al. |
| 5,101,451 A | 3/1992 | Ash et al. |
| 5,101,499 A | 3/1992 | Streck et al. |
| 5,106,097 A | 4/1992 | Levine |
| 5,117,407 A | 5/1992 | Vogel |
| 5,128,862 A | 7/1992 | Mueller |
| 5,138,712 A | 8/1992 | Corbin |
| 5,148,159 A | 9/1992 | Clark et al. |
| 5,155,847 A | 10/1992 | Kirouac |
| 5,159,678 A | 10/1992 | Wengelski et al. |
| 5,163,131 A | 11/1992 | Row |
| 5,166,886 A | 11/1992 | Molnar |
| 5,172,413 A | 12/1992 | Bradley et al. |
| 5,180,309 A | 1/1993 | Egnor |
| 5,189,630 A | 2/1993 | Barstow et al. |
| 5,191,573 A | 3/1993 | Hair |
| 5,191,611 A | 3/1993 | Lang |
| 5,192,999 A | 3/1993 | Graczyk |
| 5,197,094 A | 3/1993 | Tillery |
| 5,203,028 A | 4/1993 | Shiraishi |
| 5,210,854 A | 5/1993 | Beaverton et al. |
| 5,214,761 A | 5/1993 | Barrett et al. |
| 5,222,134 A | 6/1993 | Waite et al. |
| 5,228,015 A | 7/1993 | Arbiter et al. |
| 5,231,157 A | 7/1993 | Herzig et al. |
| 5,237,157 A | 8/1993 | Kaplan |
| 5,237,322 A | 8/1993 | Heberle |
| 5,239,480 A | 8/1993 | Huegel |

(56) References Cited

U.S. PATENT DOCUMENTS

| | | |
|---|---|---|
| 5,250,747 A | 10/1993 | Tsumura |
| 5,252,775 A | 10/1993 | Urano |
| 5,260,999 A | 11/1993 | Wyman |
| 5,261,104 A | 11/1993 | Bertram et al. |
| 5,262,875 A | 11/1993 | Mincer et al. |
| 5,276,866 A | 1/1994 | Paolini |
| 5,278,904 A | 1/1994 | Servi |
| 5,282,028 A | 1/1994 | Johnson et al. |
| 5,289,476 A | 2/1994 | Johnson et al. |
| 5,289,546 A | 2/1994 | Hetherington |
| 5,315,161 A | 5/1994 | Robinson |
| 5,315,711 A | 5/1994 | Barone et al. |
| 5,319,455 A | 6/1994 | Hoarty et al. |
| 5,321,846 A | 6/1994 | Yokota et al. |
| 5,327,230 A | 7/1994 | Dockery |
| 5,335,313 A | 8/1994 | Douglas |
| 5,339,095 A | 8/1994 | Redford |
| 5,339,413 A | 8/1994 | Koval |
| 5,341,350 A | 8/1994 | Frank |
| 5,355,302 A | 10/1994 | Martin et al. |
| 5,357,276 A | 10/1994 | Banker |
| 5,369,778 A | 11/1994 | SanSoucie |
| 5,375,206 A | 12/1994 | Hunter |
| 5,386,251 A | 1/1995 | Movshovich |
| 5,389,950 A | 2/1995 | Martin et al. |
| 5,404,505 A | 4/1995 | Levinson |
| 5,406,634 A | 4/1995 | Anderson et al. |
| 5,408,417 A | 4/1995 | Wilder |
| 5,410,326 A | 4/1995 | Goldstein |
| 5,410,703 A | 4/1995 | Nilsson et al. |
| 5,418,713 A | 5/1995 | Allen |
| 5,420,923 A | 5/1995 | Beyers |
| 5,428,252 A | 6/1995 | Walker |
| 5,428,606 A | 6/1995 | Moskowitz |
| 5,431,492 A | 7/1995 | Rothschild |
| 5,440,632 A | 8/1995 | Bacon et al. |
| 5,444,499 A | 8/1995 | Saitoh |
| 5,445,295 A | 8/1995 | Brown |
| 5,455,619 A | 10/1995 | Truckenmiller et al. |
| 5,455,926 A | 10/1995 | Keele |
| 5,457,305 A | 10/1995 | Akel |
| 5,465,213 A | 11/1995 | Ross |
| 5,465,329 A | 11/1995 | Whistler |
| 5,467,326 A | 11/1995 | Miyashita et al. |
| 5,469,370 A | 11/1995 | Ostrover et al. |
| 5,469,573 A | 11/1995 | McGill et al. |
| 5,471,576 A | 11/1995 | Yee |
| 5,473,746 A | 12/1995 | Pritt et al. |
| 5,475,835 A | 12/1995 | Hickey |
| 5,481,509 A | 1/1996 | Knowles |
| 5,487,167 A | 1/1996 | Dinallo et al. |
| 5,489,103 A | 2/1996 | Okamoto |
| 5,495,610 A | 2/1996 | Shing |
| 5,496,178 A | 3/1996 | Back |
| 5,499,921 A | 3/1996 | Sone |
| 5,511,000 A | 4/1996 | Kaloi |
| 5,513,117 A | 4/1996 | Small |
| 5,515,173 A | 5/1996 | Mankovitz et al. |
| 5,519,435 A | 5/1996 | Anderson |
| 5,519,457 A | 5/1996 | Nishigaki et al. |
| 5,521,631 A | 5/1996 | Budow et al. |
| 5,521,918 A | 5/1996 | Kim |
| 5,521,922 A | 5/1996 | Fujinami et al. |
| 5,523,781 A | 6/1996 | Brusaw |
| 5,528,732 A | 6/1996 | Klotz |
| 5,532,734 A | 7/1996 | Goertz |
| 5,532,991 A | 7/1996 | Sasaki |
| 5,546,039 A | 8/1996 | Hewitt et al. |
| 5,548,729 A | 8/1996 | Akiyoshi |
| 5,550,577 A | 8/1996 | Verbiest |
| 5,554,968 A | 9/1996 | Lee |
| 5,555,244 A | 9/1996 | Gupta |
| 5,557,515 A | 9/1996 | Abbruzzese et al. |
| 5,557,541 A | 9/1996 | Schulhof |
| 5,557,724 A | 9/1996 | Sampat et al. |
| 5,559,505 A | 9/1996 | McNair |
| 5,559,549 A | 9/1996 | Hendricks |
| 5,559,714 A | 9/1996 | Banks et al. |
| 5,561,709 A | 10/1996 | Remillard |
| 5,565,908 A | 10/1996 | Ahmad |
| 5,566,237 A | 10/1996 | Dobbs |
| 5,570,363 A | 10/1996 | Holm |
| 5,578,999 A | 11/1996 | Matsuzawa et al. |
| 5,579,404 A | 11/1996 | Fielder et al. |
| 5,583,561 A | 12/1996 | Baker et al. |
| 5,583,937 A | 12/1996 | Ullrich et al. |
| 5,583,994 A | 12/1996 | Rangan |
| 5,583,995 A | 12/1996 | Gardner et al. |
| 5,592,482 A | 1/1997 | Abraham |
| 5,592,551 A | 1/1997 | Lett |
| 5,592,611 A | 1/1997 | Midgely et al. |
| 5,594,509 A | 1/1997 | Florin |
| 5,596,702 A | 1/1997 | Stucka et al. |
| 5,607,099 A | 3/1997 | Yeh et al. |
| 5,612,581 A | 3/1997 | Kageyama |
| 5,613,909 A | 3/1997 | Stelovsky |
| 5,616,876 A | 4/1997 | Cluts |
| 5,617,565 A | 4/1997 | Augenbraun et al. |
| 5,619,247 A | 4/1997 | Russo |
| 5,619,249 A | 4/1997 | Billock et al. |
| 5,619,250 A | 4/1997 | McClellan et al. |
| 5,619,698 A | 4/1997 | Lillich |
| 5,623,666 A | 4/1997 | Pike |
| 5,631,693 A | 5/1997 | Wunderlich et al. |
| 5,636,276 A | 6/1997 | Brugger |
| 5,638,426 A | 6/1997 | Lewis |
| 5,642,337 A | 6/1997 | Oskay |
| 5,643,831 A | 7/1997 | Ochiai et al. |
| 5,644,714 A | 7/1997 | Kikinis |
| 5,644,766 A | 7/1997 | Coy |
| 5,654,714 A | 8/1997 | Takahashi et al. |
| 5,659,466 A | 8/1997 | Norris et al. |
| 5,661,517 A | 8/1997 | Budow et al. |
| 5,661,802 A | 8/1997 | Nilssen |
| 5,663,756 A | 9/1997 | Blahut et al. |
| 5,668,592 A | 9/1997 | Spaulding |
| 5,668,778 A | 9/1997 | Quazi |
| 5,668,788 A | 9/1997 | Allison |
| 5,675,734 A | 10/1997 | Hair |
| 5,680,533 A | 10/1997 | Yamato et al. |
| 5,684,716 A | 11/1997 | Freeman |
| 5,689,641 A | 11/1997 | Ludwig et al. |
| 5,691,778 A | 11/1997 | Song |
| 5,691,964 A | 11/1997 | Niederlein et al. |
| 5,696,914 A | 12/1997 | Nahaboo et al. |
| 5,697,844 A | 12/1997 | Von Kohorn |
| 5,703,795 A | 12/1997 | Mankowitz |
| 5,708,811 A | 1/1998 | Arendt |
| 5,712,976 A | 1/1998 | Falcon et al. |
| 5,713,024 A | 1/1998 | Halladay |
| 5,715,416 A | 2/1998 | Baker |
| 5,717,452 A | 2/1998 | Janin et al. |
| 5,721,583 A | 2/1998 | Harada et al. |
| 5,721,815 A | 2/1998 | Ottesen et al. |
| 5,721,827 A | 2/1998 | Logan et al. |
| 5,721,829 A | 2/1998 | Dunn et al. |
| 5,724,525 A | 3/1998 | Beyers et al. |
| 5,726,909 A | 3/1998 | Krikorian |
| 5,734,719 A | 3/1998 | Tsevdos et al. |
| 5,734,961 A | 3/1998 | Castille |
| 5,739,451 A | 4/1998 | Winksy et al. |
| 5,743,745 A | 4/1998 | Reintjes |
| 5,745,391 A | 4/1998 | Topor |
| 5,748,254 A | 5/1998 | Harrison et al. |
| 5,748,468 A | 5/1998 | Notenboom et al. |
| 5,748,954 A | 5/1998 | Mauldin |
| 5,751,336 A | 5/1998 | Aggarwal et al. |
| 5,752,232 A | 5/1998 | Basore et al. |
| 5,757,936 A | 5/1998 | Lee |
| 5,758,340 A | 5/1998 | Nail |
| 5,761,655 A | 6/1998 | Hoffman |
| 5,762,552 A | 6/1998 | Vuong |
| 5,774,527 A | 6/1998 | Handelman et al. |
| 5,774,668 A | 6/1998 | Choqiuer |

(56) References Cited

U.S. PATENT DOCUMENTS

| | | |
|---|---|---|
| 5,774,672 A | 6/1998 | Funahashi |
| 5,778,395 A | 7/1998 | Whiting |
| 5,781,889 A | 7/1998 | Martin et al. |
| 5,786,784 A | 7/1998 | Gaudichon |
| 5,790,172 A | 8/1998 | Imanaka |
| 5,790,671 A | 8/1998 | Cooper |
| 5,790,856 A | 8/1998 | Lillich |
| 5,790,935 A | 8/1998 | Payton |
| 5,793,364 A | 8/1998 | Bolanos et al. |
| 5,793,980 A | 8/1998 | Glaser |
| 5,798,785 A | 8/1998 | Hendricks |
| 5,802,283 A | 9/1998 | Grady et al. |
| 5,802,558 A | 9/1998 | Pierce |
| 5,802,599 A | 9/1998 | Cabrera |
| 5,805,804 A | 9/1998 | Laursen et al. |
| 5,808,224 A | 9/1998 | Kato |
| 5,809,246 A | 9/1998 | Goldman |
| 5,812,643 A | 9/1998 | Schelberg et al. |
| 5,815,146 A | 9/1998 | Youden et al. |
| 5,825,884 A | 10/1998 | Zdepski et al. |
| 5,828,343 A | 10/1998 | MacDonald et al. |
| 5,831,555 A | 11/1998 | Yu et al. |
| 5,831,663 A | 11/1998 | Waterhouse et al. |
| 5,832,024 A | 11/1998 | Schotz et al. |
| 5,832,287 A | 11/1998 | Atalla |
| 5,835,843 A | 11/1998 | Haddad |
| 5,842,869 A | 12/1998 | McGregor et al. |
| 5,845,104 A | 12/1998 | Rao |
| 5,845,256 A | 12/1998 | Pescitelli et al. |
| 5,848,398 A | 12/1998 | Martin |
| 5,851,149 A | 12/1998 | Xidos et al. |
| 5,854,887 A | 12/1998 | Kindell |
| 5,857,020 A | 1/1999 | Peterson |
| 5,857,707 A | 1/1999 | Devlin |
| 5,862,324 A | 1/1999 | Collins |
| 5,864,811 A | 1/1999 | Tran et al. |
| 5,864,868 A | 1/1999 | Contois |
| 5,864,870 A | 1/1999 | Guck |
| 5,867,714 A | 2/1999 | Todd |
| 5,870,721 A | 2/1999 | Norris |
| 5,880,386 A | 3/1999 | Wachi et al. |
| 5,880,769 A | 3/1999 | Nemirofsky et al. |
| 5,884,028 A | 3/1999 | Kindell |
| 5,884,298 A | 3/1999 | Smith, II |
| 5,887,139 A | 3/1999 | Madison, Jr. et al. |
| 5,887,193 A | 3/1999 | Takahashi |
| 5,893,162 A | 4/1999 | Lau et al. |
| 5,895,455 A | 4/1999 | Bellinger et al. |
| 5,896,094 A | 4/1999 | Narisada et al. |
| 5,903,266 A | 5/1999 | Berstis et al. |
| 5,913,040 A | 6/1999 | Rakavy |
| 5,914,712 A | 6/1999 | Sartain et al. |
| 5,915,094 A | 6/1999 | Kouloheris |
| 5,915,238 A | 6/1999 | Tjaden |
| 5,917,537 A | 6/1999 | Lightfoot |
| 5,917,835 A | 6/1999 | Barrett |
| 5,918,213 A | 6/1999 | Bernard et al. |
| 5,920,700 A | 7/1999 | Gordon et al. |
| 5,920,702 A | 7/1999 | Johnson |
| 5,923,885 A | 7/1999 | Johnson |
| 5,926,531 A | 7/1999 | Petite |
| 5,926,624 A | 7/1999 | Katz et al. |
| 5,930,765 A | 7/1999 | Martin |
| 5,931,908 A | 8/1999 | Gerba |
| 5,933,090 A | 8/1999 | Christenson |
| 5,940,504 A | 8/1999 | Griswold |
| 5,949,411 A | 9/1999 | Doerr et al. |
| 5,949,688 A | 9/1999 | Montoya |
| 5,953,429 A | 9/1999 | Wakai et al. |
| 5,956,716 A | 9/1999 | Kenner et al. |
| 5,959,869 A | 9/1999 | Miller |
| 5,959,945 A | 9/1999 | Kleiman |
| 5,960,167 A | 9/1999 | Roberts et al. |
| 5,963,916 A | 10/1999 | Kaplan |
| 5,966,495 A | 10/1999 | Takahashi |
| 5,970,467 A | 10/1999 | Alavi |
| 5,978,855 A | 11/1999 | Metz et al. |
| 5,978,912 A | 11/1999 | Rakavy et al. |
| 5,980,261 A | 11/1999 | Mino et al. |
| 5,999,499 A | 12/1999 | Pines et al. |
| 5,999,624 A | 12/1999 | Hopkins |
| 6,002,720 A | 12/1999 | Yurt |
| 6,005,599 A | 12/1999 | Asai et al. |
| 6,008,735 A | 12/1999 | Chiloyan et al. |
| 6,009,274 A | 12/1999 | Fletcher |
| 6,011,758 A | 1/2000 | Dockes et al. |
| 6,018,337 A | 1/2000 | Peters |
| 6,018,726 A | 1/2000 | Tsumura |
| 6,021,386 A | 2/2000 | Davis |
| 6,023,705 A | 2/2000 | Bellinger et al. |
| 6,025,868 A | 2/2000 | Russo |
| 6,034,925 A | 3/2000 | Wehmeyer |
| 6,038,591 A | 3/2000 | Wolfe et al. |
| 6,040,829 A | 3/2000 | Croy et al. |
| 6,041,354 A | 3/2000 | Biliris et al. |
| 6,049,891 A | 4/2000 | Inamoto |
| 6,054,987 A | 4/2000 | Richardson |
| 6,055,573 A | 4/2000 | Gardenswartz et al. |
| 6,057,874 A | 5/2000 | Michaud |
| 6,069,672 A | 5/2000 | Claassen |
| 6,072,982 A | 6/2000 | Haddad |
| 6,107,937 A | 8/2000 | Hamada |
| 6,118,450 A | 9/2000 | Proehl |
| 6,124,804 A | 9/2000 | Kitao et al. |
| 6,131,088 A | 10/2000 | Hill |
| 6,131,121 A | 10/2000 | Mattaway et al. |
| 6,134,547 A | 10/2000 | Huxley et al. |
| 6,138,150 A | 10/2000 | Nichols et al. |
| 6,148,142 A | 11/2000 | Anderson |
| 6,151,077 A | 11/2000 | Vogel et al. |
| 6,151,634 A | 11/2000 | Glaser |
| 6,154,207 A | 11/2000 | Farris et al. |
| 6,157,935 A | 12/2000 | Tran et al. |
| 6,161,059 A | 12/2000 | Tedesco et al. |
| 6,170,060 B1 | 1/2001 | Mott et al. |
| 6,173,172 B1 | 1/2001 | Masuda et al. |
| 6,175,861 B1 | 1/2001 | Williams, Jr. et al. |
| 6,182,126 B1 | 1/2001 | Nathan et al. |
| 6,185,184 B1 | 2/2001 | Mattaway et al. |
| 6,185,619 B1 | 2/2001 | Joffe et al. |
| 6,191,780 B1 | 2/2001 | Martin et al. |
| 6,192,340 B1 | 2/2001 | Abecassis |
| 6,195,732 B1 | 2/2001 | Adams et al. |
| 6,198,408 B1 | 3/2001 | Cohen |
| 6,202,060 B1 | 3/2001 | Tran |
| 6,209,060 B1 | 3/2001 | Machida |
| 6,212,138 B1 | 4/2001 | Kalis et al. |
| 6,216,175 B1 | 4/2001 | Sliger et al. |
| 6,216,227 B1 | 4/2001 | Goldstein et al. |
| 6,219,692 B1 | 4/2001 | Stiles |
| 6,223,209 B1 | 4/2001 | Watson |
| 6,226,412 B1 | 5/2001 | Schwab |
| 6,226,715 B1 | 5/2001 | Van Der Wolf et al. |
| 6,240,550 B1 | 5/2001 | Nathan et al. |
| 6,243,725 B1 | 6/2001 | Hempleman et al. |
| 6,247,022 B1 | 6/2001 | Yankowski |
| 6,256,773 B1 | 7/2001 | Bowman-Amuah |
| 6,262,569 B1 | 7/2001 | Carr et al. |
| 6,280,327 B1 | 8/2001 | Leifer et al. |
| 6,282,709 B1 | 8/2001 | Reha et al. |
| 6,288,688 B1 | 9/2001 | Hughes et al. |
| 6,288,991 B1 | 9/2001 | Kajiyama et al. |
| 6,289,382 B1 | 9/2001 | Bowman-Amuah |
| 6,292,443 B1 | 9/2001 | Awazu et al. |
| 6,298,373 B1 | 10/2001 | Burns et al. |
| 6,301,710 B1 | 10/2001 | Fujiwara |
| 6,302,793 B1 | 10/2001 | Fertitta et al. |
| 6,308,204 B1 | 10/2001 | Nathan et al. |
| 6,311,214 B1 | 10/2001 | Rhoads |
| 6,315,572 B1 | 11/2001 | Glaser |
| 6,323,911 B1 | 11/2001 | Schein et al. |
| 6,332,025 B2 | 12/2001 | Takahashi et al. |
| 6,336,219 B1 | 1/2002 | Nathan |
| 6,341,166 B1 | 1/2002 | Basel |

(56) References Cited

U.S. PATENT DOCUMENTS

| | | |
|---|---|---|
| 6,344,862 B1 | 2/2002 | Williams et al. |
| 6,346,951 B1 | 2/2002 | Mastronardi |
| 6,353,820 B1 | 3/2002 | Edwards et al. |
| 6,356,971 B1 | 3/2002 | Katz et al. |
| 6,359,616 B1 | 3/2002 | Ogura et al. |
| 6,359,661 B1 | 3/2002 | Nickum |
| 6,370,580 B2 | 4/2002 | Kriegsman |
| 6,381,575 B1 | 4/2002 | Martin et al. |
| 6,384,737 B1 | 5/2002 | Hsu et al. |
| 6,393,584 B1 | 5/2002 | McLaren et al. |
| 6,396,480 B1 | 5/2002 | Schindler et al. |
| 6,397,189 B1 | 5/2002 | Martin et al. |
| 6,407,987 B1 | 6/2002 | Abraham |
| 6,408,435 B1 | 6/2002 | Sato |
| 6,408,437 B1 | 6/2002 | Hendricks et al. |
| 6,421,651 B1 | 7/2002 | Tedesco et al. |
| 6,425,125 B1 | 7/2002 | Fries et al. |
| 6,430,537 B1 | 8/2002 | Tedesco et al. |
| 6,430,738 B1 | 8/2002 | Gross et al. |
| 6,434,678 B1 | 8/2002 | Menzel |
| 6,438,450 B1 | 8/2002 | DiLorenzo |
| 6,442,549 B1 | 8/2002 | Schneider |
| 6,446,080 B1 | 9/2002 | Van Ryzin et al. |
| 6,446,130 B1 | 9/2002 | Grapes |
| 6,449,688 B1 | 9/2002 | Peters et al. |
| 6,470,496 B1 | 10/2002 | Kato et al. |
| 6,473,794 B1 | 10/2002 | Guheen et al. |
| 6,488,508 B2 | 12/2002 | Okamoto |
| 6,490,570 B1 | 12/2002 | Numaoka |
| 6,493,871 B1 | 12/2002 | McGuire et al. |
| 6,496,927 B1 | 12/2002 | McGrane et al. |
| 6,498,855 B1 | 12/2002 | Kokkosoulis et al. |
| 6,522,707 B1 | 2/2003 | Brandstetter et al. |
| 6,535,911 B1 | 3/2003 | Miller et al. |
| 6,538,558 B2 | 3/2003 | Sakazume et al. |
| 6,543,052 B1 | 4/2003 | Ogasawara |
| 6,544,122 B2 | 4/2003 | Araki et al. |
| 6,549,719 B2 | 4/2003 | Mankovitz |
| D475,029 S | 5/2003 | Nathan et al. |
| 6,560,651 B2 | 5/2003 | Katz et al. |
| 6,570,507 B1 | 5/2003 | Lee et al. |
| 6,571,282 B1 | 5/2003 | Bowman-Amuah |
| 6,577,735 B1 | 6/2003 | Bharat |
| 6,578,051 B1 | 6/2003 | Mastronardi |
| 6,587,403 B1 | 7/2003 | Keller et al. |
| 6,590,838 B1 | 7/2003 | Gerlings et al. |
| 6,598,230 B1 | 7/2003 | Ballhorn |
| 6,622,307 B1 | 9/2003 | Ho |
| 6,628,939 B2 | 9/2003 | Paulsen |
| 6,629,318 B1 | 9/2003 | Radha et al. |
| 6,643,620 B1 | 11/2003 | Contolini et al. |
| 6,643,690 B2 | 11/2003 | Duursma et al. |
| 6,654,801 B2 | 11/2003 | Mann et al. |
| 6,658,090 B1 | 12/2003 | Harjunen et al. |
| 6,662,231 B1 | 12/2003 | Drosset et al. |
| 6,702,585 B2 | 3/2004 | Okamoto |
| 6,724,974 B2 | 4/2004 | Naruto et al. |
| 6,728,824 B1 | 4/2004 | Chen |
| 6,728,956 B2 | 4/2004 | Ono |
| 6,728,966 B1 | 4/2004 | Arsenault et al. |
| 6,744,882 B1 | 6/2004 | Gupta et al. |
| 6,751,794 B1 | 6/2004 | McCaleb et al. |
| 6,755,744 B1 | 6/2004 | Nathan et al. |
| 6,762,585 B2 | 7/2004 | Liao |
| 6,789,215 B1 | 9/2004 | Rupp et al. |
| 6,816,578 B1 | 11/2004 | Kredo et al. |
| 6,850,252 B1 | 2/2005 | Hoffberg |
| 6,882,793 B1 | 4/2005 | Fu |
| 6,898,161 B1 | 5/2005 | Nathan |
| 6,904,592 B1 | 6/2005 | Johnson |
| 6,920,614 B1 | 7/2005 | Schindler et al. |
| 6,928,653 B1 | 8/2005 | Ellis et al. |
| 6,934,700 B1 | 8/2005 | Ijdens et al. |
| 6,942,574 B1 | 9/2005 | LeMay et al. |
| 6,974,076 B1 | 12/2005 | Siegel |
| 7,012,534 B2 | 3/2006 | Chaco |
| 7,024,485 B2 | 4/2006 | Dunning et al. |
| 7,073,172 B2 | 7/2006 | Chamberlain |
| 7,103,583 B1 | 9/2006 | Baum et al. |
| 7,107,109 B1 | 9/2006 | Nathan et al. |
| 7,111,129 B2 | 9/2006 | Percival |
| 7,114,013 B2 | 9/2006 | Bakke et al. |
| 7,124,194 B2 | 10/2006 | Nathan et al. |
| 7,181,458 B1 | 2/2007 | Higashi |
| 7,188,352 B2 | 3/2007 | Nathan et al. |
| 7,195,157 B2 | 3/2007 | Swartz et al. |
| 7,198,571 B2 | 4/2007 | LeMay et al. |
| 7,205,471 B2 | 4/2007 | Looney et al. |
| 7,206,417 B2 | 4/2007 | Nathan |
| 7,210,141 B1 | 4/2007 | Nathan et al. |
| 7,231,656 B1 | 6/2007 | Nathan |
| 7,237,198 B1 | 6/2007 | Chaney |
| 7,281,652 B2 | 10/2007 | Foss |
| 7,293,277 B1 | 11/2007 | Nathan |
| 7,356,831 B2 | 4/2008 | Nathan |
| 7,406,529 B2 | 7/2008 | Reed |
| 7,415,707 B2 | 8/2008 | Taguchi et al. |
| 7,418,474 B2 | 8/2008 | Schwab |
| 7,424,731 B1 | 9/2008 | Nathan et al. |
| 7,430,736 B2 | 9/2008 | Nguyen et al. |
| 7,433,832 B1 | 10/2008 | Bezos et al. |
| 7,448,057 B1 | 11/2008 | Nathan |
| 7,483,958 B1 | 1/2009 | Elabbady |
| 7,500,192 B2 | 3/2009 | Mastronardi |
| 7,512,632 B2 | 3/2009 | Mastronardi et al. |
| 7,519,442 B2 | 4/2009 | Nathan et al. |
| 7,533,182 B2 | 5/2009 | Wurtzel et al. |
| 7,548,851 B1 | 6/2009 | Lau |
| 7,549,919 B1 | 6/2009 | Nathan et al. |
| 7,574,727 B2 | 8/2009 | Nathan et al. |
| 7,647,613 B2 | 1/2010 | Drakoulis et al. |
| 7,657,910 B1 | 2/2010 | McAulay et al. |
| D616,414 S | 5/2010 | Nathan et al. |
| 7,749,083 B2 | 7/2010 | Nathan et al. |
| 7,757,264 B2 | 7/2010 | Nathan |
| 7,761,538 B2 | 7/2010 | Lin et al. |
| 7,770,165 B2 | 8/2010 | Olson et al. |
| 7,778,879 B2 | 8/2010 | Nathan et al. |
| 7,783,593 B2 | 8/2010 | Espino |
| 7,783,774 B2 | 8/2010 | Nathan et al. |
| 7,793,331 B2 | 9/2010 | Nathan et al. |
| 7,819,734 B2 | 10/2010 | Nathan et al. |
| 7,822,687 B2 | 10/2010 | Brillon et al. |
| D629,382 S | 12/2010 | Nathan et al. |
| D642,553 S | 8/2011 | Nathan et al. |
| 7,996,873 B1 | 8/2011 | Nathan et al. |
| 8,015,200 B2 | 9/2011 | Seiflein et al. |
| 8,028,318 B2 | 9/2011 | Nathan |
| 8,032,879 B2 | 10/2011 | Nathan et al. |
| 8,037,412 B2 | 10/2011 | Nathan et al. |
| 8,052,512 B2 | 11/2011 | Nathan et al. |
| 8,103,589 B2 | 1/2012 | Nathan et al. |
| 8,151,304 B2 | 4/2012 | Nathan et al. |
| 8,214,869 B2 | 7/2012 | Day |
| D665,375 S | 8/2012 | Garneau et al. |
| 8,292,712 B2 | 10/2012 | Nathan et al. |
| 8,332,895 B2 | 12/2012 | Nathan et al. |
| 8,429,530 B2 | 4/2013 | Neuman et al. |
| 2001/0016815 A1 | 8/2001 | Takahashi et al. |
| 2001/0023403 A1 | 9/2001 | Martin |
| 2001/0030660 A1 | 10/2001 | Zainoulline |
| 2001/0030912 A1 | 10/2001 | Kalis et al. |
| 2001/0037367 A1 | 11/2001 | Iyer |
| 2001/0044725 A1 | 11/2001 | Matsuda et al. |
| 2002/0002079 A1 | 1/2002 | Martin et al. |
| 2002/0002483 A1 | 1/2002 | Siegel et al. |
| 2002/0045960 A1 | 4/2002 | Phillips |
| 2002/0113824 A1 | 8/2002 | Myers |
| 2002/0116476 A1 | 8/2002 | Eyal et al. |
| 2002/0118949 A1 | 8/2002 | Jones |
| 2002/0120925 A1 | 8/2002 | Logan |
| 2002/0123331 A1 | 9/2002 | Lehaff et al. |
| 2002/0126141 A1 | 9/2002 | Mastronardi |
| 2002/0129036 A1 | 9/2002 | Ho Yuen Lok et al. |

(56) References Cited

U.S. PATENT DOCUMENTS

| | | |
|---|---|---|
| 2002/0129371 A1 | 9/2002 | Emura et al. |
| 2002/0144283 A1 | 10/2002 | Headings |
| 2002/0158130 A1 | 10/2002 | Pellaumail |
| 2002/0162104 A1 | 10/2002 | Raike et al. |
| 2003/0004833 A1 | 1/2003 | Pollak et al. |
| 2003/0005099 A1 | 1/2003 | Sven et al. |
| 2003/0006911 A1 | 1/2003 | Smith et al. |
| 2003/0008703 A1 | 1/2003 | Gauselmann |
| 2003/0018740 A1 | 1/2003 | Sonoda |
| 2003/0027120 A1 | 2/2003 | Jean |
| 2003/0031096 A1 | 2/2003 | Nathan et al. |
| 2003/0041093 A1 | 2/2003 | Yamane |
| 2003/0065639 A1 | 4/2003 | Fiennes |
| 2003/0076380 A1 | 4/2003 | Yusef et al. |
| 2003/0088538 A1 | 5/2003 | Ballard |
| 2003/0093790 A1 | 5/2003 | Logan |
| 2003/0101450 A1 | 5/2003 | Davidsson et al. |
| 2003/0104865 A1 | 6/2003 | Itkis |
| 2003/0108164 A1 | 6/2003 | Laurin |
| 2003/0135424 A1 | 7/2003 | Davis |
| 2003/0144910 A1 | 7/2003 | Flaherty et al. |
| 2003/0163388 A1* | 8/2003 | Beane ................. G06Q 20/04 705/26.1 |
| 2003/0176218 A1 | 9/2003 | LeMay et al. |
| 2003/0191753 A1 | 10/2003 | Hoch |
| 2003/0208586 A1 | 11/2003 | Mastronardi et al. |
| 2003/0225834 A1 | 12/2003 | Lee |
| 2003/0233469 A1 | 12/2003 | Knowlson |
| 2004/0010800 A1 | 1/2004 | Goci |
| 2004/0025185 A1 | 2/2004 | Goci |
| 2004/0085334 A1 | 5/2004 | Reaney |
| 2004/0103150 A1 | 5/2004 | Ogdon et al. |
| 2004/0145477 A1 | 7/2004 | Easter |
| 2004/0148362 A1 | 7/2004 | Friedman |
| 2004/0158555 A1 | 8/2004 | Seedman et al. |
| 2004/0204220 A1 | 10/2004 | Fried et al. |
| 2004/0205171 A1 | 10/2004 | Nathan et al. |
| 2004/0220926 A1 | 11/2004 | Lamkin et al. |
| 2004/0243482 A1 | 12/2004 | Laut |
| 2005/0034084 A1 | 2/2005 | Ohtsuki |
| 2005/0048816 A1 | 3/2005 | Higgins |
| 2005/0060405 A1 | 3/2005 | Nathan |
| 2005/0073782 A1 | 4/2005 | Nathan |
| 2005/0086172 A1 | 4/2005 | Stefik |
| 2005/0111671 A1 | 5/2005 | Nathan |
| 2005/0125833 A1 | 6/2005 | Nathan et al. |
| 2005/0201254 A1 | 9/2005 | Looney et al. |
| 2005/0240661 A1 | 10/2005 | Heller et al. |
| 2005/0267819 A1 | 12/2005 | Kaplan |
| 2006/0018208 A1 | 1/2006 | Nathan et al. |
| 2006/0031896 A1 | 2/2006 | Pulitzer |
| 2006/0035707 A1 | 2/2006 | Nguyen |
| 2006/0062094 A1 | 3/2006 | Nathan et al. |
| 2006/0125601 A1* | 6/2006 | Onishi ................. H04B 7/0805 340/5.72 |
| 2006/0143575 A1 | 6/2006 | Sauermann |
| 2006/0178204 A1* | 8/2006 | Okada ................. G07F 17/3211 463/20 |
| 2006/0227673 A1 | 10/2006 | Yamashita et al. |
| 2006/0239131 A1 | 10/2006 | Nathan et al. |
| 2006/0240771 A1 | 10/2006 | Graves |
| 2006/0293773 A1 | 12/2006 | Nathan et al. |
| 2007/0025701 A1 | 2/2007 | Kawasaki et al. |
| 2007/0086280 A1 | 4/2007 | Cappello et al. |
| 2007/0121430 A1 | 5/2007 | Nathan |
| 2007/0139410 A1 | 6/2007 | Abe et al. |
| 2007/0142022 A1 | 6/2007 | Madonna |
| 2007/0160224 A1 | 7/2007 | Nathan |
| 2007/0199014 A1 | 8/2007 | Clark |
| 2007/0204263 A1 | 8/2007 | Nathan et al. |
| 2007/0209053 A1 | 9/2007 | Nathan |
| 2007/0220052 A1 | 9/2007 | Kudo et al. |
| 2007/0220580 A1 | 9/2007 | Putterman |
| 2007/0247979 A1 | 10/2007 | Brillon et al. |
| 2007/0275777 A1 | 11/2007 | Walker |
| 2008/0005698 A1* | 1/2008 | Koskinen ............. G06F 3/0481 715/835 |
| 2008/0065925 A1 | 3/2008 | Oliverio et al. |
| 2008/0066016 A1 | 3/2008 | Dowdy et al. |
| 2008/0069545 A1 | 3/2008 | Nathan et al. |
| 2008/0077962 A1 | 3/2008 | Nathan |
| 2008/0086379 A1* | 4/2008 | Dion ................. G06F 3/04842 705/14.1 |
| 2008/0096659 A1 | 4/2008 | Kreloff et al. |
| 2008/0137849 A1 | 6/2008 | Nathan |
| 2008/0153569 A1* | 6/2008 | Tanabe ................. G07F 17/32 463/20 |
| 2008/0155588 A1 | 6/2008 | Roberts et al. |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0198271 A1 | 8/2008 | Malki |
| 2008/0222199 A1 | 9/2008 | Tiu et al. |
| 2008/0239887 A1* | 10/2008 | Tooker ................. G07F 17/00 369/30.06 |
| 2008/0305738 A1 | 12/2008 | Khedouri et al. |
| 2009/0005165 A1 | 1/2009 | Arezina |
| 2009/0006993 A1 | 1/2009 | Tuli et al. |
| 2009/0030802 A1 | 1/2009 | Plotnick et al. |
| 2009/0037969 A1 | 2/2009 | Nathan et al. |
| 2009/0042632 A1 | 2/2009 | Guenster et al. |
| 2009/0063976 A1 | 3/2009 | Bull et al. |
| 2009/0070341 A1 | 3/2009 | Mastronardi et al. |
| 2009/0091087 A1 | 4/2009 | Wasmund |
| 2009/0098925 A1 | 4/2009 | Gagner |
| 2009/0100092 A1 | 4/2009 | Seiflein et al. |
| 2009/0109224 A1 | 4/2009 | Sakurai |
| 2009/0128631 A1 | 5/2009 | Ortiz |
| 2009/0138111 A1 | 5/2009 | Mastronardi |
| 2009/0158203 A1 | 6/2009 | Kerr et al. |
| 2009/0172565 A1 | 7/2009 | Jackson et al. |
| 2009/0177301 A1 | 7/2009 | Hayes |
| 2009/0234914 A1 | 9/2009 | Mikkelsen et al. |
| 2009/0241061 A1 | 9/2009 | Asai et al. |
| 2009/0265734 A1 | 10/2009 | Dion et al. |
| 2009/0282491 A1 | 11/2009 | Nathan |
| 2009/0287696 A1 | 11/2009 | Galuten |
| 2009/0307314 A1 | 12/2009 | Smith et al. |
| 2010/0042505 A1 | 2/2010 | Straus |
| 2010/0060479 A1* | 3/2010 | Salter ................. G01D 4/002 340/870.4 |
| 2010/0111489 A1 | 5/2010 | Presler |
| 2010/0171698 A1* | 7/2010 | Kim ................. G06F 3/017 345/158 |
| 2010/0211818 A1 | 8/2010 | Nathan et al. |
| 2010/0211872 A1 | 8/2010 | Rolston |
| 2010/0241259 A1 | 9/2010 | Nathan |
| 2010/0247081 A1 | 9/2010 | Victoria Pons |
| 2010/0269066 A1 | 10/2010 | Nathan |
| 2010/0299232 A1 | 11/2010 | Nathan et al. |
| 2011/0066943 A1 | 3/2011 | Brillon et al. |
| 2011/0080100 A1* | 4/2011 | lemmers ............. H05B 37/0218 315/152 |
| 2011/0109250 A1* | 5/2011 | Engelen ................. H05B 37/02 315/312 |
| 2011/0283236 A1 | 11/2011 | Beaumier et al. |
| 2011/0321026 A1 | 12/2011 | Nathan et al. |
| 2012/0009985 A1 | 1/2012 | Nathan et al. |
| 2012/0053713 A1 | 3/2012 | Nathan |
| 2012/0105464 A1 | 5/2012 | Franceus |
| 2012/0143732 A1 | 6/2012 | Nathan et al. |
| 2012/0150614 A1 | 6/2012 | Dion et al. |
| 2012/0158531 A1 | 6/2012 | Dion et al. |
| 2012/0166965 A1 | 6/2012 | Nathan et al. |
| 2012/0178528 A1* | 7/2012 | Brunell ............. H05B 37/0254 463/31 |
| 2012/0231886 A1* | 9/2012 | Gomez ................. G07F 17/32 463/32 |
| 2012/0240140 A1 | 9/2012 | Nathan |
| 2013/0021281 A1 | 1/2013 | Tse et al. |
| 2013/0040715 A1 | 2/2013 | Nathan et al. |
| 2013/0044995 A1 | 2/2013 | Cappello et al. |

(56) References Cited

U.S. PATENT DOCUMENTS

| | | | |
|---|---|---|---|
| 2013/0070093 | A1 | 3/2013 | Rivera et al. |
| 2013/0091054 | A1 | 4/2013 | Nathan et al. |
| 2014/0026154 | A1 | 1/2014 | Nathan |

FOREIGN PATENT DOCUMENTS

| | | |
|---|---|---|
| CN | 1901670 | 1/2007 |
| CN | 101399732 | 4/2009 |
| DE | 3406058 | 8/1985 |
| DE | 3723737 | 1/1988 |
| DE | 3820835 | 1/1989 |
| DE | 3815071 | 11/1989 |
| DE | 4244198 | 6/1994 |
| DE | 19539172 | 9/1996 |
| DE | 19610739 | 9/1997 |
| DE | 19904007 | 8/2000 |
| EP | 0082077 | 6/1983 |
| EP | 0140593 | 5/1985 |
| EP | 0256921 | 2/1988 |
| EP | 0283304 | 9/1988 |
| EP | 0283350 | 9/1988 |
| EP | 0309298 | 3/1989 |
| EP | 0313359 | 4/1989 |
| EP | 0340787 | 11/1989 |
| EP | 0363186 | 4/1990 |
| EP | 0425168 | 5/1991 |
| EP | 0464562 | 1/1992 |
| EP | 0480558 | 4/1992 |
| EP | 0498130 | 8/1992 |
| EP | 0507110 | 10/1992 |
| EP | 0529834 | 3/1993 |
| EP | 0538319 | 4/1993 |
| EP | 0631283 | 12/1994 |
| EP | 0632371 | 1/1995 |
| EP | 0711076 | 5/1996 |
| EP | 0786122 | 7/1997 |
| EP | 0817103 | 1/1998 |
| EP | 0841616 | 5/1998 |
| EP | 0919964 | 6/1999 |
| EP | 0959570 | 11/1999 |
| EP | 0974896 | 1/2000 |
| EP | 0974941 | 1/2000 |
| EP | 0982695 | 3/2000 |
| EP | 1001391 | 5/2000 |
| EP | 1170951 | 1/2002 |
| EP | 1288802 | 3/2003 |
| EP | 1408427 | 4/2004 |
| EP | 1549919 | 4/2004 |
| EP | 1962251 | 8/2008 |
| FR | 2602352 | 2/1988 |
| FR | 2808906 | 11/2001 |
| GB | 2122799 | 1/1984 |
| GB | 2166328 | 4/1986 |
| GB | 2170943 | 8/1986 |
| GB | 2193420 | 2/1988 |
| GB | 2238680 | 6/1991 |
| GB | 2254469 | 10/1992 |
| GB | 2259398 | 3/1993 |
| GB | 2262170 | 6/1993 |
| GB | 2380377 | 4/2003 |
| GB | 2505584 | 8/2014 |
| JP | 57173207 | 10/1982 |
| JP | 58-179892 | 10/1983 |
| JP | 60-253082 | 12/1985 |
| JP | 61084143 | 4/1986 |
| JP | 62-192849 | 8/1987 |
| JP | 62-284496 | 12/1987 |
| JP | 63-60634 | 3/1988 |
| JP | 2-153665 | 6/1990 |
| JP | 5-74078 | 3/1993 |
| JP | 5122282 | 5/1993 |
| JP | 07281682 | 10/1995 |
| JP | 07-311587 | 11/1995 |
| JP | 8274812 | 10/1996 |
| JP | 08279235 | 10/1996 |
| JP | 3034555 | 11/1996 |
| JP | 08289976 | 11/1996 |
| JP | 928918 | 2/1997 |
| JP | 9114470 | 5/1997 |
| JP | 9127964 | 5/1997 |
| JP | 09-244900 | 9/1997 |
| JP | 10-098344 | 4/1998 |
| JP | 10-222537 | 8/1998 |
| JP | 11-003088 | 1/1999 |
| JP | 11-024686 | 1/1999 |
| JP | 11-095768 | 4/1999 |
| JP | 2000-270314 | 9/2000 |
| JP | 2002-83640 | 3/2002 |
| JP | 2002-537584 | 11/2002 |
| JP | 2003-076380 | 3/2003 |
| JP | 2003-084903 | 3/2003 |
| JP | 2003-099072 | 4/2003 |
| JP | 2004-29459 | 1/2004 |
| JP | 2004-030469 | 1/2004 |
| JP | 2004-054435 | 2/2004 |
| JP | 2005-018438 | 1/2005 |
| JP | 2005-107267 | 4/2005 |
| JP | 2005-184237 | 7/2005 |
| JP | 2005-215209 | 8/2005 |
| JP | 2006-39704 | 2/2006 |
| JP | 2006-048076 | 2/2006 |
| JP | 2007-034253 | 2/2007 |
| JP | 2007-041722 | 2/2007 |
| JP | 2007/505410 | 3/2007 |
| JP | 07504517 | 3/2007 |
| JP | 2007-102982 | 4/2007 |
| JP | 2007-104072 | 4/2007 |
| JP | 2007-128609 | 5/2007 |
| JP | 2007-164078 | 6/2007 |
| JP | 2007-164298 | 6/2007 |
| JP | 2007/179333 | 7/2007 |
| JP | 2007-199775 | 8/2007 |
| JP | 2007-241748 | 9/2007 |
| JP | 2008-058656 | 3/2008 |
| JP | 2009-017529 | 1/2009 |
| JP | 2009-075540 | 4/2009 |
| JP | 2009-288702 | 12/2009 |
| WO | WO 86/01326 | 2/1986 |
| WO | WO 90/00429 | 1/1990 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO93/021732 | 10/1993 |
| WO | WO 94/03894 | 2/1994 |
| WO | WO 94/14273 | 6/1994 |
| WO | WO 94/15306 | 7/1994 |
| WO | WO 94/15416 | 7/1994 |
| WO | WO 95/03609 | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96/12258 | 4/1996 |
| WO | WO 98/07940 | 2/1998 |
| WO | WO 98/11487 | 3/1998 |
| WO | WO 98/45835 | 10/1998 |
| WO | WO 99/35753 | 7/1999 |
| WO | WO 01/00290 | 1/2001 |
| WO | WO 01/08148 | 2/2001 |
| WO | WO 01/71608 | 9/2001 |
| WO | WO 02/060546 | 8/2002 |
| WO | WO 02/095752 | 11/2002 |
| WO | WO 01/084353 | 1/2003 |
| WO | WO 03/069613 | 8/2003 |
| WO | WO 2004/029775 | 4/2004 |
| WO | 2005/026916 | 3/2005 |
| WO | WO 2005/052751 A2 | 6/2005 |
| WO | WO 2006/014739 | 2/2006 |
| WO | WO 2006/056933 | 6/2006 |
| WO | WO 2006/106631 | 10/2006 |
| WO | WO 2007/069143 A2 | 6/2007 |
| WO | WO 2007/092542 | 8/2007 |

(56) References Cited

FOREIGN PATENT DOCUMENTS

| WO | WO 2008-033853 | 3/2008 |
|----|----|----|
| WO | WO 2009/004531 A1 | 1/2009 |
| WO | WO 2011094330 | 8/2011 |
| WO | WO 2013/040603 | 3/2013 |

OTHER PUBLICATIONS

Japanese Office Action in JP Appln. No. 2015-165266 dated Oct. 18, 2016.
Office Action in related U.S. Appl. No. 12/929,466 dated Apr. 14, 2016.
Office Action in related U.S. Appl. No. 11/902,658 dated Jun. 29, 2016.
Office Action in U.S. Appl. No. 14/277,404 dated May 5, 2016.
Supplemental European Search Report in related European Appln. No. EP 10 75 3812 dated Mar. 30, 2016.
Examiner's Report in related Canadian Application No. 2,881,503 dated Mar. 17, 2016.
"About Ecast" leaflet, 2 pages, at least as early as Nov. 8, 2013.
Ahanger et al.; A Digital On-Demand Video Service Supporting Content-Based Queries; 1993; 9 pages.
Austin Cyber Limits: Name That Tune [online], [retrieved Jul. 23, 2001]. Retrieved from the Internet: <http://www.pbs.ork/klru/austin/games/namethattune.html>.
Back to the Tunes [online], [retrieved Jul. 23, 2001]. Retrieved from the Internet: <http://citc5.hispeed.com/rules.html>.
Bonczek et al, "The DSS Development System", 1983 National Computer Conference, Anaheim, California, May 16-19, 1983, pp. 441-455.
Chan et al., "Distributed servers architectures for networked video services", IEEE Trans on Networking, vol. 9, No. 2, pp. 125-136, 2001.
Chen et al., "Optimization of the grouped sweeping scheduling (GSS) with heterogeneous multimedia streams", ACM Multimedia, pp. 1-7, 1993.
Crutcher et al., "The networked video Jukebox", IEEE, Trans. on circuits and systems for video technology, vol. 4, No. 2, pp. 105-120, 1994.
"Darts Revolution Again", Replay Magazine, Mar. 1991, pp. 146-148.
Decision of the European Patent Office to revoke the related EP Patent No. 786 125, Feb. 17, 2005.
Derfler et al., "How Networks Work", Millennium Ed., Que Corporation, Jan. 2000.
Drews, C.; Pestoni, F.; "Virtual jukebox: reviving a classic," Proceedings of the 35th Annual Hawaii International Conference System Sciences, pp. 887-893, Jan. 7-10, 2002.
"Ecast Forges Landmark International Technology Partnership", Business Wire at www.findarticles.com/cf_0/m0EIN/2000_July_25/63663604/print.html, 2 pages, Jul. 25, 2000.
"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.
European Search Report issued in EP 1 993 079, Jan. 15, 2009.
European Search Report issued for European Application No. 08000845.1-1238/1962251, dated Apr. 3, 2009.
Fachbuch, "Unterhaltungselektronic von A-Z" gfu 1, VDE-Verlag GmbH, pp. 12-13, 1983-1984.
"Foobar 2000 Evaluation Updated," MonkeyBiz, Aug. 3, 2008, 4 pp. (with partial English translation). http://monkeybizinfo.blogspot.jp/2008/08/foobar2000.html.
Gallardo et al., "Tangible Jukebox: back to palpable music", ACM TEI, pp. 199-202, 2010.
Gralla, "How the Internet Works", Millennium Ed., Que Corporation, Aug. 1999.
Galen A. Grimes, Chapter 18, "Taking Advantage of Web-based Audio" [online] [retrieved Mar. 24, 2000].

Hewlett-Packard Development Co; HP Open View Storage Data Protector Admin's Guideline Manual Edition; May 2003; Copyright 2003, 60 pages http://h20000.www2.hp.com/bc/docs/support/SupportManual/c006637931/c00663793.pdf.
Hicks et al., "Dynamic software updating", ACM PLDI, pp. 13-23, 2001.
IBM Technical Disclosure Bulletin, vol. 30, No. 5, Oct. 1987, "Method for Automated Assembly of Software Versions", pp. 353-355.
IBM Technical Disclosure Bulletin, vol. 32, No. 9A, Feb. 1990, "Robotic Wafer Handling System for Class 10 Environments" pp. 141-143.
IBM Technical Disclosure Bulletin, vol. 33, No. 12, May 1991, "High-speed Opens and Shorts Substrate Tester", pp. 251-259.
IBM Technical Disclosure Bulletin, vol. 41, No. 1, Jan. 1998, "Safe Mechanism for Installing Operating System Updates with Applications," pp. 557-559.
ITouch 8 Plus brochure, JVL Corporation, 2005, 2 pages.
ITouch 27 New Games brochure, JVL Corporation, 2005, 2 pages.
Johnny Rockets Name That Tune [online], [retrieved Mar. 7, 2002]. Retrieved from the Internet: <http://www.johnnyrockets.com/docs/funstuff.html>.
Petril Koskelainem, "Report on Streamworks™," [online] [retrieved Mar. 24, 2000].
Kozierok, The PC Guide, Site Version 2.2.0, http://www.pcguide.com, Apr. 17, 2001.
Kraiss et al., "Integrated document caching and prefetching in storage hierarchies based on Markov chain predictions", The VLDB Journal, vol. 7, issue 3, pp. 141-162, 1998.
Liang et al., "Dynamic class loading in the Java virtual machine", ACM OOPSLA, pp. 36-44, 1998.
Look and iTouch brochure, JVL Corporation, 2004, 2 pages.
Ludescher et al., "File Storage Management for TFTF physics data", IEEE, pp. 856-859, 1992.
Megatouch Champ brochure, Merit Industries, Inc., 2005, 2 pages.
Melnik et al., "A mediation infrastructure for digital library services", ACM DL, pp. 123-132, 2000.
Definition of "Dynamically," Merriam Webster's Collegiate Dictionary, Tenth Edition, Merriam-Webster, Inc., Copyright 1999, pp. 361.
Mickey B's Jukebox Revue—Name That Tune! [online], [retrieved Jul. 23, 2001]. Retrieved from the Internet: <http://mickeyb.com/tune/>.
Mod Box Internet brochure, Merit Entertainment, 2006, 2 pages.
Newsome et al., "Proxy compilation of dynamically loaded java classes with MoJo", ACM LCTES, pp. 204-212, Jun. 2002.
Outlaw, Computer Technology Review, "Virtual Servers Offer Performance Benefits for Network Imaging", 1993.
Patent Abstract of Japan vol. 95, No. 010 & JP 07 281682 A (Naguo Yuasa), 27 Oct. 1 JP 07 281682, figure 1-6 abrége.
Peter Pawlowski, "Basic Player Whose Appearance and Functions can be Customized Freely 'Foobar 2000' v1.0 is Unveiled,"Windows Forest, Japan, Jan. 12, 2010, 3 pages (with partial English translation). http://forest.impress.co.jp/docs/news/20100112_341870.html.
Pohlmann, "Principles of Digital Audio", Third Edition, 1995.
PR Newswire, Press Release, "MusicMatch Announces Commerical Availability of Meta Trust Certified MusicMatch jukebox", New York; Nov. 15, 1999, extracted from Internet, http://proquest.umi.com on Sep. 17, 2002.
Rollins et al., "Pixie: A jukebox architecture to support efficient peer content exchange", ACM Multimedia, pp. 179-188, 2002.
Schneier, "Applied Cryptography", Second Edition, John Wiley & Sons, Inc. New York, 1996.
Sprague et al., "Music selection using the partyvote democratic Jukebox", ACM AVI, pp. 433-436, 2008.
W. Richard Stevens, "TCP/IP Illustrated: vol. 1, the Protocols," Copyright 1994.
Stewart, "Ecast Deploys Marimba's Castanet to Power an Internet-Based, Entertainment Management System for the Out-of-Home Market", Marimba, Press Release, 3 pages, www.marimba.com/news/releases/ecast.dec13.html, Dec. 13, 1999.

(56) References Cited

OTHER PUBLICATIONS

Strauss et al., "Information Jukebox A semi public device for presenting multimedia information content", Pers. Ubiquit Comput, 7, pp. 217-220, 2003.
Summary of the oral proceedings regarding EP 786 125 before the Opposition Division of the European Patent Office, Feb. 17, 2005.
Tom & Liz's Name That Tune [online], [retrieved Jul. 23, 2001]. Retrieved from the Internet: <http://home.att.net/~tomnliz/Music.html>.
U.S. Appl. No. 29/371,355, Garneau et al., filed Dec. 14, 2010.
U.S. Appl. No. 61/536,015, filed Sep. 18, 2011; Rivera et al.
U.S. Appl. No. 29/401,854, filed Sep. 16, 2011; Garneau et al.
U.S. Appl. No. 61/129,637, Dion, filed Jul. 9, 2008.
U.S. Appl. No. 61/202,617, Dion, filed Mar. 18, 2009.
U.S. Appl. No. 61/584,750, filed Jan. 9, 2012; Rivera et al.
Vortex Brochure, JVL Corporation, 2005, 2 pages.
Waingrow, "Unix Hints & Hacks", Que Corporation, Indianapolis, IN, 1999.
White, "How Computers Work", Millennium Ed., Que Corporation, Indianapolis, IN, Sep. 1999 (Sep. 22, 1999).
Yuki Murata, iTunes no 'Kankyo Settei' Catalog & Tips 10 Sen, Mac People, ASCII Corporation, Oct. 1, 2007.
Written Opinion issued in PCT/US1122598, dated Mar. 29, 2011.
Drews et al., "Virtual Jukebox: Reviving a Classic," System Sciences, 2002, HICSS. Proceedings of the 35$^{th}$ Annual Hawaii International Conference on, vol., No. pp. 887-893, Jan. 7-10, 2002 doi: 10.1109/HICSS.2002.994055 http://ieeexplore.ieee.org/stamp/stamp.isp?tp=&arnumber=994055&isnumber=21442.
Canadian Office Action Application No. 2,881,533 dated Aug. 30, 2016.
Office Action in related U.S. Appl. No. 14/277,404 dated Oct. 6, 2016.

\* cited by examiner

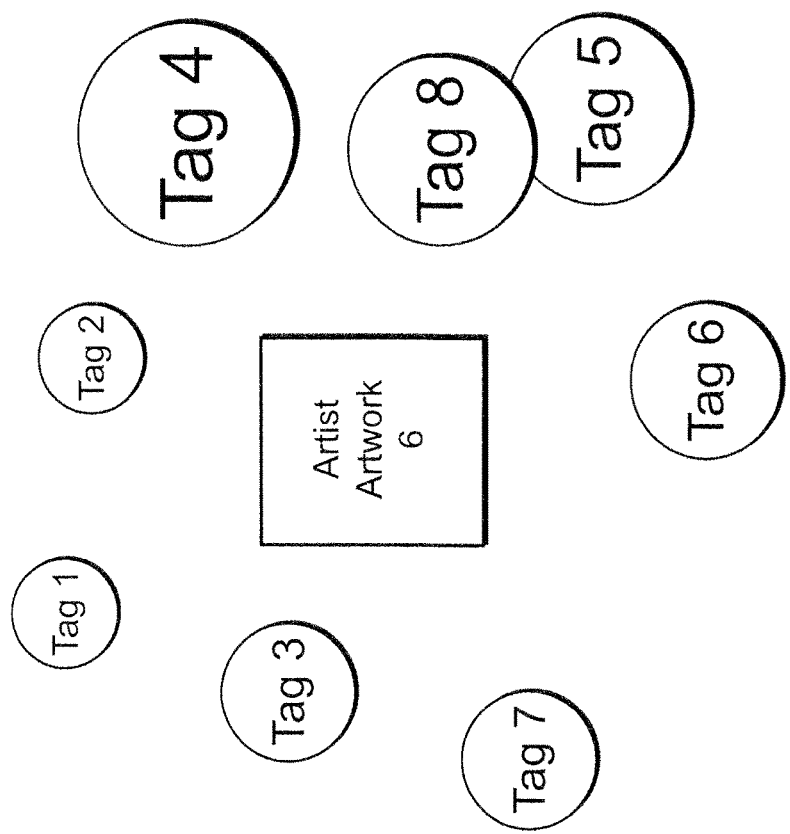

DIGITAL JUKEBOX DEVICE WITH IMPROVED USER INTERFACES, AND ASSOCIATED METHODS

CROSS-REFERENCES TO RELATED APPLICATIONS

This application is a divisional of application Ser. No. 12/929,466 filed Jan. 26, 2011, claims the benefit of each of U.S. Application Ser. Nos. 61/431,036, filed on Jan. 9, 2011 and 61/298,509, filed on Jan. 26, 2010, the entire contents of which are hereby incorporated herein by reference. This application also incorporates by reference the entire contents of U.S. Application Ser. No. 11/902,658, filed Sep. 24, 2007; Ser. No. 11/902,790, filed Sep. 25, 2007; Ser. No. 12/076,761, filed Mar. 21, 2008; 61/129,637, filed Jul. 9, 2008; Ser. No. 12/222,785, filed Aug. 15, 2008; Ser. No. 12/318,864, now U.S. Pat. No. 8,332,887, issued Dec. 11, 2012; and 61/202,617, filed Mar. 18, 2009.

TECHNICAL FIELD

Certain exemplary embodiments relate to entertainment systems and, more particularly, certain exemplary embodiments relate to entertainment systems that interact with users to provide access to media appropriate to improved user interfaces for such systems.

BACKGROUND AND SUMMARY

Jukeboxes have been around for decades and provide users with the ability to select desired music for reproduction in a convenient and advantageous manner. Jukeboxes have conventionally been provided in commercial establishments, such as restaurants and bars, in order to provide desired music on demand for patrons thereof for a fee. Over the last several years, a new generation of jukebox devices have become available that provide significant improvements in the operation thereof for all parties involved. More specifically, the conventional standalone phonorecord and CD jukeboxes are being replaced by digital downloading jukeboxes that are controlled by and communicate with a central server. An example of this new generation jukebox system is shown in U.S. Pat. No. 6,308,204, the entire disclosure of which is incorporated herein by reference. A leading provider of this new generation of jukebox systems is TouchTunes Music Corporation.

FIG. 1 shows an overview of an exemplary embodiment of a digital downloading jukebox system 10 (hereinafter referred to simply as a "jukebox system"). As shown in FIG. 1, the jukebox system 10 includes a central server 12 that contains a master library of audio content (typically music), as well as or alternatively audiovisual content (typically music and associated video or graphics), that can be downloaded therefrom. The jukebox system also includes a series of remote jukebox devices 16, 16a-16f. Each of these jukebox devices are generally located in a bar, restaurant, club or other desired location, and are operable to play music in response to receiving a payment from a user, such as coins, bills, credit/debit card, etc., and having one or more songs selected by the user for play. In an alternative embodiment, a music service is paid for on a subscription basis by the location, and the selected music is free for the end-user. The jukebox device 16 typically includes a screen 18 that presents information to the user and allows the user to select songs therefrom, as well as an audio system 20 that plays the selected songs. The screen 18 may also be used for displaying song-related video or graphics. The screen 18 may also be used to display advertisements for the jukebox itself in order to attract customers thereto, to display other types of advertisements, and/or to display any other desired information.

The jukebox devices 16 (sometimes referred to as simply "jukeboxes" herein) are operable to communicate with the central server 12 through a communications network 14, such as, for example, the Internet. The jukeboxes 16 periodically communicate with the server 12 in order to provide information to the server 12 regarding the specific songs that have been played on the jukebox. The central server then uses this information in order to determine the appropriate royalties and/or other payments that are owed for songs played on each jukebox. Thus, one advantage of this new generation of jukeboxes is that the sound reproduction and/or other applicable music rights can be adhered to in a more accurate and reliable manner, thereby assuring the proper royalties are paid to the artists or music owners. The central server 12 can also provide new songs to the jukebox 16 in order to assure that the appropriate or most popular songs are maintained on the jukebox based on the specific customers at that location. Thus, the songs available on each jukebox can be customized through communication with the central server in order to provide the songs and/or types of music that customers generally request at each jukebox location. As described in the above-referenced U.S. Pat. No. 6,308,204, the central server can also advantageously be used to update the operating software on the jukeboxes in order to, for example, change the operation of the jukebox, such as to provide new or improved features. Thus, another advantage of this new generation of jukeboxes is that the songs (or other audio and/or visual content), and the operation of the jukebox itself can be remotely changed as desired without the need to have someone (such as a routeman) personally service the jukebox. Instead, such updates can be done using the central server 12.

As indicated above, the jukebox devices 16 each include a mass storage device, such as a hard drive, which stores the songs and associated video/graphics data (if any), as well as any other desired graphical information for reproduction on the jukebox. The mass storage device of the jukebox typically has limited storage capacity relative to the storage device of the central server 12. As a result, only a fraction of the songs stored on the central server are typically stored on the mass storage device of the jukebox at any one time. There may be other reasons as well, such as for security of the data or limited room in the jukebox itself, for having limited storage capacity on the jukebox and/or limiting the number of songs stored thereon. For example, physical space may be limited on wall-mount jukeboxes or the like, which are designed to be small in size as compared to free-standing models. As explained above, the songs on the jukebox can be changed through communication with the central server, but typically any one jukebox only stores a relatively small subset of the complete library of songs maintained by the central server at any one time.

In order to maximize the revenue that a jukebox generates, it is important to make the most desired songs available on the jukebox over time. If customers cannot find songs they like on the jukebox, usage of the jukebox (and the revenue generated thereby) will dramatically decrease. On the other hand, it is impossible to predict in advance exactly what a customer at any particular location will desire to play on the jukebox. In fact, there are likely many instances where a customer would have selected a song that exists on the central server but is not currently present on the jukebox.

As a result, the jukebox may not be enjoyed and used to its fullest extent. In order to address this problem and increase revenue, jukebox systems have in the past provided a feature which enables the user to search for songs on the central server from the jukebox and request an immediate download of a desired song from the central server to the jukebox for an additional fee. This feature enables the user to play any song in the master library of songs maintained by the central server using the jukebox, regardless of whether or not the specific song is presently stored in the mass storage of the jukebox itself. Thus, the user can first look for desired songs on the local storage of the jukebox and then, if desired, search further on the central server for desired songs. The jukebox device typically charges an additional fee (such as five credits instead on one credit) for an immediate download and play of a song from the central server as opposed to a standard play directly from the jukebox's local storage.

As might be discerned from the above, the "conventional wisdom" is to attempt to maximize revenues and ensure a broad-based appeal by providing more and more media offerings or songs via a jukebox. In other words, the conventional wisdom and industry thinking is to make available as many media offerings or songs as possible via a jukebox so that the one jukebox will be appropriate for any venue. The theory is based in part on the common perception that it is easier to develop a single, standard jukebox with as many offerings as possible, than to provide multiple different jukeboxes each making available a different set of limited media content. This common understanding, in turn, may have its roots in the fact that conventional, non-digital jukeboxes clearly had severely limited repertoires and that even many early digital jukeboxes has expanded repertoires that were still limited by licensing and accounting requirements, download speeds, etc.

The inventors of the instant application have recently discovered that the conventional wisdom no longer is entirely accurate and that the underlying assumptions are somewhat flawed. For example, the inventors of the instant application have recently discovered that providing more and more media offerings is not necessarily desirable in all instances. This discovery is based, in part, on the inventors' recognition that providing more and more offerings means providing more and more opportunities for patrons to play music that is inconsistent with the authenticity or identity of a location. For instance, the authenticity and identity of a "biker bar" can be severely undermined if a patron were to play what could be considered pop or "teeny-bopper" music, just as a country line dancing venue might have its authenticity and identity undermined if hip hop and rhythm and blues songs were played. The inventors of the instant application have experienced difficulties providing jukeboxes in locations for these vary reasons. Surprisingly and unexpectedly, the inventors' experiences provide evidence that the ability to selectively "filter" music by excluding songs, genres, and/or the like often is seen as an unacceptable, incomplete, and/or otherwise undesirable to proprietors of locations.

Apart from or in addition to the actual media being played, the inventors of the instant application have also discovered that the physical appearance of the utilitarian jukebox is sometimes undesirable. Indeed, the inventors of the instant application have discovered that the physical appearance of a jukebox or jukebox terminal can be undesirable simply because the device itself looks like a jukebox (e.g., has a payment acceptor, a touch screen display that selectively operates in an "attract mode," includes flashing and/or otherwise changing neon lights, etc.). In a perhaps related matter, the inventors of the instant application have discovered that the content displayed on a jukebox or jukebox terminal also may be considered undesirable. As above, the physical appearance of the jukebox device and/or content displayed on the jukebox device may threaten to undermine the authenticity or identity of a location. As a perhaps more concrete example, it has been observed by the inventors of the instant application that so-called "ultralounges" typically react negatively towards the visual appearances of conventional jukeboxes. As another example, the inventors of the instant application have discovered that the "wrong" types of advertisements and/or media may be displayed at a given location as, for example, ultralounges stereotypically find it more desirable and "authentic" to display attractive men and women wearing fashionable clothing and accessories as compared to album art, concert advertisements, etc.

Still another discovery that the inventors of the instant application have made is that the conventional ways that people typically discover music (including songs, artists, etc.) are becoming outmoded. In addition to, or rather than, watching a music television station such as MTV or the like, listening to the radio, or paying attention to advertisements, potential patrons are discovering music in new and different ways. User interfaces that enable patrons to browse or search for music on a jukebox device typically enable browsing and/or searching based on artist name, song name, album, and/or the like. But such techniques do not necessarily result in the patron being exposed to new or different music and is still another conventional technique for music discovery. The inventors of the instant application have realized that today's potential patrons oftentimes are more interested in music discovered through non-traditional social networking outlets and/or through pure "buzz" generated on the Internet or through such social networking outlets.

Given the above discoveries and realizations, it will be appreciated that further improvements to jukebox devices can be made. It also will be appreciated that some or all of such improvements are contrary to accepted wisdom and/or industry-standard practice. For instance, providing more limited media selections probably would be seen as a "step back" when viewed through the lens of conventional thinking, whereas the inventors have realized that it actually may be considered more desirable by some to provide a more limited selection when attempting to preserve the authenticity and/or identity of a location. As another example, jukebox devices conventionally have been viewed as having one of several "classic designs" and digital jukebox devices have been designed to be "updates" to such classic designs, whereas the inventors have realized that jukeboxes are perhaps not as utilitarian or ubiquitous as they have been viewed. Still further, it will be appreciated that conventional browsing and/or searching techniques may be updated and/or replaced, e.g., to reflect newer ways that potential patrons discover and experience music.

Certain exemplary embodiments provide improvements in the form of digital jukebox devices with techniques for providing appropriate and/or customized media, and associated methods. For instance, certain exemplary embodiments may (1) provide "inclusive" filtering techniques, (2) display appropriate jukebox user interface screens and offer appropriate jukebox content, and/or (3) enable discovery of music through new portals such as new media or social networking sites, and pure buzz, etc. Certain exemplary embodiments may provide (1) attract or flight media operations, (2) browsing services, and/or (3) search screens appropriate to and/or customized for a particular user using the entertainment system, the location at which the entertainment system is being accessed, and/or a predefined event.

Such exemplary embodiments are enabled using enabled through metadata associated with recognized jukebox users, locations, instances of media, and/or particular events or locations (e.g., for a short period of time such as, for example, a single disco night). In brief, criteria may be selected for inclusion, e.g., by location staff. Such criteria may be associated with metadata associated with media to provide for selective inclusion of some media, a look-and-feel of the user interface, etc. Once an initially restricted set of media is selected for inclusion, metadata associated with a patron using the jukebox may further selectively limit the pool of media available to a given patron. Finally, metadata associated with an event may still further selectively limit the pool of media available to all patrons for a period of time. In this way, certain exemplary embodiments may begin with a master set of media provided for the overall jukebox system. However, the set of media available for a given location may be initially selected by specifying inclusion criteria. An optional custom-defined event may have metadata associated with it so as to specify yet further inclusion criteria. The overlap of the media available for the location by virtue of the initially selection and the media associated with the optional custom-defined event may then be available for playback on the jukebox(es) available at the particular location. Furthermore, when a recognized user uses the jukebox, metadata associated with the user may be used to define yet a further overlap (e.g., as in the case of three-circle Venn Diagram). The ultimate overlap may be used to limit the options available, reorder the options available to the recognized user (e.g., so that new songs are displayed first, favorite songs are displayed first, etc.).

The inclusion criteria set by a location and/or by a user may be media-specific in certain exemplary embodiments. For instance, inclusion criteria may be indicative of a genre, artist or artists, instrumentation, media popularity indexed to an outside source (e.g., Billboard Charts, plays via a social networking site such as MySpace, information gleaned from a recognized user's Facebook friends, funny videos presented on YouTube or Break.com, etc.). It will be appreciated that media-specific criteria is specific to a particular instance of media.

The inclusion criteria set by a location and/or by a user may be media-independent in certain exemplary embodiments. For instance, in certain exemplary embodiments, inclusion criteria may relate to order (newest music first regardless of popularity, most played music last, etc.), and/or the like. Such inclusion criteria may be considered media-independent in the sense that it may constitute data that is not necessarily tied to any specific or particular instance of media.

In certain exemplary embodiments, a user interface may be provided that conveys a three-dimensional (3D) effect. Such a user interface may help convey a greater sense of delving "into" the media. For instance, entry, zoom, and exit effects may be provided for media in a flight state in connection with certain exemplary embodiments. In browsing and/or search screens, media may be displayed so that it appears to zoom in or out based on, for instance, relevance, current selection, criteria matching, etc., in certain exemplary embodiments.

In general, certain exemplary embodiments relate to the inclusion of innovative user interface that help immerse the user in an interactive jukebox world where user interface elements help provide for multi-dimensional interaction with collections of instances of media, synchronized external and/or internal lightshow feedback and/or projection, play queue reveal and/or manipulation, blurring/focusing of elements, synchronized lyrics display etc. Certain exemplary embodiments described herein also include cameras and/or LEDs that may help, for example, enable artist and/or patron likenesses to be used or incorporated into jukebox interfaces, cameras to be leveraged in attract or flight modes or to serve as mirrors, lighting elements to be used as camera flashes, LEDs to simulate tactile feedback for touch screen displays or patron welcome display messages, provide a jukebox-based security system, apply contextual ads, etc. Adaptive auto-complete search recommendations may be provided in certain exemplary embodiments, as may set lists and/or enhanced collection type browsing.

The exemplary embodiments, aspects, and advantages disclosed herein may be provided in any suitable combination or sub-combination to achieve yet further exemplary embodiments.

BRIEF DESCRIPTION OF THE DRAWINGS

These and other features, aspects, and advantages of the instant invention will be further understood by review of the following detailed description of the exemplary embodiments when read in conjunction with the appended drawings, in which:

FIG. 8a illustrates a set of eight (8) example tags associated with "artist 6" in accordance with an exemplary embodiment;

DETAILED DESCRIPTION OF EXEMPLARY EMBODIMENTS

Figure 1:
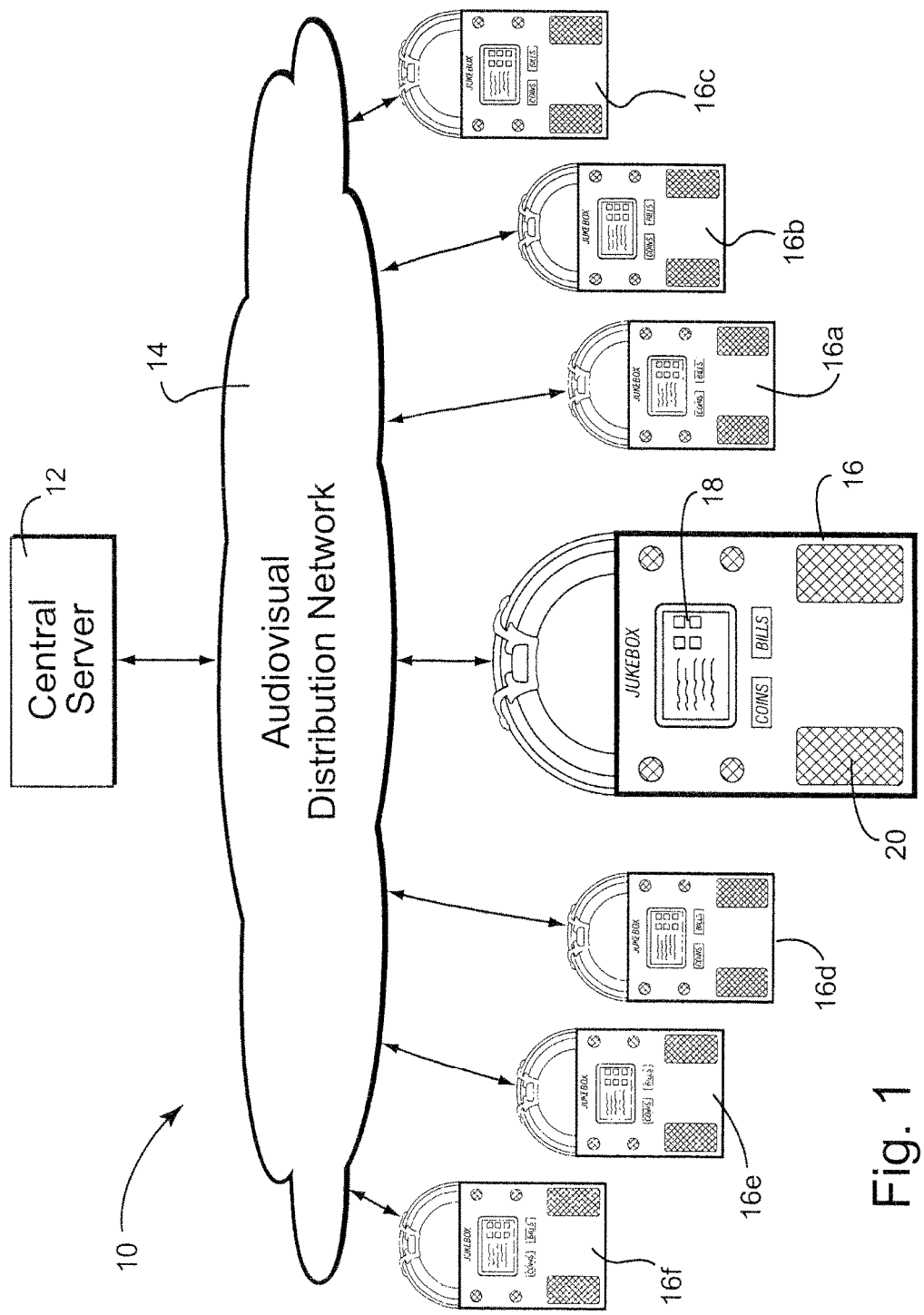
FIG. 1 is a block diagram of a conventional downloading digital jukebox system.
Figure 2:
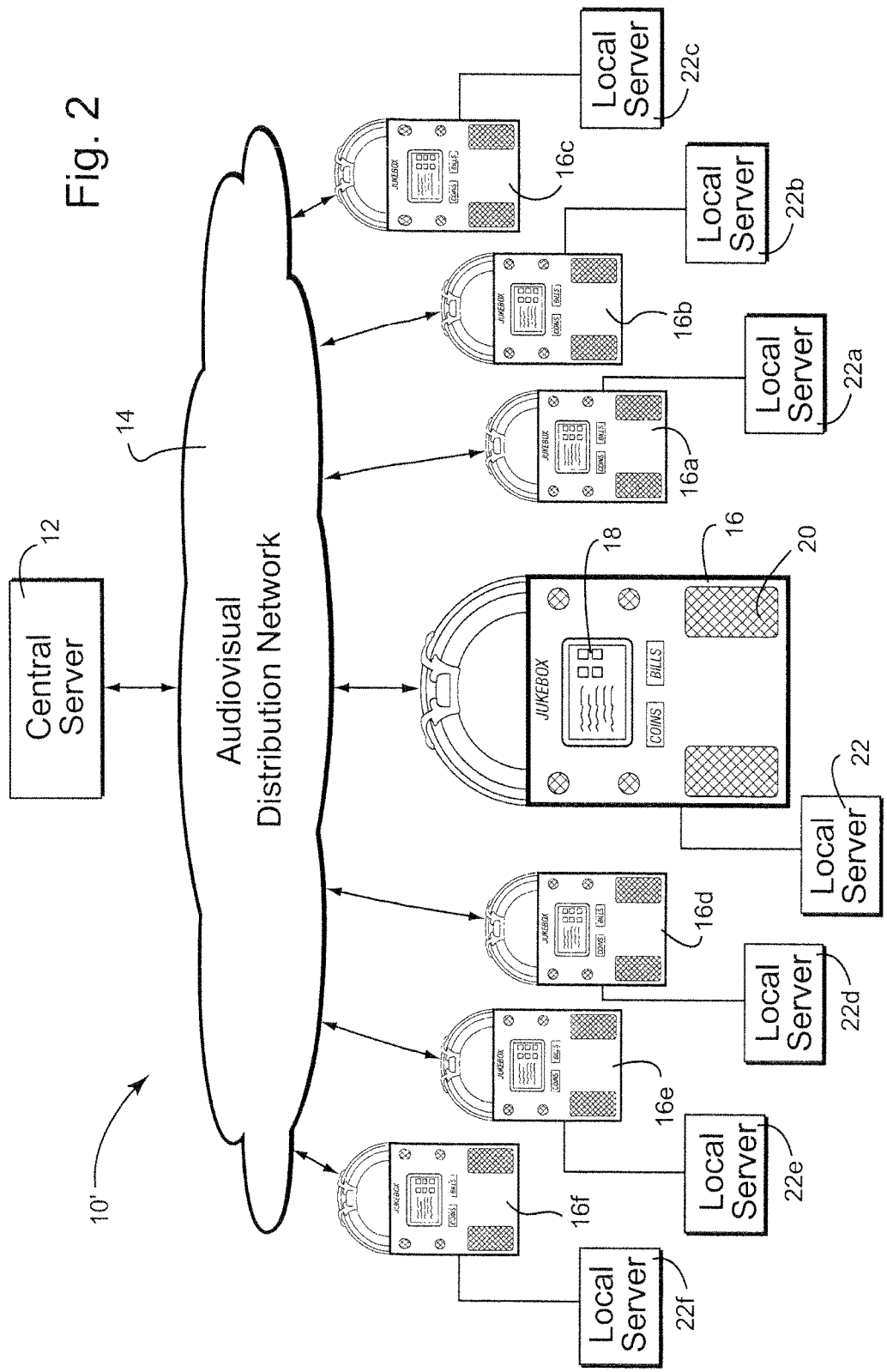
FIG. 2 is a block diagram of an exemplary embodiment of an improved jukebox system 10'.

Referring now to the drawings, FIG. 2 is a block diagram of an exemplary embodiment of an improved jukebox system 10'. The jukebox system 10' includes similar elements as shown in FIG. 1 and described above, including a central server 12, communications network 14, and remote jukebox devices 16, 16a-16f. However, the jukebox system 10' further includes local servers 22, 22a-22f respectively connected to each of the jukebox devices 16, 16a-16f. The central server 12 includes a master library of songs (and/or other content). Each of the jukebox devices includes a subset of the master library on a local storage device of the jukebox. The central server may be used to individually manage the contents of the jukebox device, by monitoring usage of and updating the subset of songs on each of the jukebox devices with the intent of maximizing the usage thereof. The central server 12 periodically receives data from each of the jukeboxes for the purpose of royalty accounting and payment for songs played. The jukebox devices may connect to the network in any suitable manner, such as dial-up modem or broadband modem (e.g., DSL, cable, wireless broadband, or satellite). The communications network 14 may be any suitable network capable of distributing data (e.g., audiovisual data) from the central server 12 to the jukeboxes 16 and enabling data to be uploaded from the jukeboxes 16 to the central server 12.

The songs (and/or other data) may be digitized, compressed and encrypted by the central server 12 prior to sending songs to the jukeboxes for security and bandwidth purposes using known techniques. The songs are then decompressed and decrypted by the jukeboxes for storage and reproduction thereon. Thus, each of the jukeboxes maintains in a database a library of digitized songs for play on the jukebox, wherein the library can be changed or updated through communication by the central server. The jukeboxes may also receive and store data constituting images (e.g., still and/or moving video and/or graphical images) that can be displayed on the display 18 of the jukebox device 16. In one exemplary embodiment of the invention, the jukebox devices have similar structure and operation described in U.S. Pat. No. 6,308,204 referenced above. Thus, the jukebox devices 16 each may include one or more microprocessors, such as a main CPU and an audio DSP, a memory, such as a hard drive, for storing songs and/or other content, a display of displaying visual items, an audio arrangement 20 for providing audio, a communication system for enabling the jukebox to communicate with the central server 12 through the communications network 14, and operating software, including a multitasking operating system, that controls the operation of the jukebox. The operating software also may be updateable through communication with the central server 12 as described, for example, in U.S. Pat. No. 6,308,204 referenced above. The jukeboxes 16 further include one or more payment devices, such as coin, bill and/or credit card input devices, for enabling a customer to pay for usage of the jukebox device in a convenient manner. The screen 18 may be a touch screen that enables the user to input selections by touching the screen.

Each jukebox device has, in one embodiment, a local server 22 that can be accessed by the jukebox device. The local servers are respectively connected to the jukebox devices using Ethernet or other type of local connection. In another embodiment, the local server may simply be a logical extension (e.g. partition, directory, or area) of the jukebox's hard drive, rather than a separate hardware device. The local servers 22 may each include a mirror copy of the master library of musical recordings maintained by the central server 12. The local server 22 can be loaded with the master library by the entity that owns and/or controls the jukebox network prior to shipping the local server and jukebox device to the jukebox distributor or operator. Of course, over time, the local sever will no longer correspond identically to the central server, due to the fact that the central server may be continually updated with additional or new songs. Thus, the local servers 22 also may be updated periodically to maintain a correspondence with the library on the central server 12. This updating can be done, for example, by the central server 12 through communication with the jukebox devices connected with the local servers 22 using, for example, either dial-up or broadband modems. Alternatively, the updating can be done personally with an update tool that can be connected by a routeman or other person directly to the jukebox or local server for the purpose of updating the contents of the local server. The portable tool could include a removable storage medium, such as a hard drive, that could be returned to and reused by the owner of the jukebox system for future updates. The tool itself could be kept by the operator or other person in charge of maintaining specific jukeboxes for use upon receipt of the updated removable storage medium from the owner of the jukebox system.

For security reasons, the local server 22 may not include all of the digital data that constitutes any one song that is stored on the local server 22. In addition, the part of the song that is on the local server is encrypted. The jukebox device 16 contains the missing part of each of the songs on the local server, thereby enabling the jukebox to assemble the complete song based on the contents of the local server and the memory on the jukebox device. The missing data located on the jukebox is needed in order to decrypt the songs. For example, a single block (or other small fraction) of data for each song may be missing on the local server but present on the jukebox device, and the encryption may be based on the missing block and may proceed on a block by block basis. Thus, none of the blocks can be decrypted without obtaining and/or decrypting a preceding block. This feature provides significant security and prevents or deters theft or other type of unauthorized use or copying of the songs on the local server. Thus, in this embodiment, each local server must be specifically assigned to a specific jukebox device so that the decryption described above can be properly performed.

In accordance with an exemplary embodiment, the local servers may also each be individually registered with and identified to the central server 12, so that the central server can individually manage and monitor each local server. The same is true for the jukebox device itself, i.e., it may also be registered with the central server so that it too can be individually monitored and managed by the central server. As will be understood from the foregoing description, the local servers become an important and advantageous part of the jukebox system by allowing the contents thereof to be accessed by the jukebox device to provide additional services (such as providing additional songs) not available on the jukebox device itself. As will be explained below, the song library of the central server and/or the storage capacity itself can be advantageously used to provide services to other jukeboxes, such as fee-based residential and commercial jukeboxes and/or other fee-based equipment. One use of the local servers may be to provide an immediate song downloading feature.

As indicated above, certain exemplary embodiments include a new three-dimensional user interface for exploring and browsing media content, e.g., using a touch-screen. Given an arbitrary collection of content (e.g., music, video, advertisement, and/or other content), the new user interface may create a multi-dimensional (e.g., two- or three-dimensional) visualization virtual space, which allows the user to freely navigate in this collection. This type of navigation is facilitated in certain exemplary embodiments by using a social tagging model and/or collaborative popularity model.

Certain exemplary embodiments are described as implementing touch area sensing techniques. That is, in a sense, certain exemplary embodiments obtain a location a direction and a speed of a sensed touch. Using this data, certain exemplary embodiments may cause the prominent object plane to be moved forward or backwards in the object presentation by moving the touch forward (upwards) were backward (downwards) or selected by a swipe to the left or right. In addition, or in the alternative, by holding a touch for a period of time greater than some threshold (greater than 2 seconds, for example), a choice that is represents it could be presented.

The space is the general presentation area on which all graphic elements are presented. Collections generally refer to logical collections of media and may be subject to preferential filtering, e.g., to present and make available only media that satisfies criteria for different levels of actors. They may sometimes be represented by graphic images. Objects generally refer to songs, artists, playlists, games, or media sources that are represented in a sequence from a central catalog. Objects that are presented may sometimes be thought of as being subject to a match between the user or locations preferences and the attributes of the object was being browsed. As described in certain of assignee's co-pending applications (which are referenced above), an authentication mechanism may be provided to, among other things, identify the user and provide security credential authorization. In the context of certain exemplary embodiments, the authentication action may superimpose user-based preferential filtering over location-based preferential filtering. When user-based preferential filtering is in effect, it may further reduce whatever filtering has been imposed by the location attributes. Once authenticated, new collections such as playlists, favorite games, interrupted games, chat sessions, records of media consumption, high scores, etc., may become available as new possible collections to be presented as objects in the object viewer.

As alluded to above, in certain exemplary embodiments, the space operates in three states. In the flight state, a programmed series of media segments are presented based on the behavior of the jukebox and centralized media preparation activities. In the browsing state, users browse collections through a variety of different modes with the goal of selecting a media item for action. Media items typically include songs, games, and/or other content. In the search state, patrons enter data through a virtual keyboard and option panel or other appropriate input mechanism to directly locate media items that satisfy the search criteria and the preferential filtering in effect at that location. It will be appreciated that these states are exemplary and that these and/or other states may be provided in any suitable combination or sub-combination in different embodiments of this invention. In any event, illustrative details of exemplary flight, browse, and search states will be provided, in turn, below.

Details regarding an example flight state will now be provided. As will be appreciated, for jukeboxes, and music systems in general, only a portion of every day is spent interacting directly or wirelessly with the user who is searching for or playing a song. Most of the time, the lighting and display apparatus are engaged in presenting a sequence of video images. The goal of the video images is to attract users to the system, make them aware that the device is in fact a user controlled music service or jukebox, present advertisements and public service announcements, and/or to promote the system itself showing new features, new media available, and to promote artists and their works.

A problem with jukeboxes today is that they offer a largely homogenous presentation across a particular network. This means that the visuals presented may be wholly inappropriate for many of the locations in which it is installed. Perhaps more importantly, many restaurants or specialty bars or lounges have invested significant resources in creating a specific mood and appearance to attract and satisfy their intended clientele. As commercial music systems increasingly offer larger and larger screen display areas, the opportunity exists to tune the appearance of a jukebox via its visuals to a particular type of location. In addition, the larger screen area presents an opportunity to support increasingly sophisticated digital signage applications interleaved with the visual theme for the location. The downside risk of not responding to implicit or explicit requests for customized designs in order to make the jukebox blend in with the overall environment relates to having the idea of a jukebox placed in the location rejected out of hand.

One solution to this challenge is to offer custom flight packages, which may be thought of as being collections of video and composite imagery that are "authentic" to or otherwise "in tune with" the sensibilities of location. For example, a sophisticated urban Martini lounge could be provided with an urban, chic collection of videos appropriate for the location. A country and western bar could be provided a cowboy theme more in keeping with the surroundings. This has at least two advantageous effects on the industry. First, it opens up an entirely new population of venue types to the music service. Second, combined with sophisticated venue music styles, it creates a music system that has both a look and a sound that is appropriate for the clientele the venue operator seeks to attract and please.

In certain exemplary embodiments, flights may be composed of individual video segments. Video segments may occupy all or a portion of the available screen area and may be overlaid with other video segments of differing duration. Video segments may be resident within the music system in certain exemplary embodiments (e.g., having been distributed from a central server in advance), or they may be dynamically retrieved from music server or other content providers in certain other exemplary embodiments. In still other exemplary embodiments, channels that may be tuned into may be provided. Each flight may have a duration after which the flight would repeat. As such, it may be desirable to include dynamic content so as to keep the presentation fresh and interesting.

Video segments may be generally classified as being editorial or advertising. Editorial segments are generally seen as informative or amusing facts intended to engage viewers and encourage use of the music system, either directly or through a remote access device. Advertising segments are generally seen as being dynamically presented based on advertising materials located on the music system or on a remote server.

Flights can be thought of as a timeline where each segment represents a displayable group. Displayable groups are independent data systems designed to resolve the requirement for editorial or advertising content. A displayable group may be resolved in a single step where only one editorial segment satisfies the criteria of the displayable group, or a displayable group may require a great many rules and references to ultimately resolve the correct video segment to be presented.

Figure 3:
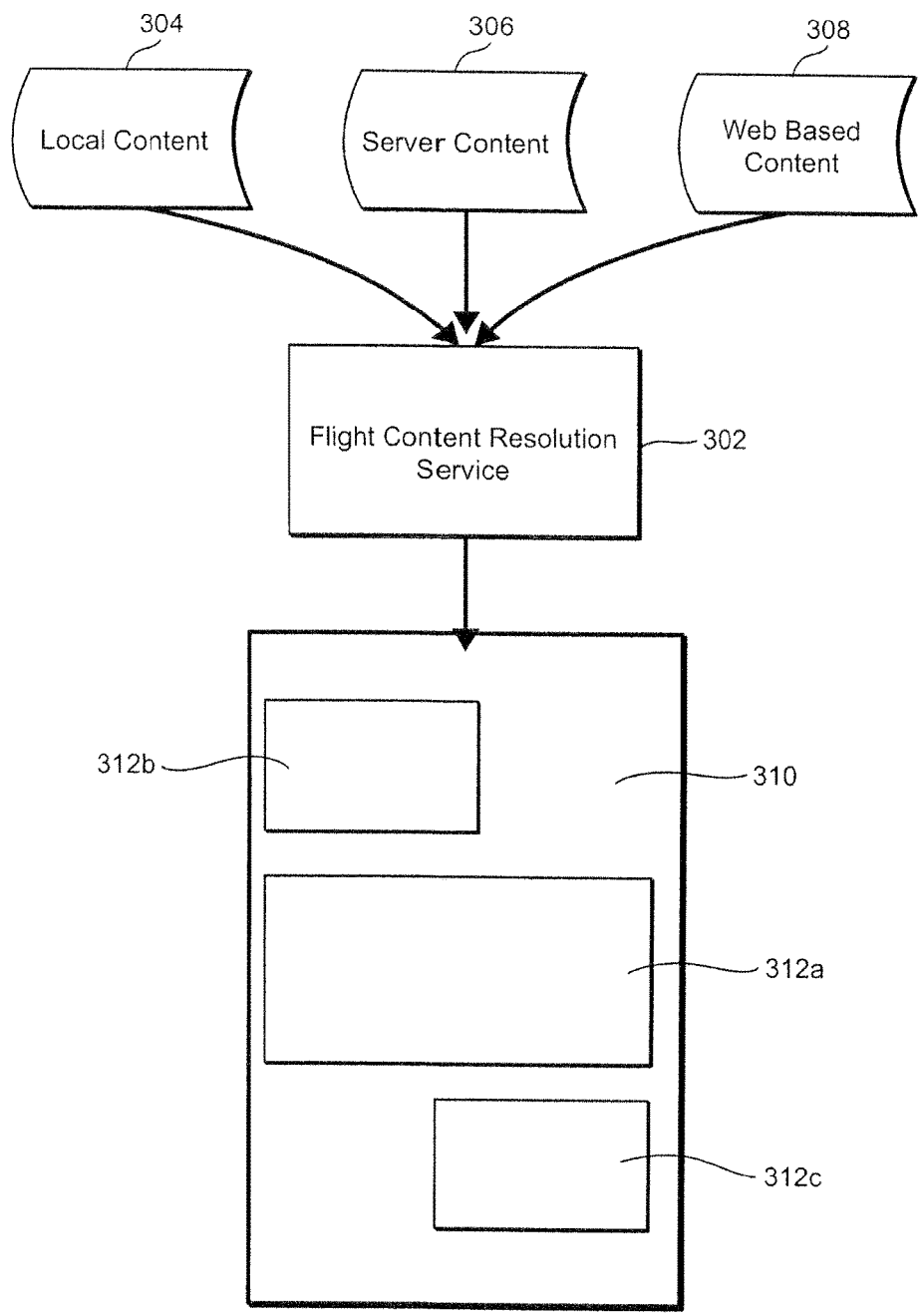
FIG. 3 is a schematic view showing flight content resolution in accordance with an exemplary embodiment.
Figure 4:
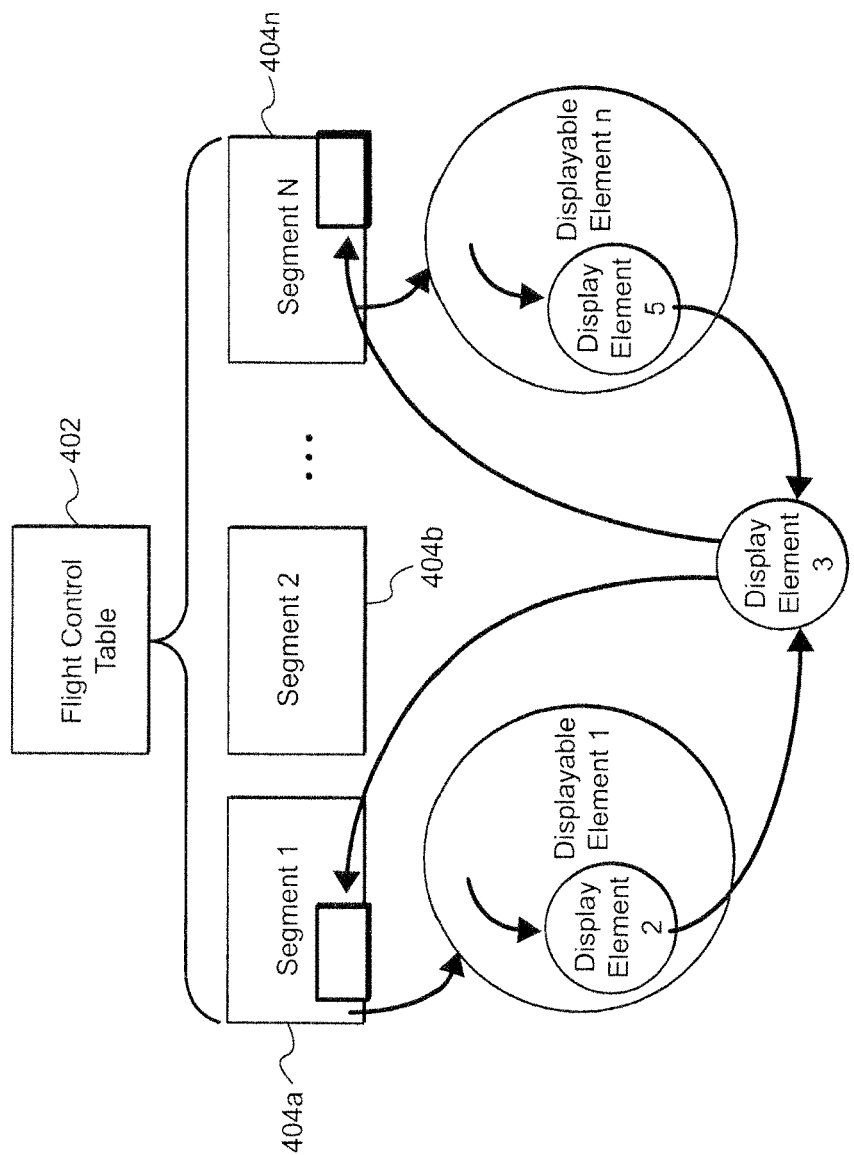
FIG. 4 is a schematic view showing display group resolution in accordance with an exemplary embodiment.

FIG. 3 is a schematic view showing flight content resolution in accordance with an exemplary embodiment, and FIG. 4 is a schematic view showing display group resolution in accordance with an exemplary embodiment. As can be seen from FIG. 3, a flight content resolution service 302 may resolve the flight content to be displayed from a variety of sources such as, for example, local content 304, server content 306, and/or web-based content 308 sources. The resolved flight content may be displayed on a screen 310. In the FIG. 3 exemplary embodiments, the "current" segment is provided in the center of the screen 312a and retreats into the background 312b to make room for a "new" segment entering in the foreground 312c. For example, each video segment 312 may have an anchor position, a timeline, and an ending anchor position. This may help provide the ability to add motion and the illusion of three-dimensional space to the presentation. This information may be scripted in accordance with a predefined metadata format.

FIG. 4 may be thought of as a graphical representation of a script, for instance. That is, a flight control table 402 includes plural segments 404a, 404b, . . . 404n. These segments may involve displayable elements that, in turn, may include further displayable elements. The displayable elements in other words may be nested within each other, e.g., in dependence on a script. A "sub-display element" embedded within a display element may be programmed to move within that display element, across display elements, between segments, etc. Transitions thus may be defined as between segments, and as between display elements, and as between display elements across segments, in exemplary embodiments.

Figure 5:
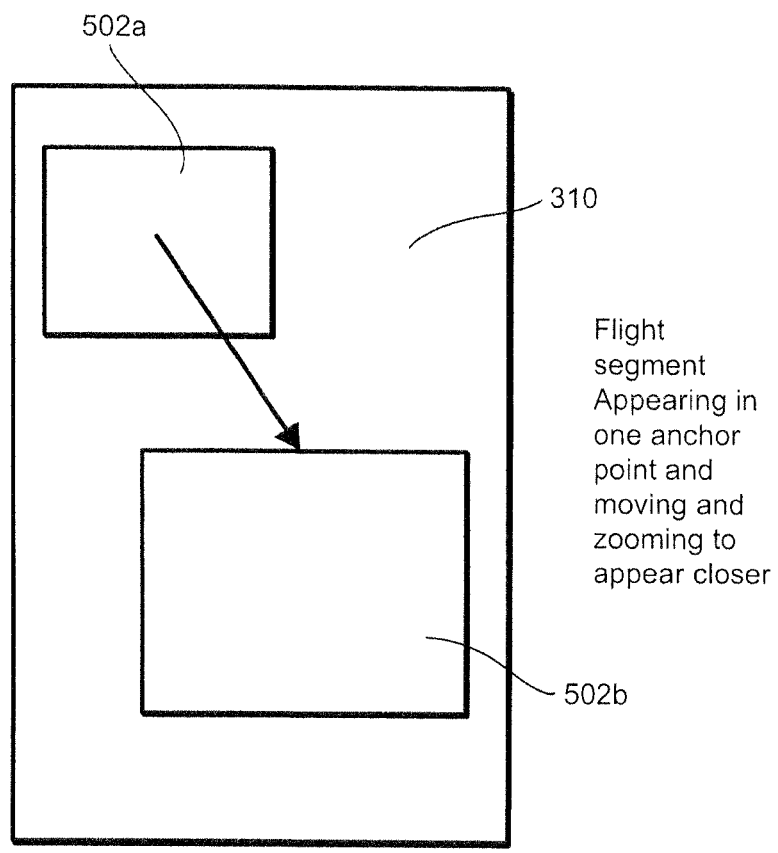
FIG. 5 is a flight segment appearing in one anchor point and moving and zooming to appear closer to the user in accordance with an exemplary embodiment.

As a simple example, FIG. 5 is a flight segment appearing in one anchor point 502a and moving and zooming to a second anchor point 502b appear closer to the user in accordance with an exemplary embodiment. The flight segments may also enter and/or exit with transitions. It will be appreciated that anchor points and zooming may be from top to bottom, bottom to top, left to right, right to left, in or out, etc., and need not necessarily go from bottom to top when giving additional focus to a new content piece (e.g., as in the FIG. 5 example). Movements also may be more complicated in certain exemplary embodiments, e.g., including spiral-type movements, arbitrary movements, random or seemingly random type movements, etc.

As alluded to above (e.g., in connection with FIG. 4), a displayable group may contain one or more displayable groups. In other words, the displayable group resolution process may be recursive or nested in certain exemplary implementations. By maintaining a one-to-many relationship for each flight segment, it may be possible to create dynamic, engaging flights and reduce the effort of producing the content to satisfy all the permutations and combinations of a large display network. Once resolved, video segments of transition attributes for appearance and disappearance may be consulted to help control the appearance of multiple segments.

Until now, it has been extremely difficult or impossible to provide this type customized content across a large-scale network because of the enormous manual labor involved with strict playlist-based systems. The introduction of display groups and the recursive nature provides the ability for the display system to make systematic substitutions for content based on a combination of venue attributes, patron interaction, content availability, flight segment mix, etc.

Periodically, during the flight, a segment may resolve to a displayable group that encourages a patron to use the system. Once a system is touched, the flight mode may be altered. Once the user enters browse or search state, resolution and presentation of flight segments may be restricted to content that is of a space and duration appropriate for coexistence with the browse or search screen displays. For example, based on a setting, editorial content segments could be deferred until the end of the interactive session, but advertising result segments could be presented. In different examples, the flight could be interrupted and resume only after the interactive session was completed, or the flight could stop and a new flight specifically intended for presentation during interactive sessions could begin. In any event, the flights may conform to a style that is consistent with attributes of the venue created when last configured.

As identified above, the need for content reducing, personalizing, and/or features is becoming increasingly important as music collections grow in size and diversity. The browse and search features are a part of the new, natural 3D user interface described herein. This user interface is designed to help patrons find new music, re-find forgotten music, create coherent playlists, and/or the like. The new 3D interface is designed to be intuitive, engaging, and entertaining. The following descriptions provide additional details regarding the interactive 3D visualization techniques of certain exemplary embodiments that allow users to explore the overall music space, receive recommendations for music, login to social networking sites, and generate coherent playlist. These descriptions are provided in the context of exemplary browsing and search states mentioned above.

In the browsing state, users can browse the music collection by artist, by album, by song title, or by genre. In terms of exploring the music space, album artwork or jackets have always been a part of local content browsing. However, browsing content residing on the central server relies mainly on artist name. The interface of certain exemplary embodiments may help unify local content and central server content, as well as content available only from social networking sites, via "play-only" licenses (e.g., where content can only be streamed from a source and cannot be saved locally or on a remote server aside, perhaps, from limited music buffering), etc. Thus, music exploration may be driven by a combination of artist name and artist artwork in certain exemplary embodiments. The combination of artist and/or artist artwork based-discovery is advantageous in that there is a trend away from patrons recognizing albums and instead associating music with a strong brand or image (e.g., often an image of an artist, which helps explain the increasing incidence of artists putting their own likenesses on their album covers). For instance, FIG. 6 illustrates browsing a music collection for a given artist in accordance with an exemplary embodiment, and FIG. 7 illustrates browsing a music collection by artist and album in accordance with an exemplary embodiment.

Figure 6:
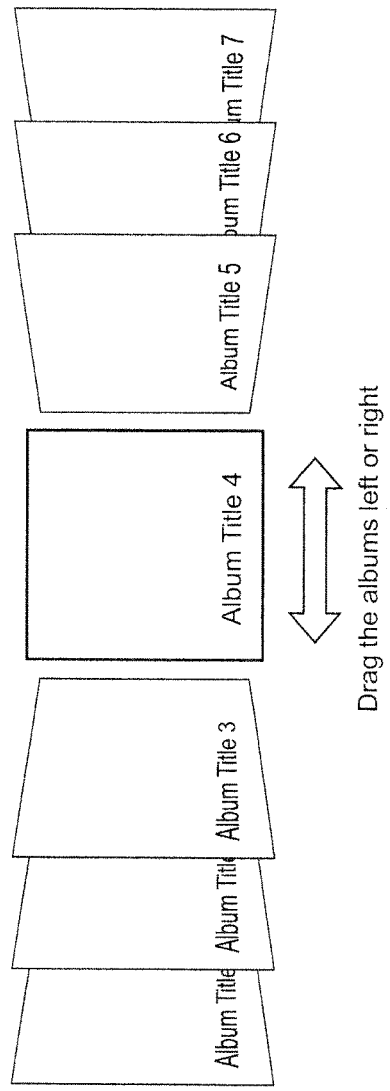
FIG. 6 illustrates browsing a music collection for a given artist in accordance with an exemplary embodiment.

In FIG. 6, for example, a user can drag albums or a screen location to the left or right to "flip through" different albums. FIG. 6 is more "traditional" in the sense that it sorts music for a particular artist by album. Any album may be directly selectable in certain exemplary embodiments, whereas only the center album (which has the focus) may be selectable in certain other exemplary embodiments. In any event, the ability to drag or swipe left and right makes the albums appear as if they are coming into the foreground as the approach the center and are fading into the background as they move away from the center. In this way, it is possible to simulate a more three-dimensional look-and-feel, and provide more of a sense of immersion when interacting with the user interface. In certain exemplary embodiments, similar albums may be grouped more closely to one another, whereas more disparate albums may be located more remote from one another. In certain exemplary embodiments, newer albums may be grouped more closely to one another and/or may be initially provided at the center. In general, general jukebox location and/or user preferences that are specifically entered and/or inferred from actual or predicted usage may be used to control the arrangement of the albums in the continuum presented in the FIG. 6 exemplary embodiment. New music first; most popular music first; user, location, or "hyped" albums first; rarely played albums first; and/or the like are all display/arrangement paradigms that may be specifically entered or inferred from actual or predicted usage and further may be implemented in connection with certain exemplary embodiments. It will be appreciated that multiple albums for multiple artists may be presented in a single FIG. 6 like arrangement, with similar artists and/or albums being grouped together (e.g., based on metadata or user tags associated with the artists, songs, albums, etc.) and/or displayed in accordance with the jukebox location and/or user specific parameters identified above. Furthermore, it will be appreciated that some forms of collections may place more than one object of the collection on each virtual plane of the series of virtual planes. In certain exemplary embodiments, a sort type may be specified or predefined, and metadata associated with the albums, songs, artists, jukebox plays, etc., may be consulted such that a processor of the jukebox is able to automatically generate the order and arrangement for the items to be displayed.

Figure 7:
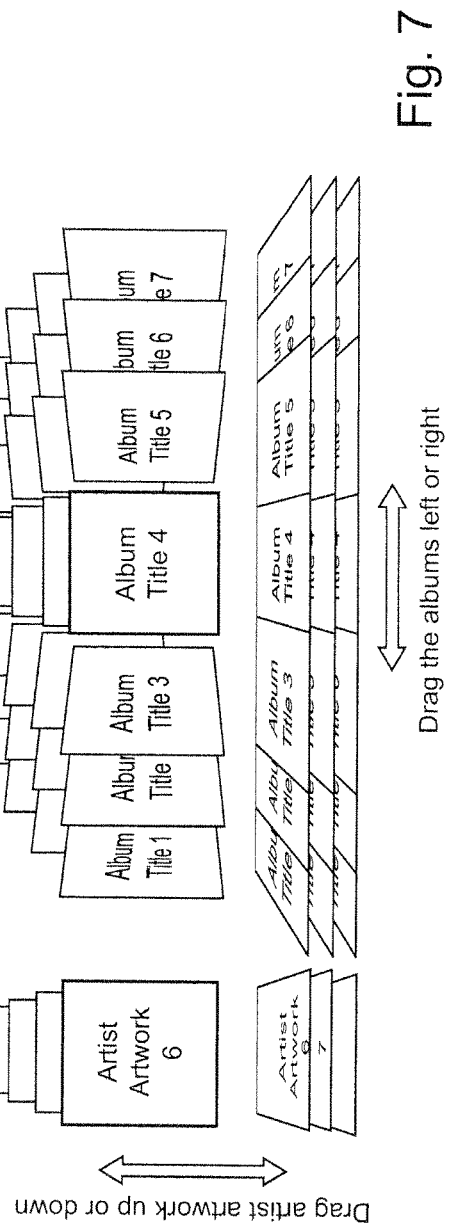
FIG. 7 illustrates browsing a music collection by artist and album in accordance with an exemplary embodiment.

In FIG. 7, each artist is associated with a 3D object representing the artist name and artist artwork. Each artist object can have any number of albums. Albums related to the same artist form a group that satisfies a relationship constraint. When an artist object is moved in the 3D scene, all descendants in the scene graph move with it. The constraint relationships are stored in a graph called the scene graph, described in greater detail below. Similarly, each album may have any number of songs associated therewith. In the FIG. 7 exemplary embodiment, artists can be moved up and down to control inward and outward movement, respectively, and albums can be moved left or right to control the card shuffle like arrangement shown in FIG. 7. The albums displayed may update with the selection of an artist, and/or vice versa. This sort of collection view mode may alter one of more of the images, video segments, and text that is/are presented as the representative of each song, albums, artists, games, or content sources. In one version of the view mode for artists, the artist name may be presented in text along with an image of the artist that is different from an album cover. In one exemplary implementation, this image may be a promotional image that has recently been released by the label and is updated periodically. In certain exemplary embodiments, the collection viewer may not present an artist that does not match a sufficient number of the user recommendation properties regardless of whether it is available through the device or the network service.

The exemplary displays in FIGS. 6 and 7 may be enabled by mapping each axis to a characteristic of the music. For instance, one, two, and three-dimensional displays may enable a user to move in different directions, with each axis being mapped to a particular value in a data set of characteristics, and with the displayed items (e.g., album jackets or other identifiers) being updated as the user interacts with the display. X, Y, and Z axes may be used for a three-dimensional browsing experience, for example. In addition, or in the alternative (e.g., for 2D browsing), size, color, blurriness, and/or other effects may be applied with similar effect. Each element to be displayed may be assigned a depth value for each axis. As on example, album jackets may be displayed alphabetically by artist, song, album name, etc., on a first axis (with the alphabetical order being a first depth value), whereas song release date may be provided on a second axis, etc. (with the year being a second depth value). In this particular example, a user may move left and right to scroll between a first alphabetical arrangement of artists or albums (along the first alphabetical order depth value), whereas the user may move in or out to move forward or backward in time (along the second year depth value), e.g., to provide a sense of time tied to song or album release date, etc. This may help create the sensation of a curated, temporal browsing experience.

Of course, it will be appreciated that other characteristics also may be used such as, for example, beats per minute, genres, etc. It also will be appreciated that the depth values may be numeric in nature (e.g., as in the case with release date), representable in connection with numeric values (e.g., for names), or discrete in nature (e.g., for genres). For discrete values, discrete selections may be made. However, even discrete values like genres can be represented on a continuum, as rap and hip hop may be thought of as being "closer" to one another than they are to country or zydeco, for example.

The characteristics that are used to assign depth values may be obtained as metadata, e.g., from an outside provider, gathered from social networking cites (e.g., by examining a recognized jukebox user's preferences, "favorites," "pages," etc., and expanding that search outwardly to the user's friends' preferences up to a predetermined number of degrees), developed based on the usage of one or more jukeboxes, etc. The originating metadata may be stored in a database or other suitable non-transitory computer readable storage medium. It may be incorporated into the music catalog directly, a link to the originating metadata source or an outside data structure having the depth values may be incorporated into the music catalog or accessed by the jukebox upon a corresponding display request, etc. Further information regarding potential metadata sources is provided below.

In certain exemplary embodiments, a jukebox device comprises a display; a non-transitory computer readable storage medium storing a plurality of instances of media available for playback on or via the jukebox device; and at least one processor configured to cause a user interface to be displayed on the display and further configured to respond to inputs to the user interface. The user interface comprises a display area including virtual axes defining a coordinate space in which individual song, artist, and/or album items are to be displayed. Each individual song, artist, and/or album item has a plurality of characteristics associated therewith, each said axis is associated with one of said characteristics so that each individual song, artist, and/or album item has a defined location in the coordinate space. The display area is updatable in response to user input corresponding to movement within the coordinate space. The coordinate space may be two-dimensional, three-dimensional, substantially linear, etc., in different embodiments.

In certain implementations, items are arranged alphabetically along a first axis and chronologically along a second axis. In certain implementations, a release date associated with the item determines the item's positioning along the second axis. Discrete areas of one said axis may be designated for a predefined arrangement of discrete genres, and the predefined arrangement of discrete genres may be decomposable into a predetermined sub-arrangement of discrete sub-genres. The discrete genres may be grouped such that based on degrees of similarity therebetween such that similar genres are provided in closer relative proximity to one another as compared to disparate genres. Elements may be grouped alone one axis based on popularity in certain exemplary embodiments.

Song items may be selectable so as to trigger their playback, display a popup screen enabling the user to confirm that the selected song is to be played back, etc. Upon detecting an album or artist selection, movement within the coordinate space may be caused such that the selected item is centered therein.

Methods of making and/or using such jukebox devices also may be provided, as may non-transitory computer readable storage mediums tangibly storing instructions for using such jukebox devices/providing such user interfaces. Jukebox systems including plural jukebox devices, for example, also may be provided in different exemplary embodiments.

Similarly, having a database that contains a set of user or automatically generated descriptive words or "tags" associated for each artist, album and song titles, may enable certain exemplary embodiments to visually represent music collections in an interesting way. For instance, FIG. 8*a* illustrates a set of eight (8) example tags associated with "artist 6" in accordance with an exemplary embodiment. Each time a user presses and holds a music object such as artist artwork (e.g., in FIG. 6 or in FIG. 7), an album artwork or a song title label for a period of time greater than a predefined threshold, a set of floating objects may be displayed, e.g., as shown in FIG. 8*a*.

Each tag may be represented by one of the floating objects. The size of the floating objects may in certain exemplary embodiments correspond to the weight of the tag. The weight may represent how important or relevant that word is for that music object. The weighting may be determined by a source such as an authorized user, based on an aggregation of user-specified tags, a predefined formula that balances factors such as, for example, genre, release date, user-specified information, etc. The tags may be based on how many people have tagged an item a certain way, how a trusted metadata source has tagged it, etc.

Clicking on one floating object may in certain exemplary embodiments display more music objects sharing the same tag. The resulting collection may represent similar artists, albums, or songs by means of the selected tag. For example, clicking on tag 3 in FIG. 8*a* may present a collection of artists filtered by tag 3 using a user interface depicted in FIG. 6.

Figure 8B:
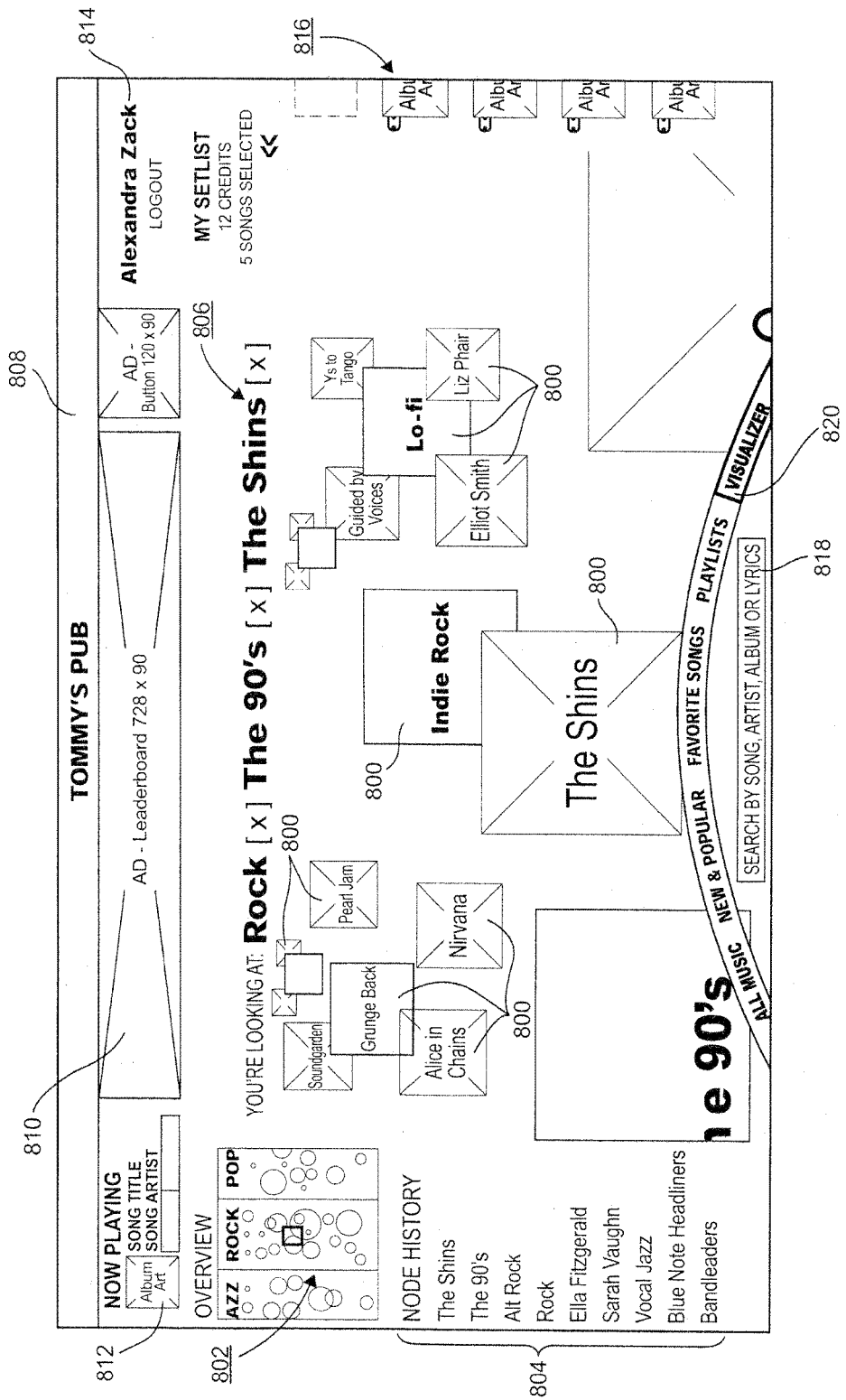
FIG. 8b is a wireframe used to construct an example music map on a jukebox display in accordance with an exemplary embodiment.

FIG. 8*b* is a wireframe used to construct an example music map on a jukebox display in accordance with an exemplary embodiment. Among other things, the FIG. 8*b* screen represents a "visualizer" display in accordance with the display techniques described above. In the FIG. 8*b* example, a main area provides a three-dimensional user interactable area. Items are arranged and displayed in accordance with the techniques described above. An overview area 802 provides the user with an intuitive feel as to how the display is organized on a larger basis showing, for example, the elements within genres (jazz, rock, and pop), how those elements have relative sizes and locations, how the genres are related or organized in relation to one another, etc. These nodes 800 may be user selectable so as to traverse genres, artists, albums, etc., and they may be sized base don tags, e.g., as described above. A "node history" section 804 provides a search history that is related to the user's movements (and thus implied search methodology) and enables quick jumping back to locations within the overall music map. Breadcrumbs 806 may display a more focused path rather than a more detailed traversal of all nodes visited, e.g., as in the node history section 804.

The illustrative wireframe shown in FIG. 8*b* includes other elements such as, for example, a leader 808 indicating the name of the establishment, a main advertisement leaderboard 810, an indication of the song currently playing 812, an indication of the user current logged in 814, and a "set list" 806 of the user. Further details regarding set lists are provided below. A text-based search area 818 also is provided, as is a multi-area semi-circular display for enabling a user to select different collections and/or sort different selected collections.

The questions of what media is to be displayed and how such media is to be displayed have been partially answered above. However, a more complete description will be provided below. With respect to the former question, location-specific inclusion criteria may be specified and matched with song metadata so as to define a "rough" master list for a location in certain exemplary embodiments. This location-specific master list may be "refined" based on metadata associated with a recognized user and/or based on jukebox usage over time in certain exemplary embodiments. Finally, the location-specific mater list (with or without having been refined with recognized user information) may be wholly or partially overridden by a custom-defined event (e.g., a disco or other theme night, private party, etc.).

With respect to the latter question as to how media is to be displayed, it will be appreciated that the emphasis of certain exemplary embodiments evolves away from album art and towards "stronger" identities or branding associated with an individual song or groups of songs and typically associated with an artist or an artist's likeness. In any event, a "rough" ordering may be based on location-specific criteria such as, for example, newest music first, Billboard's most popular music first, most popular at location last, etc. As above, this information may be "refined" based on metadata associated with a recognized user and/or based on jukebox usage over time in certain exemplary embodiments. For instance, criteria may be new music first, pop music last, music played by, listened to, or rated highly by friends (and friends' friends, etc.) first, music most played on MySpace first, etc. And, as above, overriding event parameters also may be provided (e.g., to place an emphasis on new music, independent artists, 80s hair bands, etc.).

Figure 9:
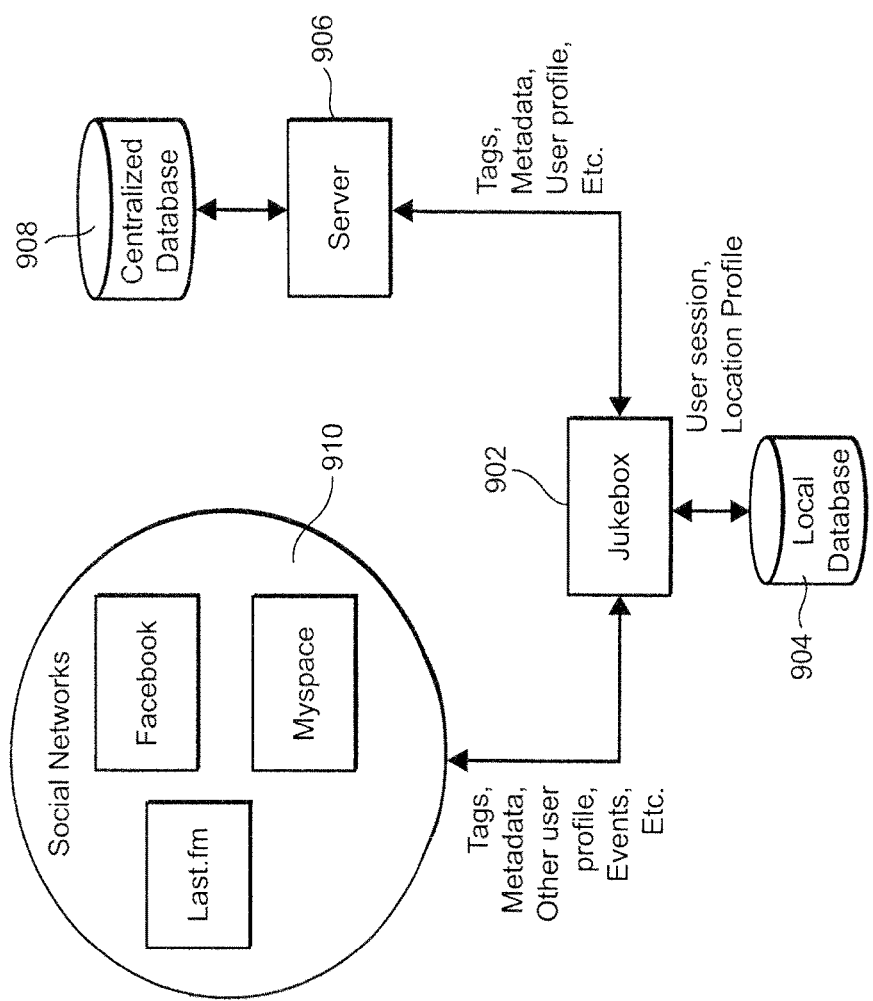
FIG. 9 is a block diagram illustrating one arrangement that may enable custom browse state and other features to be implemented in accordance with an exemplary embodiment.

FIG. 9 is a block diagram illustrating one arrangement that may enable custom browse state and other features to be implemented in accordance with an exemplary embodiment. In FIG. 9, a jukebox 902 is connected to a local database 904 that stores content. This local database 904 may be integrated in to the jukebox 902 in certain exemplary embodiments. The jukebox 902 itself provides a user session and at least initially receives information regarding the location's profile. The location's profile information ultimately may be uploaded to a central server 906 to which the jukebox 902 is connected. The central server 906, in turn, may be operable connected to a centralized database 908 of media, and it may store tag, metadata, user profile, and/or other information. As shown in FIG. 9, the jukebox 902 is directed connected to social networks 910 such as, for example, MySpace, Facebook, Last.fm, and/or the like. Each of these social networks may maintain its own tag, metadata, user profile, event, and/or other information. A middleware component (not shown) may help the jukebox interface with the social networking sites and the information associated therewith (e.g., to search for, retrieve, update, and/or otherwise manipulate the data). In certain exemplary embodiments, the jukebox 902 may not be directly connected to the social networks 910 and, in certain exemplary embodiments, the central server 906 may function as a gateway to the social networks 910. This arrangement may be advantageous in certain exemplary implementations, as the central server 906 may serve as a buffer or de facto firewall between the social networking sites 910 and the jukebox 902. This arrangement also may be advantageous in certain exemplary implementations, as the data retrieved from the social networking sites 910 may be of potential value to multiple jukeboxes (e.g., in a broader jukebox system), and storing and processing this information on a central server 906 may be desirable to reduce the loads on individual jukeboxes, particularly where common information can be shared.

In certain exemplary embodiments, a method of recommending a song to a user is provided. The method may comprise: enabling a user to log in to a jukebox device; determining musical preferences of the user based on a social networking site profile of the user, the social networking site profile identifying at least one artist, song, and/or genre; providing the determined musical preferences of the user to a recommendation engine to develop at least one recommendation; and providing the recommendation to the user on the jukebox device.

In certain exemplary embodiments, musical preferences of friends of the user may be determined based on social networking site profiles of the friends, and the determined musical preferences of the friends of the user may be provided to the recommendation engine in developing the at least one recommendation. The determining of the musical preferences may be expanded to friends of the user and friends of friends within a predetermined number of degrees of separation (e.g., 1, 2, etc.), and the expanded determinations may be provided to the recommendation engine in developing the at least one recommendation.

Profile information corresponding to the location in which the jukebox device is located also may be of use in developing the at least one recommendation. Such profile information may be maintained on a central server, for example and, similarly, at least one processor of the central server may help determine musical preference data via a social networking interface provided thereto. In certain example embodiments, a plurality of social networking sites may be consulted to determine musical preferences of the user, with each said social networking site having an associated social networking site profile for the user.

Methods of making and/or using such jukebox devices also may be provided, as may non-transitory computer readable storage mediums tangibly storing instructions for using such jukebox devices/providing such user interfaces. Jukebox systems including plural jukebox devices, for example, also may be provided in different exemplary embodiments.

Having a collaborative filtering engine based on the listening behaviors of other media consumers and a tagging system as described above may allow certain exemplary embodiments to represent the recommended media collections in a 3-dimensional space. One issue for a collaborative filtering engine is the need for a significant amount of data to provide good recommendations. For new media or media with few consumers, conventional engine oftentimes cannot generate good recommendations. Certain exemplary embodiments address these shortcomings by recommending media upon the similarity of tags that have been applied to the media.

Figure 10:
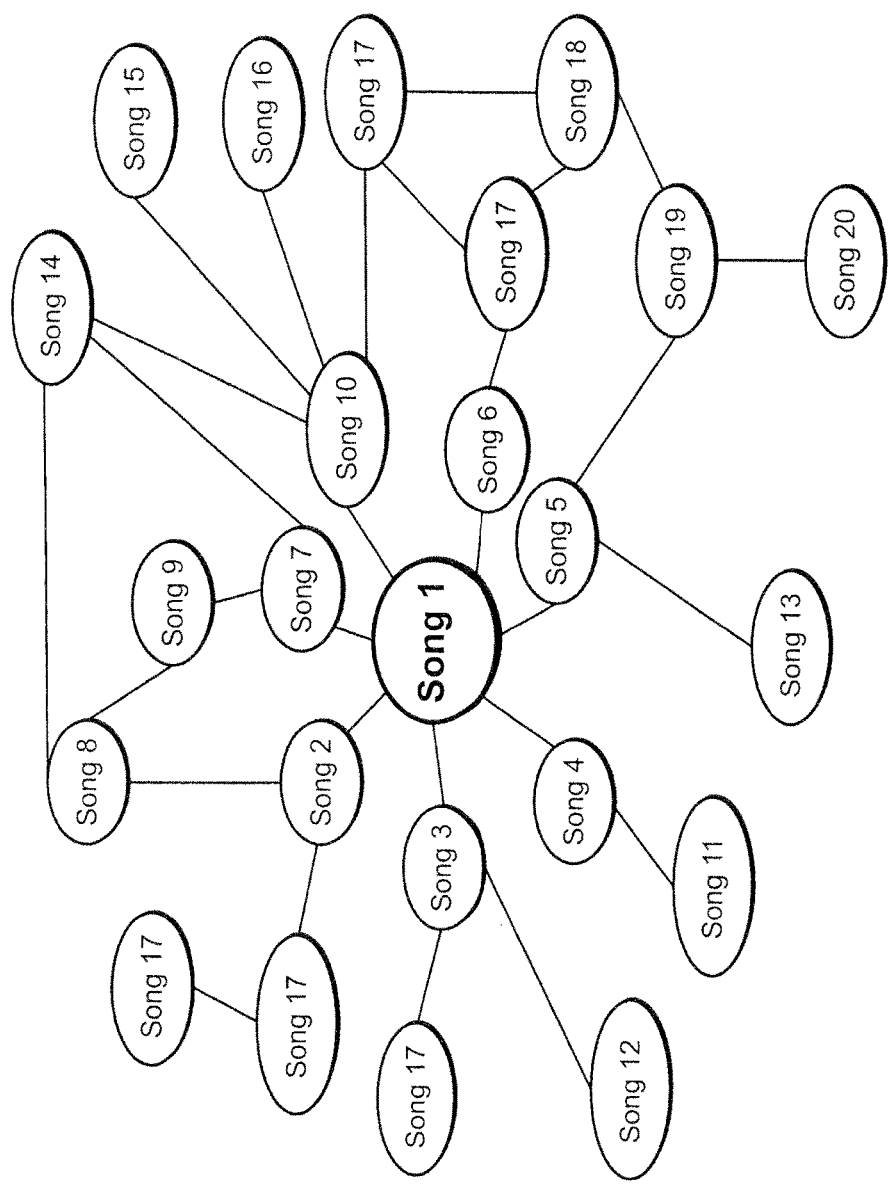
FIG. 10 shows a 3D visualization of a recommended song collection in accordance with an exemplary embodiment.

FIG. 10 shows a 3D visualization of a recommended song collection in accordance with an exemplary embodiment. Songs objects 2, 3, 4, 5, 6, 7, 10 that are close to song object 1 represent the following paradigm: customers who listen to song (A) also listen (or are likely to listen) to song (B). A size dimension may be introduced in certain exemplary embodiments, wherein larger objects represent more frequently played or otherwise favored songs. When a user clicks on a "Generate Playlist" or similar button, the user may select two "end" song objects in the recommended collection. This may prompt the system to generate a path through the collection that connects the closest song object together. This may be accomplished using, for example, a suitable algorithm such as a breadth first search, depth first search, Bellman-Ford, Dykstra, etc. The resulting playlist may be presented to the user for approval, modification, rejection, etc. in different embodiments of this invention. In certain example embodiments, the songs may correspond to nodes in a graph, whereas the size of the songs may represent weights or distances between adjacent nodes or to a center node. Of course, the same or similar techniques may be used for artists, albums, genres, and/or the like.

Once a user is identified, the system provides ongoing application and/or tracking of the individual's musical preferences and affinities. For instance, certain exemplary embodiments may provide artist and song recommendations produced through the aggregation of the individual's explicit selections, metadata-based associations, social network suggestion indicators, and/or the like. As musical tastes are varied, the system may maintain a list of the individual's "core" affinities. Such core affinities may be an artist, artists similar to a specific artist, a song, songs similar to a specific song, musical selections of another individual or individuals (e.g., as available from a social network music site or sites), recommended artists or recommended songs from user-identified music sites, etc. Any match from a user's musical taste web and the music catalog available from the device or from a server or servers providing music catalog may in certain exemplary instances result in a subset of the music, presenting material that has matched the user explicit, user metadata, user social network friends recommendation, and user music site recommendations. As will be further described below, this music may be a compared with the music library available at a given site, and the overlap of these two groups may be presented for user selection.

Further details of an exemplary search state will now be provided. A search typically would be initiated to enable a user to find a list of songs, or a single song, that the user would like to play or add to a collection. Oftentimes, the user does not know the correct spelling of the artist, album, or song. Or the user may know the name of a particular artist but does not necessarily know the exact group or band with which the artist recorded a particular song. Moreover, a user often remembers particular lyrics to a song but not necessarily the song title itself. As still another example, a song may be memorable because of its association with a movie or television show. This information has been very difficult to obtain before the development of entertainment websites focused on providing additional details surrounding the use of music, its popularity, its lyrics, the artists involved in its creation, important performances of the work, and many other music related data. A search using the techniques described herein could help overcome these and/or other challenges.

To accomplish this type of search, artist and song related metadata may be collected from a variety of sources. Searchable criteria may include song genre, popularity (high ranking or frequent presence) on a particular source within a particular time frame, etc. A user may select the song criteria (for example "country"), the timeframe (e.g., "today"), and the source (e.g., heard on "MySpace"). The qualifiers may appear as optional selection buttons offering a choice for each selection criteria.

As public sources for music information become available, a metadata collection system may help provide a relevant source for data ingestion. For instance, users may be able to identify their music styles, e.g., by drawing on source and social data that is relevant to them. An example music style search tool may provide a broad variety of sources, along with a very granular genre and subgenre selection, and/or other music attributes. Further data regarding a song, for example, may be provided by an outside service (e.g., title, artist, album, label, genre, theme, etc.), or may be determined from the instance of media itself (e.g., tempo or beats per minute, instrumentation, etc.).

Figure 11:
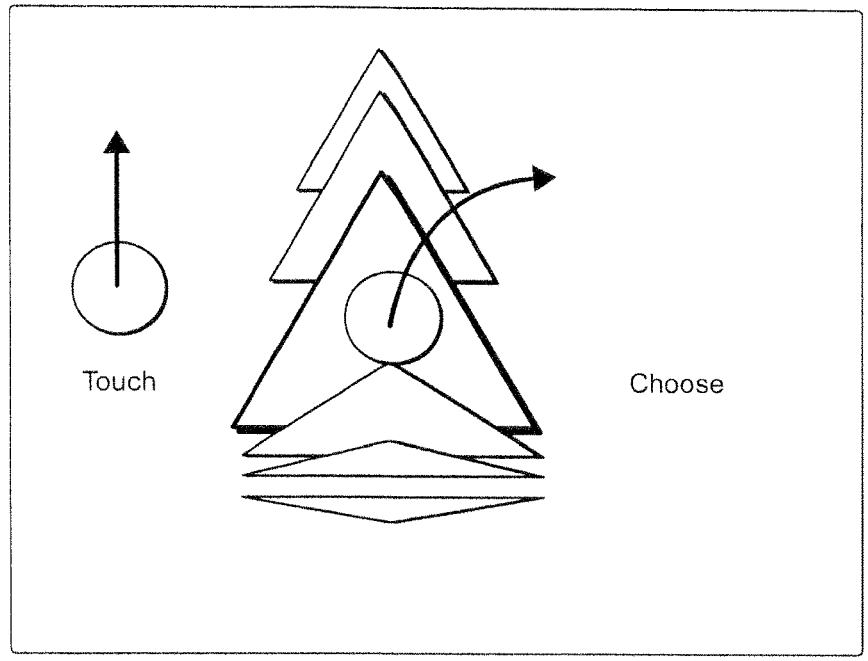
FIG. 11 is an illustrative screen showing how objects may be navigated in accordance with an exemplary embodiment.

FIGS. 11-14 illustrate how media may be searched in accordance with an exemplary embodiment. In particular, FIG. 11 is an illustrative screen showing how objects may be navigated in accordance with an exemplary embodiment. The objects in FIG. 11 are represented by triangles, and the objects may correspond to individual or collections of artists, albums, themes, genres, songs, etc. The order in which objects are presented may be determined as specified above. A user may navigate the collections in a 3D-like manner by swiping up or down to "zoom" in or out. Pressing and holding or dragging a particular object to a blank area may indicate a selection.

Figure 12:
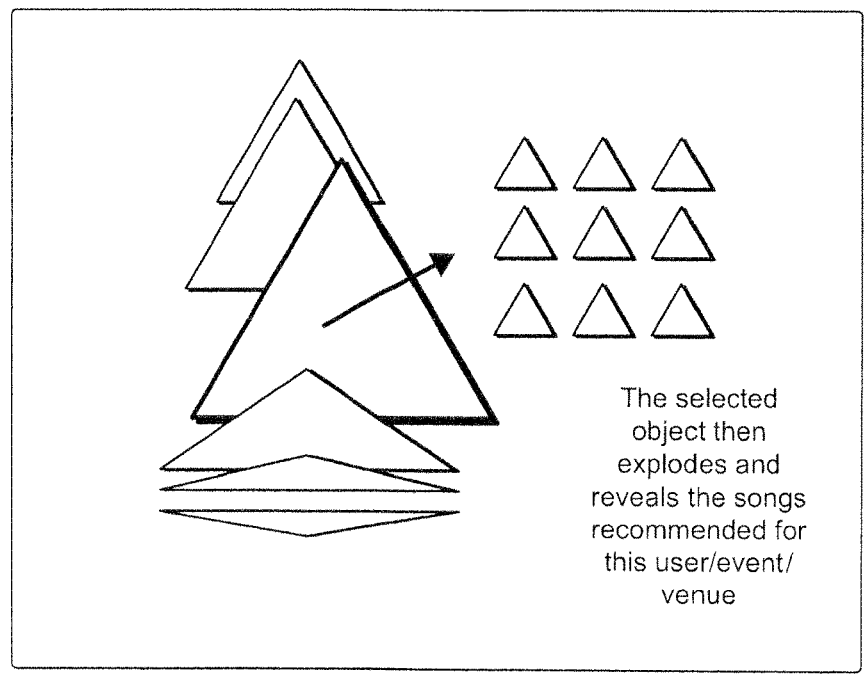
FIG. 12 is an illustrative screen showing how an object may be expanded upon selection in accordance with an exemplary embodiment.

In this regard, FIG. 12 is an illustrative screen showing how an object may be expanded upon selection in accordance with an exemplary embodiment. For instance, once an object is selected, it may "explode" to reveal the songs associated with the selected object. This may include, for example, songs recommended for the user, event, and/or venue. The recommendations may be based on a combination of the location- and user-specific metadata, as well as any relevant event information, as compared with metadata and/or tags associated with the instances of media themselves.

Figure 13:
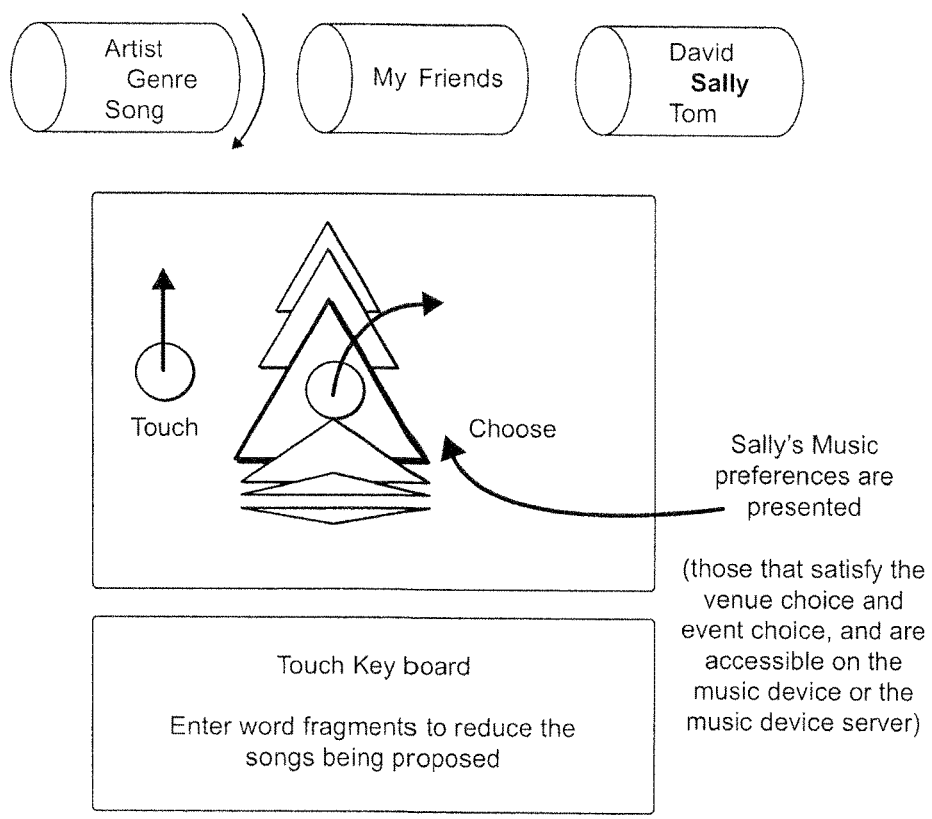
FIG. 13 is another illustrative screen showing how objects may be navigated in accordance with an exemplary embodiment.
Figure 14:
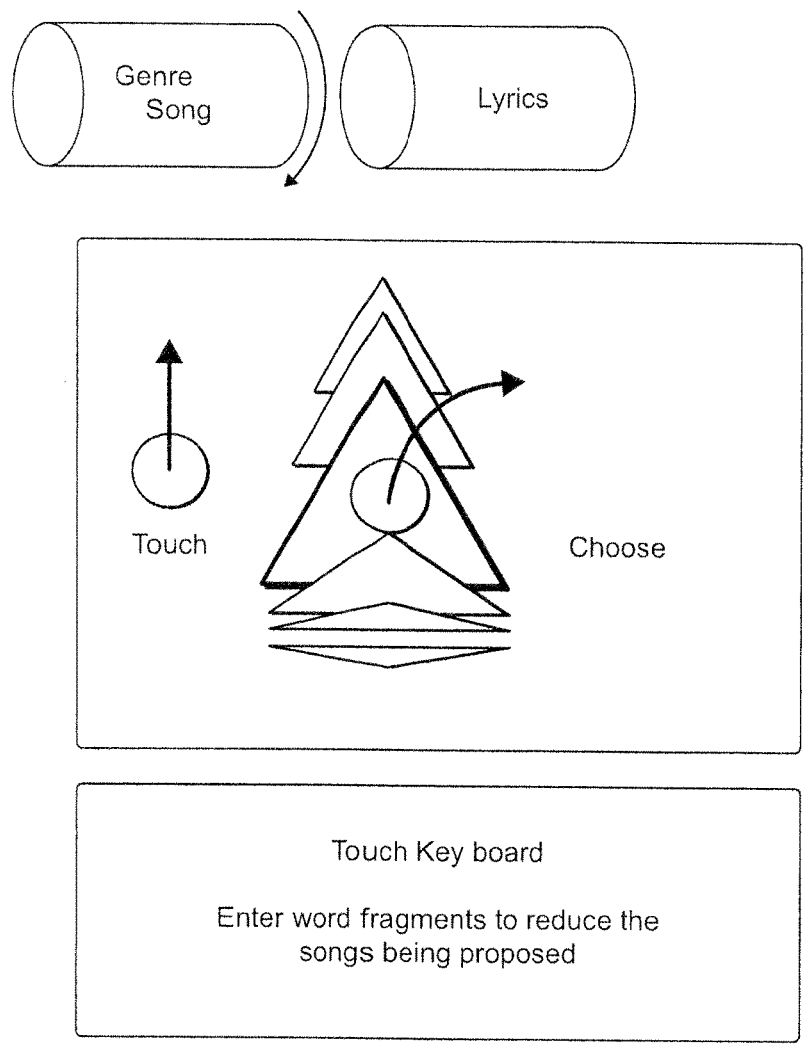
FIG. 14 is an illustrative screen showing how a user may enter lyrics to reduce the number of songs being proposed for playback in accordance with an exemplary embodiment.

FIG. 13 is another illustrative screen showing how objects may be navigated in accordance with an exemplary embodiment. In FIG. 13, a user may rotate wheels to specify, for example, whether the objects represent artists, genres, or songs; whether the instances of media are to be associated with friends of a recognized user and, if so, which friend; etc. In general, this mode selection action alters the collections being presented as objects. For example, a mode choice of artist could in certain exemplary instances replace a series of album object virtual pains with a series of artist object virtual pains (e.g., all subject to preferential filtering). In the case of FIG. 13, the objects represent genres, the genres are limited by the recognized user's friends' genres, and the particular friend is Sally. As such, Sally's genres are retrieved. However, only those genres that satisfy the venue's choice and the event parameters, are present on the music device or music device server, etc., are made available for expansion (e.g., as explained above). The FIG. 13 example also enables a user to enter word fragments (e.g., song names, genre names, lyrics, etc.) to reduce the songs being proposed for playback. FIG. 14 is similar to FIG. 13, except that FIG. 14 is an illustrative screen showing how a user may enter lyrics to reduce the number of songs being proposed for playback in accordance with an exemplary embodiment.

Figure 15:
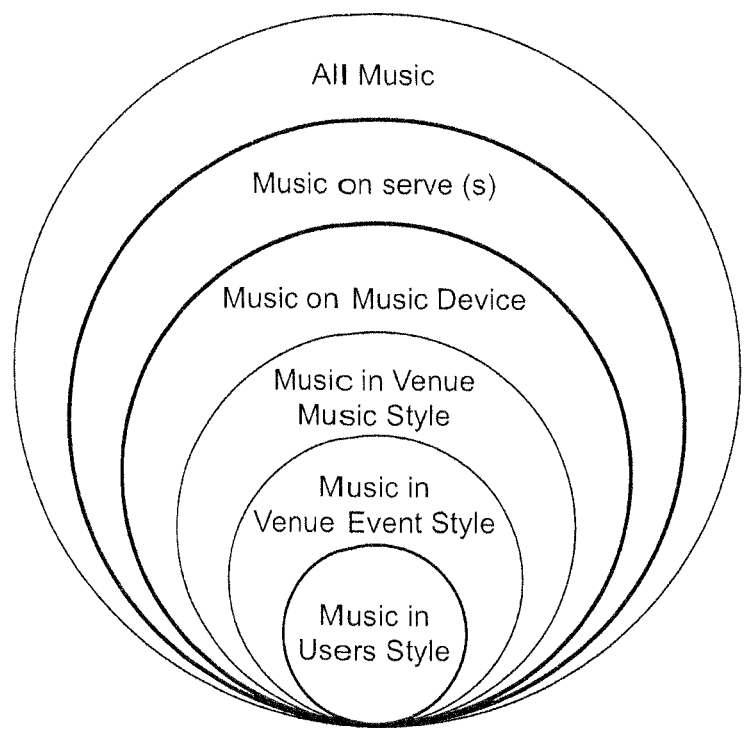
FIG. 15 is a schematic representation showing how songs may be selected for presentation to a user in accordance with an exemplary embodiment.

If the user is simply searching for songs, songs that are present on music device or available from the music device server may be reduced from the domain of all music as follows: availability on the server, availability on a music device, present in venue music style group, then optionally, all music available for this user, or music from my Music Style as recorded on my profile. FIG. 15 is a schematic representation showing how songs may be selected for presentation to a user in accordance with an exemplary embodiment. In the FIG. 15 example arrangement, starting with the largest sphere and moving inwardly, the collections include all music, music on a server, music on a music playback device, music in the venue's music style, music in the venue's particular event style, and music in the user's system. This or a similar scheme may also be used for browsing and/or other features of the jukebox. For example, it will be appreciated that music may be limited in different orders, some of the limiting spheres may not be applied, different limiting spheres may be applied, etc., in different embodiments of this invention.

Figure 16:
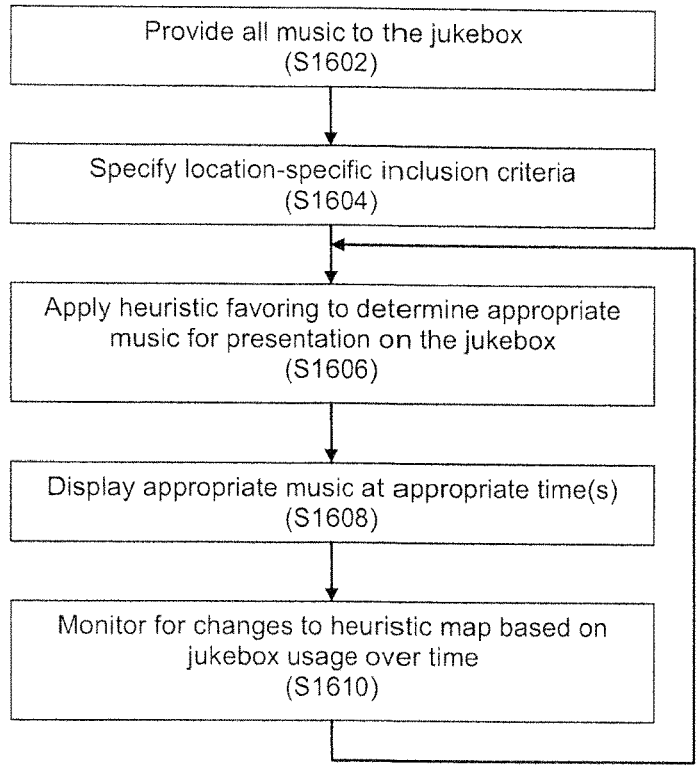
FIG. 16 is a flowchart illustrating an example process for determining which content should be available for playback on a jukebox based on location-specific inclusion criteria and actual jukebox usage in accordance with an exemplary embodiment.

FIG. 16 is a flowchart illustrating an example process for determining which content should be available for playback on a jukebox based on location-specific inclusion criteria and actual jukebox usage in accordance with an exemplary embodiment. All music is initially provided to the jukebox in step S1602. For instance, instances of media from the central server and/or a local server are at least initially available. Inclusion criteria is then specified by an authorized person such as a bar manager, etc., in step S1604. The inclusion criteria may be location specific in the sense that the inclusion criteria may not be relevant to other locations. For instance, an authorized person may specify inclusion criteria including one or more genres, plus the Billboard top 100, plus media associated with five friends. Once the inclusion criteria has been specified, in step S1606, a heuristic is applied to determine the appropriate music for presentation on the jukebox. The heuristic may build a "map" of acceptable media for playback. In certain exemplary embodiments, the heuristic may operate such that each song is assigned a likelihood that it would be desirable for play at a location, and each likelihood may have a confidence level associated therewith. A first rule for certain example implementations is that if there is doubt as to whether the song should be included or removed, then the song should be included. In certain exemplary embodiments, this may mean that if either the likelihood for inclusion meets or exceeds a predetermined threshold or the confidence level is at or below a certain threshold, then the song should be included. A second rule certain example implementations is that songs should be removed if they fall below a certain likelihood for inclusion along with a certain confidence. The scale may be adjustable over time as more and more data is acquired. In other words, the requirement for confidence may be lessened as more and more data is acquired. Certain exemplary embodiments aim to avoid offering a song that a patron has no link to, although this may not always be possible since a patron's decisions are not completely predictable. In any event, the appropriate music is displayed at the appropriate time(s) in step S1608, e.g., as a result of a search, browse, etc. The system may monitor for changes to the heuristic map based on jukebox usage over time in step S1610 and update the mapping accordingly, e.g., by returning to step S1606. It will be appreciated that the system may become "smarter" or "learn" over time, e.g., as more and more data is input.

In certain exemplary embodiments, a logit and/or probit calculation may be made for each song to determine the likelihood of leaving it in or removing it as an option for playback. The location information may be used to define the overall domain of the location or, in essence, setup the overall "vibe" of place.

In one or more steps not shown in FIG. 16, event information, if any, may be used to further restrict the overall environment, at least temporarily. In such cases, event information may provide an optional override, even to the overall "vibe" criteria. Similarly, in one or more steps not shown in FIG. 16, the system may be provided with the programmed logic circuitry for individually filtering/sorting media based on user-specific metadata. This user-based information may not necessarily as important as the overall vibe criteria in certain example implementations, but certain exemplary embodiments want to provide the opportunity to drill down and provide more detailed recommendations based on layers and layers of tags and/or metadata associated with the users and/or songs.

Figure 17:
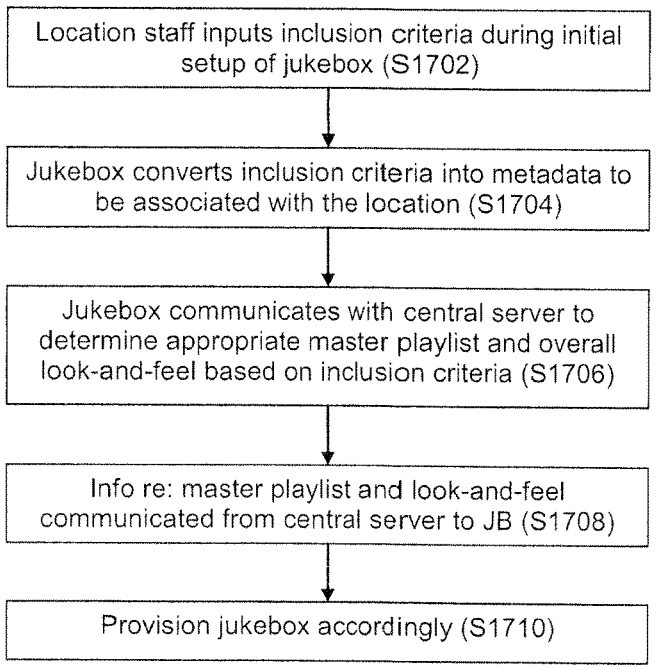
FIG. 17 is a flowchart illustrating an example process for initially setting up a jukebox in accordance with an exemplary embodiment.

FIG. 17 is a flowchart illustrating an example process for initially setting up a jukebox in accordance with an exemplary embodiment. In step S1702, an authorized user (e.g., location staff member) inputs inclusion criteria during initial setup of jukebox. The inclusion criteria may be indicative of the type of location (e.g., Irish bar, hip hop dance club, country line dancing, biker bar, ultralounge, etc.), characteristics or demographics of typical patrons (e.g., age range, race/ethnicity, etc.), content ordering preferences (e.g., most popular first/last, newest first, etc.), etc. The jukebox then converts the inclusion criteria into metadata to be associated with the location in step S1704. This information is then communicated to the central server to determine the appropriate master playlist and overall look-and-feel for the jukebox based on inclusion criteria in step S1706. This process may include matching metadata associated with the location to metadata and/or tags associated with songs, the metadata/tags possibly being stored in a jukebox database of the central server, on social networking sites, and/or the like. Furthermore, additional information may be retrieved from external sources, as appropriate, and matching may then be performed on this further information. For instance, certain exemplary implementations may retrieve information from social networking sites, Billboard, etc. In this way, it may be possible to glean information regarding pure buzz or hype, popularity, etc. The need for determining whether to reach out to external sources may be based in part on a recognized user's information and/or recognized users' information may be a source of data in itself. It will be appreciated that the central server may have a plurality of predefined categories and/or channels in certain exemplary embodiments, and the jukebox may select one or more appropriate category(ies)/channel(s) in such embodiments based on the matching. In any event, information regarding the master playlist and look-and-feel for jukebox is communicated from the central server to the jukebox in step S1708, and the jukebox is provisioned accordingly in step S1710. The provisioning may including setting the flight state content and/or flight state content source, setting the master music library for the jukebox, setting the "skin" for the jukebox, etc. It will be appreciated that steps S1706 to S1710 may be performed periodically or dynamically to help ensure that the jukebox is up to date and providing appropriate music.

Figure 18:
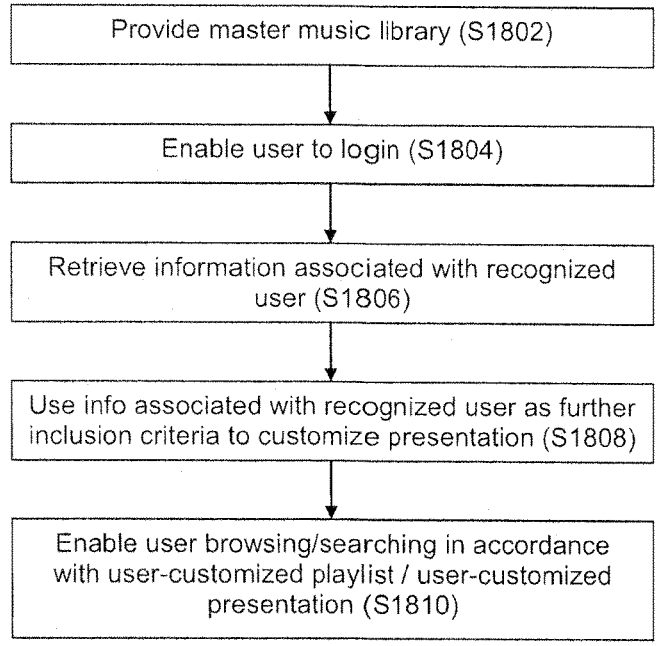
FIG. 18 is a flowchart illustrating an example process for customizing the display for a recognized user in accordance with an exemplary embodiment.

FIG. 18 is a flowchart illustrating an example process for customizing the display for a recognized user in accordance with an exemplary embodiment. The master music library is provided in step S1802, e.g., in accordance with the FIG. 17 example process. In step S1804, the user logs in. In step S1806, information associated with recognized user is retrieved. Such information may be stored locally on the jukebox, in the central server, on a social networking site, etc. Such information may include user-specified information concerning song plays, preselected favorites (e.g., artists, songs, albums, genres, etc.), demographics, etc. Such information also may include information gleaned from jukebox usage over time (e.g., the user prefers newest music, prefers particular order, only likes certain music at certain times/days/locations, etc.). The information associated with he recognized user is used as further inclusion criteria to customize selections for the user in step S1808. Such information may be used to further limit playlists, make "appropriate" recommendations, order or reorder the media presented to the user, etc.

In steps not shown, but as a process associated with step S1808, the jukebox may communicate with the central server to determine appropriate user-customized playlist/user-customized presentation based on recognized user inclusion criteria. Similar to the above, this sub-process may involve matching metadata associated with the recognized user to metadata and/or tags associated with songs. Further information may be retrieved from external sources, as appropriate, and then matching may also be performed on this further information. For instance, it is possible to gather information from social networking sites, one or more specified social network sites or sites of which user is a member, etc. User's data, user's friends' data, users' friends' friends' data, etc., may be of interest. This information may be communicated regarding the user-customized playlist/user-customized presentation may be communicated from the central server to the jukebox, and the jukebox may be provisioned accordingly, as above. Similar to the above, this may be performed periodically or dynamically (e.g., on recognized user login). Ultimately, in step S1810, user browsing and/or search is enabled in accordance with the user-customized playlist/user-customized presentation.

Figure 19:
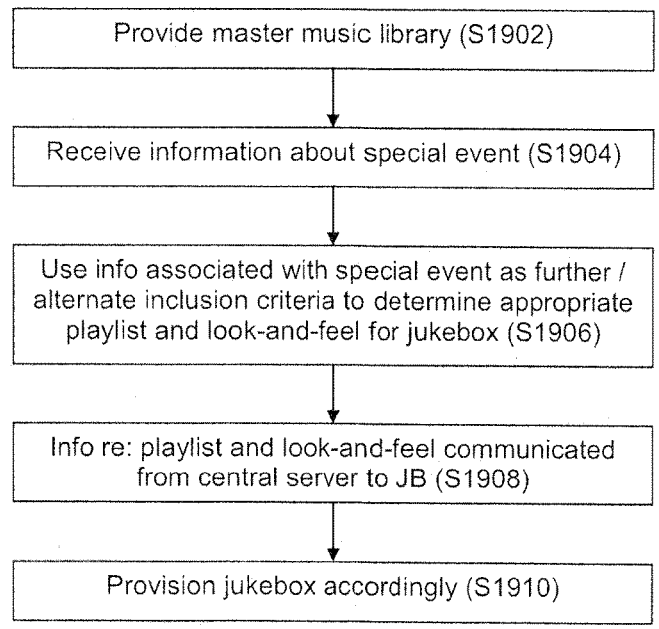
FIG. 19 is a flowchart illustrating an example process for customizing the display for a special event in accordance with an exemplary embodiment.

FIG. 19 is a flowchart illustrating an example process for customizing the display for a special event in accordance with an exemplary embodiment. The master music library is provided in step S1902, e.g., in accordance with the FIG. 17 example process. Information about the special event is received in step S1904. Such information may include, for example, information about the type of event (e.g., a private party with a DJ, disco night, rave night, etc.), the duration of event, whether the event recurs, etc. In step S1906, the information associated with the special event is used as further/alternate inclusion criteria when the jukebox communicates with the central server to determine appropriate playlist and look-and-feel for the jukebox. For instance, the further inclusion criteria may further limit playlists or sometimes generate a new master music library, make recommendations appropriate for the event, order or reorder media appropriately, etc. Information concerning the event playlist and look-and-feel for the jukebox is communicated from central server to the jukebox in step S1908, and the jukebox is provisioned accordingly in step S1910.

In one or more steps not shown, user login may be enabled. However, some or all of the recognized user functionality may be overridden by virtue of the event taking place. That is, the jukebox system may or may not perform further limiting and/or make suggestions based on the recognized user information. Similarly, the jukebox system may or may not use other user preferences gleaned from general JB usage to provide recommendations/reordering.

Figure 20A:
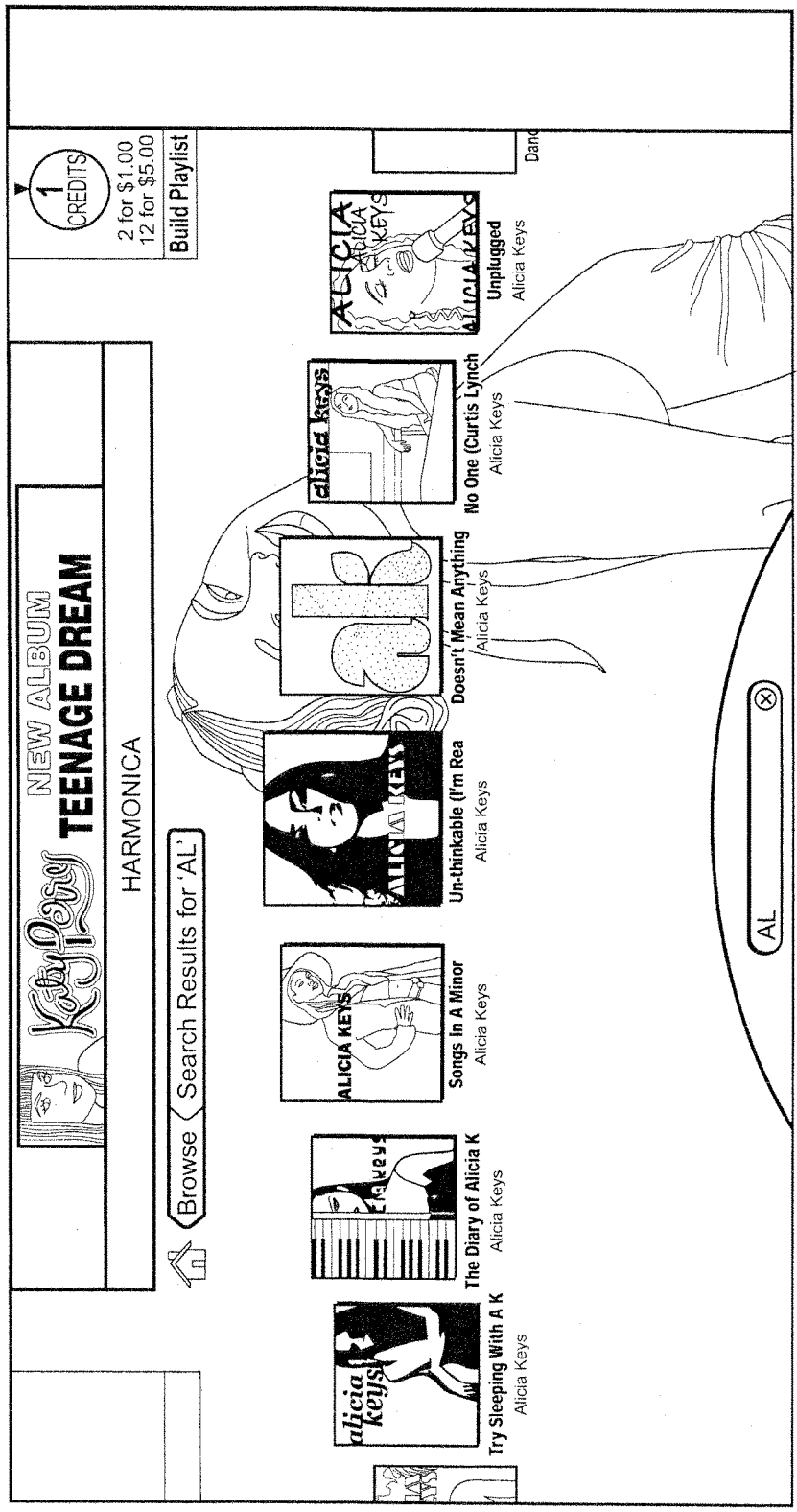
FIG. 20a is a first example "artist portal" in accordance with certain exemplary embodiments.

In certain scenarios, a user may search for a particular artist, e.g., to search for all albums or songs that artist has provided. In such a case, the jukebox may update its display and to become more suitable for the particular artist, album, genre, etc. For example, FIG. 20a is a first example "artist portal" in accordance with certain exemplary embodiments. In the FIG. 20a example, a user has searched for all albums by Alicia Keys. This may cause a change to the display in terms of, for example, the underlying or background image, the color scheme of the user interface, the wireframe layout of the elements on the display, the external lightshow, etc. In the FIG. 20a example in particular, an image of Alicia Keys is displayed as a high resolution underlay beneath the user interface. The albums from the artist's oeuvre are the only one displayed because they are the only ones that match the search. The color scheme has become a more black and white color scheme, e.g., in accordance with Alicia Keys' Internet presence. In certain exemplary embodiments, a link to the artist's homepage, Facebook or other social networking or other site also may be provided. In keeping with the simplified look-and-feel of the Alicia Keys' Internet presence, many optional control elements (e.g., as shown and described in connection with the FIG. 8b arrangement) may be omitted.

Figure 20B:
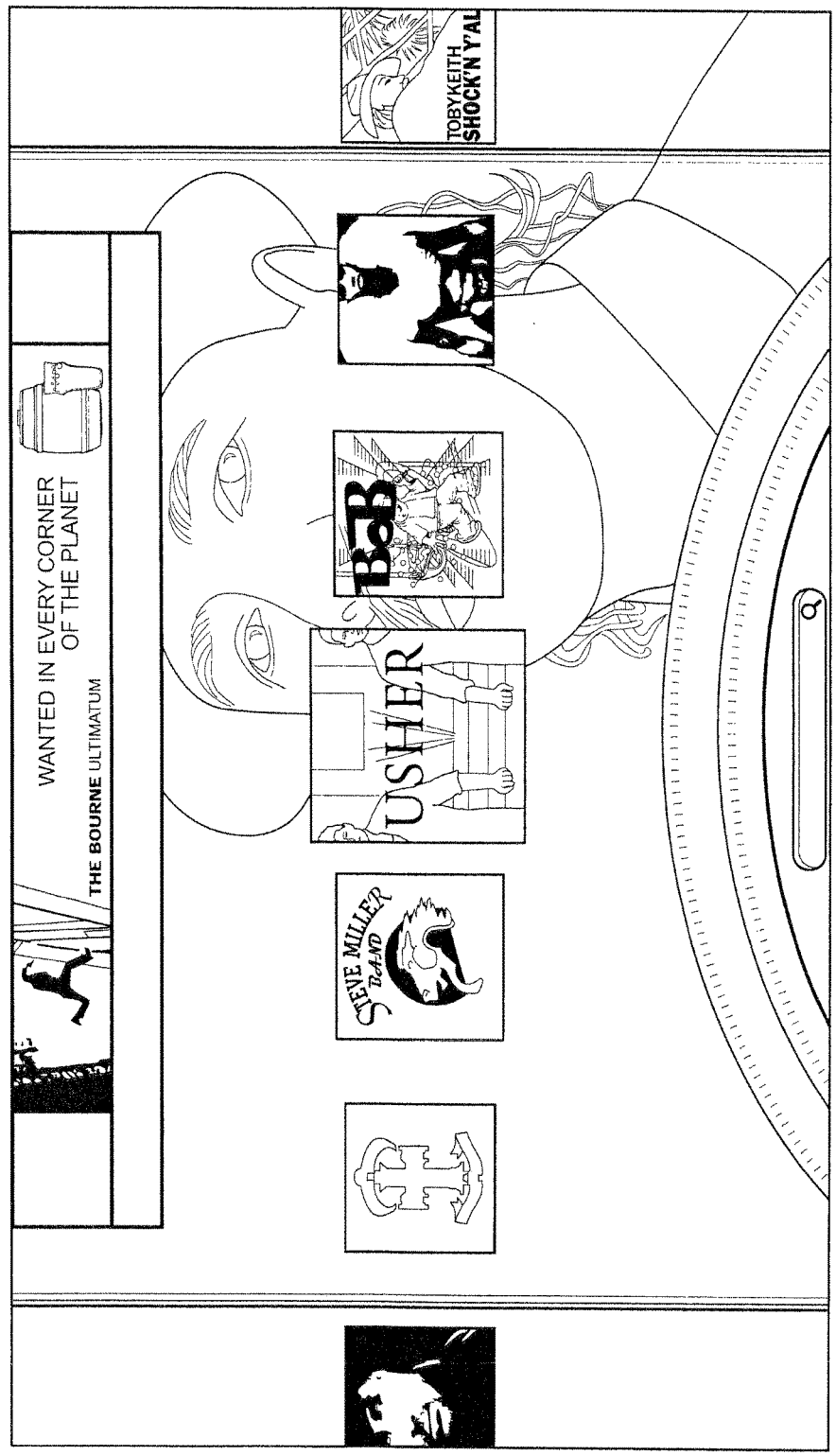
FIG. 20b is a second example "artist portal" in accordance with certain exemplary embodiments.

It will be appreciated that different artists may have different artist portals, and the updates (e.g., to the wireframe, elements shown, etc.) may be the same or different than those described above. In that regard, FIG. 20b is a second example "artist portal" in accordance with certain exemplary embodiments, e.g., for Santana. As can be seen, the Santana artist portal has a different background art and a different color scheme, as compared to the Alicia Keys artist portal. In addition, the albums are not limited to Santana albums in the FIG. 20b example, as the user arrived at the Santana portal via a different means, navigated away from it (e.g., by implementing a subsequent search), etc.

Various "skins" may be attached to albums, songs, or the like, similar to how depth values may be assigned above. The concept of a skin includes, in certain exemplary embodiments, one or more of images, themes, wireframe displays, web pages, etc., that is/are context specific. Thus, it will be appreciated that the selection of an album, song, artist, etc., may cause a lookup of an appropriate skin and cause a corresponding change in the overall look and feel of the jukebox user interface. The skin may include item selection and/or arrangement information indicating, for example, which control elements are to be selected, where they are to be located, how they are to be sized/shaped/colored, etc. Corresponding information may be specified for non-functional elements such as, for example, background art, etc.

Although certain exemplary embodiments have been described in relation to an artist portal, the techniques may be applied to other concepts. For instance, a skin may be created by a recognized user at the jukebox or remotely, e.g., via the MyTouchTunes user interface, and the skin may be applied upon user login. A user may customize its jukebox skin in accordance with the above defining, for example, which control elements are to be displayed and how they are to be displayed, background art, etc. Similarly, a record label, group of artists, etc., also may have predefined skins that are applied at the above-described and/or other points. As is known, some record labels have distinctive presences, iconic images, etc. It will be appreciated that Def Jam's skin may be markedly different from the MuzikMafia's skin, as well as El Cartel Records' skin, etc.

Figure 21:
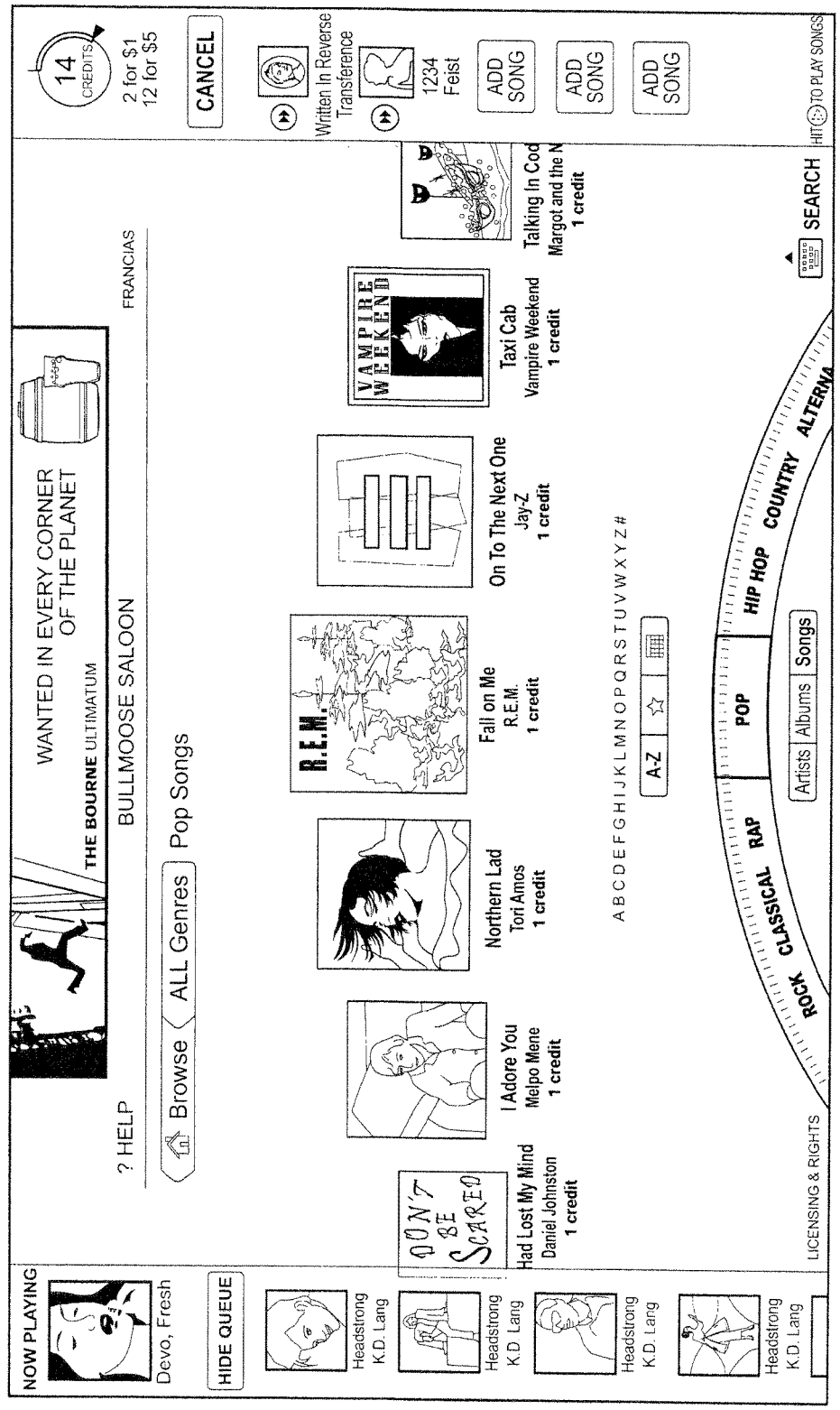
FIG. 21 is an example of a partial or incremental presentation of the jukebox's play queue in accordance with certain exemplary embodiments.

As is known, jukeboxes typically only display a currently playing song. However, a queue is kept and could be displayed on a display in full or in part. For instance, FIG. 21 is an example of a partial or incremental presentation of the jukebox's play queue in accordance with certain exemplary embodiments. A user may be charged a premium fee for partially and/or incrementally revealing the jukebox play queue. For instance, a pricing scheme may be implemented such that the user pays a first amount for seeing an immediately subsequent selection queued up for playback, and increased amounts for seeing more and more selections in the queue.

The FIG. 21 playlist reveal example shows upcoming song titles and artist names. However, the display techniques described herein may be caused to display on selective bits and pieces of the upcoming queue, e.g., so as to not give away too much information. The selective reveal of information may be tied to the user's proclivity or inclination to use a "jump the queue" or "play it now" feature of the jukebox for a particular selection. A pricing structure may be implemented such that skipping 1 or 2 songs costs X credits, skipping 3 or 4 songs costs X plus some further amount of credits, etc. In other words, the price for skipping songs may vary based on the number of songs to be skipped. It also may be tied to the user's proclivity or inclination to use a "lock in" feature, e.g., that charges a premium price for ensuring that the song will be played, that it cannot be skipped without a user paying at least a user-paid or predefined reservation price, etc. The reveal of information may selectively include one or more attributes of one or more upcoming songs including, for example, title, artist, "mood" or genre, beats per minute, etc. The selective reveal may provide, for example, full title and artist information regarding the next two songs (which may be pop songs) and indicate that 10 more songs (which also may be pop songs) are in the queue. In so doing, jukebox patrons, proprietors, and other visitors to the location may be able to get a sense as to what the mood in the establishment will be like in the future. The selective reveal also may be tied to a timeframe, e.g., so that people get a sense of what the establishment will feel like over a predetermined time period of, for example, the next 20-30 minutes, the next hour, for the whole night, etc.

In certain exemplary embodiments, a jukebox device comprises a display; a non-transitory computer readable storage medium storing a plurality of instances of media available for playback on or via the jukebox device; at least one processor configured to maintain a queue of instances of media to be played back on the jukebox, the at least one processor being further configured to cause a user interface to be displayed on the display and further configured to respond to inputs to the user interface. The user interface may include an indication of a currently playing instance of media including at least a song name and an artist associated with the instance of media; and an incremental queue reveal module configured to cause the user interface to display information about one or more upcoming instances of media, the information at least initially excluding one or both of song names and artists.

The incremental queue reveal module may be configured to cause the user interface to display information about a predetermined number of instances of media, with the predetermined number being greater than 1. In the alternative, or in addition, it may be configured to cause the user interface to display information about a plurality of instances of media, the number of instances of media depending on the number of instances of media in the queue that are playable within a predetermined amount of time. The predetermined amount of time may be, for example, 30 minutes, 1 hour, 2 hours, the amount of time until closing, etc.

In certain exemplary embodiments, the incremental queue reveal module is configured to cause the user interface to at least initially display only information about a genre associated with each of the one or more upcoming instances of media, only information associated with a number of beats per minute associated with each of the one or more upcoming instances of media, etc. In certain exemplary embodiments, the initial display may include information only about an artist of each of the one or more upcoming instances of media.

In certain exemplary embodiments, the at least one processor is configured to activate the incremental queue reveal module upon payment of a fee. The amount of information revealed may be made to vary in dependence on the fee collected such that a larger fee corresponds to more information being revealed. Furthermore, the at least one processor may be configured to administer a first pricing scheme that relates the amount of fees due with the amount of information revealed with respect to each instance or media and with respect to a number of instances of media for reveal.

In certain exemplary embodiments, a queue jumping module may be configured to enable the user to move a selected instance of media to a user-specified location in the queue. The at least one processor may activate the queue jumping module upon payment of a fee. Furthermore, the at least one processor is configured may administer a second pricing scheme that relates the amount of fees due to a number of items in the queue to be jumped. The fee may be made to vary proportionally with the number of items in the queue to be jumped.

The user interface may be programmed to enable a user to lock in an instance of media, upon payment of a fee, guaranteeing that it cannot be skipped. The incremental queue reveal module may be further configured to indicate whether instances of media are locked in such that they cannot be skipped.

Methods of making and/or using such jukebox devices also may be provided, as may non-transitory computer readable storage mediums tangibly storing instructions for using such jukebox devices/providing such user interfaces. Jukebox systems including plural jukebox devices, for example, also may be provided in different exemplary embodiments.

Figure 22A:
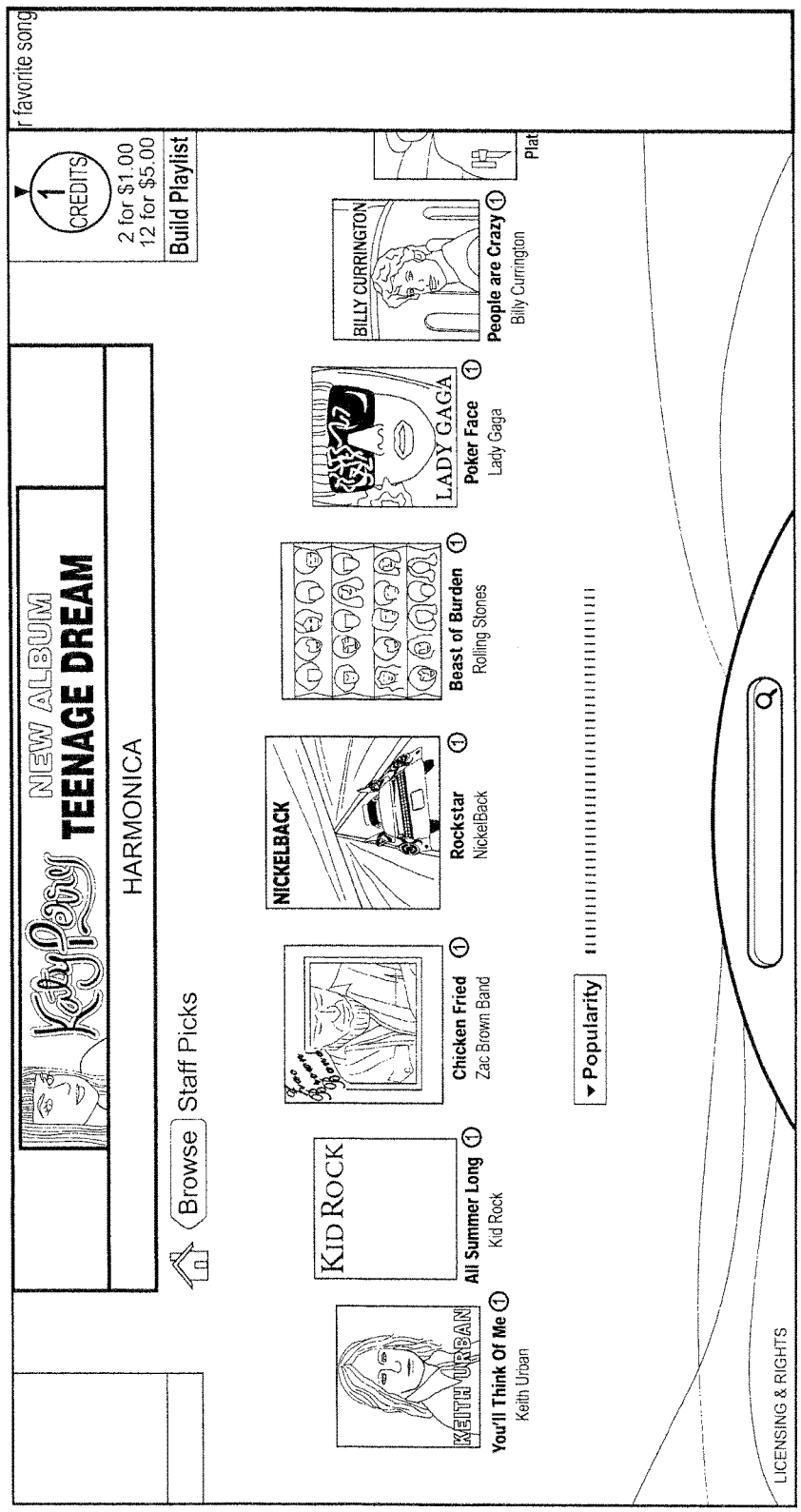
FIG. 22a uses a colorized "blob" to highlight the center selection, whereas other non-patron selectable elements may be blurred, in accordance with certain exemplary embodiments.
Figure 22B:
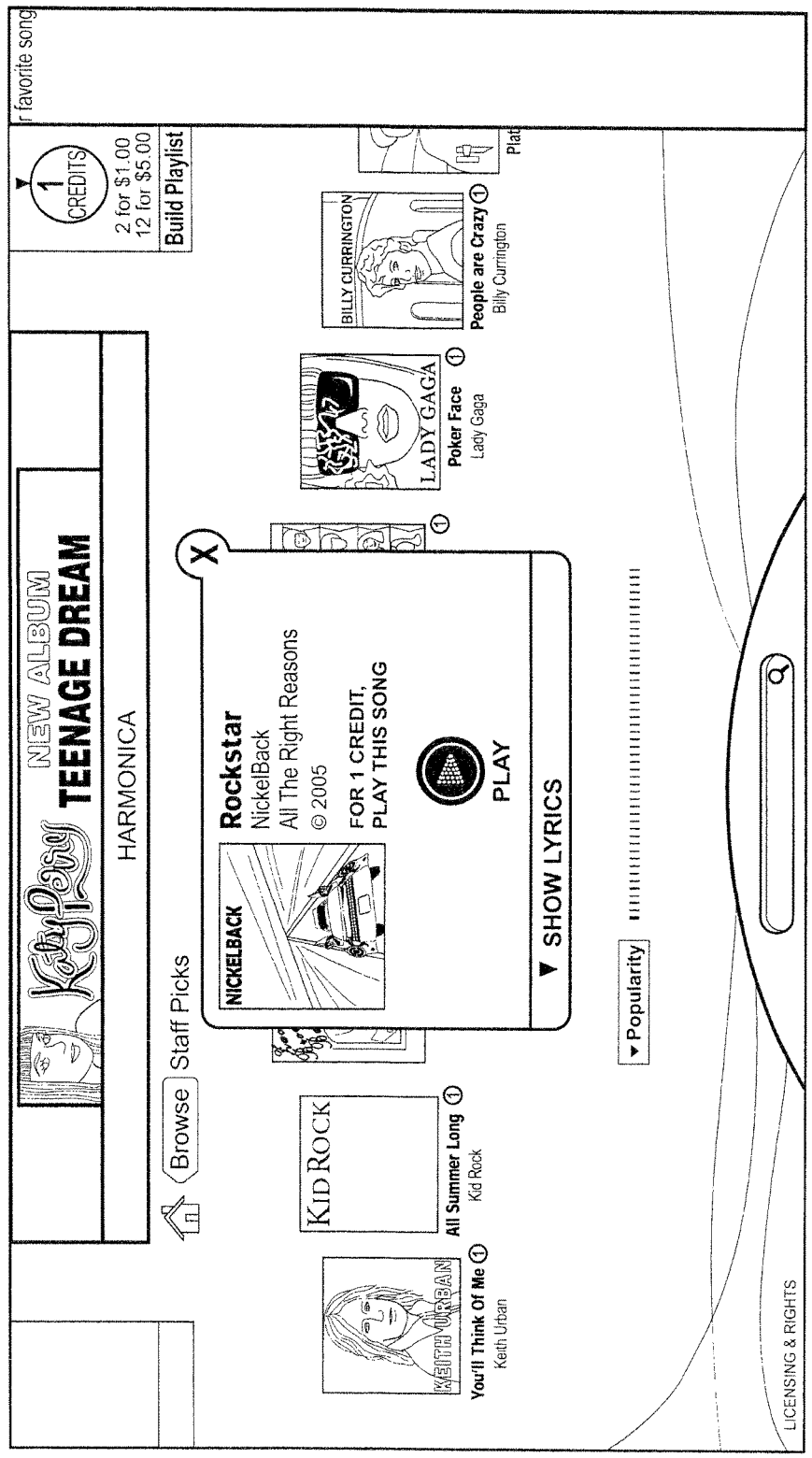
FIG. 22b shows the enlargement of an album jacket to highlight its selection, in accordance with certain exemplary embodiments.
Figure 22C:
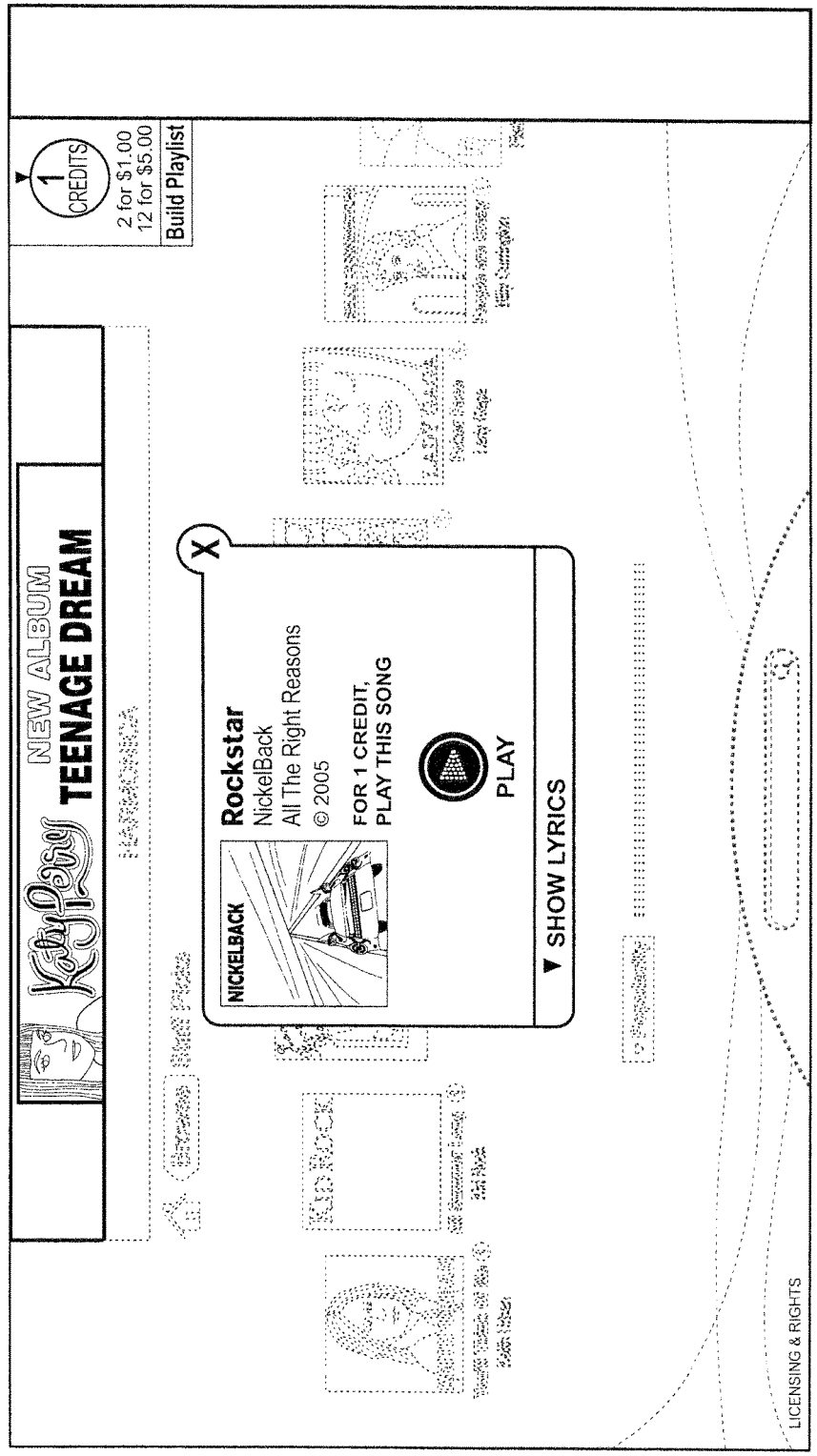
FIG. 22c shows the enlargement of an album jacket to highlight its selection, and further blurs background UI elements to help bring focus to the selected album, in accordance with certain exemplary embodiments.

Because the user interfaces of certain exemplary embodiments may be perceived by some users to be complicated, various techniques may be implemented to help bring focus to patron-selectable elements, e.g., song selection navigation. Blurring, fading, enlarging, and/or other techniques may be used to manage the user's focus in different embodiments, and thus may help simplify the experience, even though there are many more features available and those features are more powerful. For instance, FIG. 22a uses a colorized "blob" to highlight the center selection, whereas other non-patron selectable elements may be blurred, in accordance with certain exemplary embodiments. FIG. 22b shows the enlargement of an album jacket to highlight its selection, in accordance with certain exemplary embodiments. In the FIG. 22b example, the background UI elements have not been modified to bring additional focus to the selected item. By contrast, FIG. 22c shows the enlargement of an album jacket to highlight its selection, and further blurs background UI elements to help bring focus to the selected album, in accordance with certain exemplary embodiments. It will be appreciated that the background UI elements (e.g., in FIGS. 22b and 22c, for example) may be reduced to black-and-white images or otherwise color adjusted to bring focus on one or more items of interest. Although FIGS. 22a-c have been described in connection with the selection of an album, the highlighting techniques described herein may be applied to other aspects of the UI experience.

Certain exemplary embodiments may also build mosaics, e.g., from album covers or other artwork. An algorithm may be run on source artwork to make mosaics for use in the jukebox's user interface. Such an algorithm may run in real-time on the jukebox, e.g., to accommodate various mosaic designs based on the source artwork available (e.g., the number of album jackets available) and dynamically employ such mosaic designs in the user interface. A mosaic construction algorithm may use facial and color density recognition to arrange (or prevent the arrangement of) the source artwork in a desired patter, in certain exemplary embodiments.

Such mosaic techniques involve several concepts, including source image selection and manipulation (e.g., for the images used to build the mosaic), the destination image creation (e.g., for the target mosaic being created), and the destination image context (e.g., for how the target mosaic is used). The source images, destination image, and context in which the destination image is to be used may contain a layer of metadata. This metadata facilitates (e.g., through ID matching) to find a wealth of metadata that can be reused to feed a mosaic-creation algorithm. For instance, an album jacket is associated with a genre, style, artist, year, and other information. Play behavior and social network information about those musical elements may also be included to feed the algorithm information about the relative popularity of music elements, the placement of the music elements in relation to a social network environment, etc. For instance, more popular music may be larger, music played by a patron and a patron's friends (to a predetermined degree of separation in certain examples) may be enlarged, etc. In one context, an avatar of a user may be built from albums jackets matching the user's musical preferences, a map of the USA drawn from actual plays as they occur on the network, etc. Further details about these techniques are provided below.

With respect to source image selection and manipulation, mosaics may be built from source images (tiles) that are aggregated to simulate a larger target image. The tiles may be made from a whole image or from a sub-selection of the whole image, a modified source image (e.g., the original image's colors or hues have been altered), etc. Similarly, tiles may be used in any angle, flipped, mirrored, etc., to assemble the target. Image types may be arbitrary and may include, for example, album jackets, artist artwork, jukebox avatars, musical instruments, etc. Certain tiles may be flagged for special treatment by the algorithm. For example, popular albums, songs, or artists may be enlarged, etc.

With respect to destination image creation, it will be appreciated that the mosaic destination is the image being produced using the source tiles. A target may be a static image (e.g., artist artwork, a cowboy hat, the TouchTunes logo, etc), or a moving concept (e.g., an animation or video), or some combination thereof. Other possible destination concepts also are possible.

With respect to destination image context, a variety of potential uses for constructed mosaics are possible. For instance, an artist image (e.g., for use in an artist portal as discussed above) may be built, e.g., using the artists' album jackets. As an example, an image of George Straight may be built using album art from his numerous albums. An image describing genre may be built, e.g., using source tiles relevant to that genre. As an example, a cowboy hat or popular artist like Taylor Swift may be built using only country music album jackets). A target may be built using geographical information (e.g., build a map of the USA using album jackets that are popular for a specific region). A background mosaic also may be built, e.g., using current jukebox profile information (the location's most popular genre, the currently playing song, etc.). Mosaics may represent playlists, albums from an artist, etc. There are, of course, other possibilities for the context in which the mosaics may be used.

A user may interact with a mosaic in certain exemplary embodiments. For instance, a mosaic may be enlarged by a user, and the user may select a song, artist, album, playlist, etc., from the mosaic.

Techniques also may be provided for synchronized partial lyrics display. That is, in certain exemplary embodiments, lyrics may be displayed at an appropriate or predetermined time during a song. For example, if the jukebox were playing the Black Eyed Peas song, "I Gotta Feeling," the words "I Gotta Feeling!!!" could be displayed at the same time they are sung by the artist.

Figure 23A:
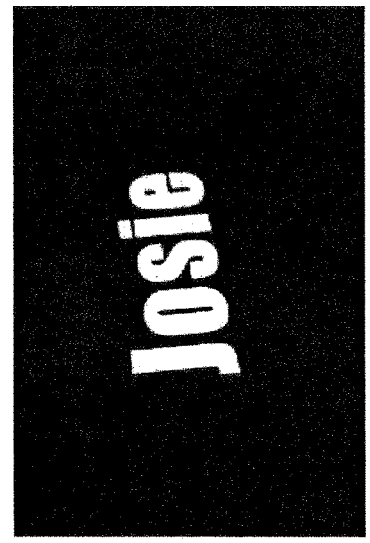
FIGS. 23a-d show example screenshots of a kinetic motion display in accordance with an exemplary embodiment.
Figure 23B:
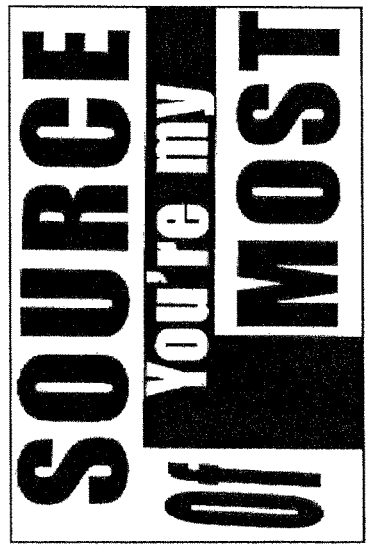
Figure 23C:
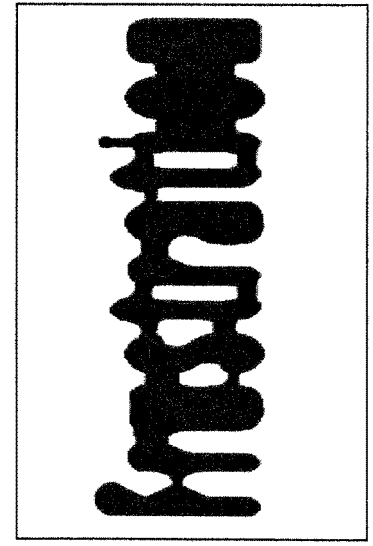
Figure 23D:
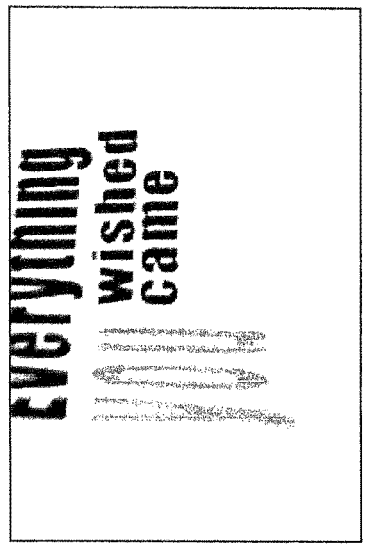

Lyrics also may be arranged in a pattern that reflects the context of the onscreen lyric snippet, also known as kinetic text. FIGS. 23a-d show example screenshots of a kinetic motion display in accordance with an exemplary embodiment. The lyrics have been synched with the Blink 182 song, "Josie." FIG. 23a flies in at the start of the song. FIG. 23b includes words that are added as they are sung, with stretching of the word "of" and with the placement of the words within other words as they are moved out of focus. FIG. 23c shows how blurring can be selectively used to match the mood of the song, as it may be made to represent "frustration." FIG. 23d illustrates how color can be used to emphasize a word as it is emphasized by the artist singing the song.

Kinetic text is enabled in certain exemplary embodiments by creating a script that matches or synchs with the song. Thus, a track of metadata including timing, mood, motion, color, image, etc., may be created for a song, and the track may be stored, e.g., as described above. In certain exemplary embodiments, an XML or XML-like tag structure may be created to link together timing, lyrics, and effects including, for instance, sizing/resizing, entry/exit points, zoom from/to locations, pan directions/amounts, etc.

Similar to the above, synchronized lighting projection also may be provided in certain exemplary embodiments. The user interface coloration may be modified to synchronize with the context of the currently playing song. For example, if the jukebox is playing DJ Funk's "The Roof is on Fire," the user interface may display bright red and orange colorations, e.g., when the words "THE ROOF IS ON FIRE!" are sung. Themes may be developed and associated with one or more songs. For example, a "fire" theme may be created, wherein the jukebox user interface is modified to red and orange colorations. The theme may be associated with songs like DJ Funk's "The Roof is on Fire," the Bloodhound Gang's "Fire Water Burn," Johnny Cash's "Ring of Fire," the Ohio Players' "Fire," etc. The themes may be linked to the songs, and they may be applied for the entirety of the song in certain example implementation. Alternatively, or in addition, XML or other scripts may be created such that there is a link between a time (or times) when the theme should be activated and a particular song.

Certain exemplary embodiments may incorporate a camera into the jukebox. The camera may be used to create an artist or patron likeness, and the captured image may be treated and included into the user interface. For example, the jukebox's on-board camera may be used to convert the patron's likeness into an on-screen facsimile or caricature of the currently playing artist. The likeness may be caricatured using known automatic or manual techniques, and the modified or unmodified image may be used in a variety of ways. For example, the image may be used as background art, associated with a playlist, associated with a user avatar, incorporated into scripts used during music playback (e.g., to show who selected a song), provided for a mosaic (e.g., for a playlist, of "regulars" at a venue, etc.), and/or the like.

The presence of a network connection along with a camera also may be advantageous. For example, it may be possible to have a "live look-in" at a location. A person contemplating whether to visit a bar or club could determine in advance whether it appears to be fun, exciting, "chill,"

etc., in advance. A user could also see what is going on at a location while away from home. Live look-ins may be provided via an Internet connection and thus may be accessed through a webpage, a smart phone, or the like. The images also may be analyzed real-time or after the fact to gather demographic data about the location and/or jukebox patrons.

In a similar manner, the jukebox camera could be used a "mirror" to "reflect" what the jukebox sees is going on in the room, on the dance floor, etc. A feed may be provided to the jukebox display itself, remote terminals operably connected to the jukebox but still within the same venue, to suitably equipped TVs or other displays, etc. The reality may be "augmented," e.g., by adding virtual elements to the mirror image that do not exist in reality. For instance, the image on-screen may be identical to a mirror except that album jackets may float onscreen in front of the user's "reflection."

In certain exemplary embodiments, the camera may be used as an attract device. More particularly, in certain exemplary embodiments, the jukebox's camera may serve as the basis for a motion detection system that attracts patrons to the jukebox. The jukebox may attract the patron by, for example, increasing or decreasing the intensity of the jukebox's user interface lighting a the patron approaches; welcoming the patron when they are within a predetermined number of feet of the jukebox; playing a sound, such as a heartbeat, that lets patrons know they are getting "colder" or "warmer" as they approach; using edge detection to estimate the size of a group and addressing the audience appropriately via sound or textual display; and/or the like. The message also may be determined based on the type of music playing. Thus, if a group is detected and country music is playing, a message like "Hey, y'all! How about a song?" may be displayed rather than the more generic message, "You look you could use a song." The main display or any secondary displayed (e.g., an LED array) may be used to display messages like these, e.g., for patron welcoming or other features, potentially before the patron has even physically touched the jukebox. It will be appreciated that the camera may be made to function as a proximity sensor in certain exemplary embodiments, and that certain exemplary embodiments also may additionally or alternatively include separate proximity sensors for like purposes.

It is believed that, on average, 2.2 people are in front of the jukebox at a time when a selection is being made. The camera may help determine that multiple people are in front of the jukebox and make a recommendation for the group as opposed to the individual. Doing so also may help resolve seeming ambiguities in selections, as different group members may have drastically different song requests that are not easily clusterable or classifiable so as to come up with a good recommendation. Thus, recognizing that a group of people are present may relax certain constraints, cause the jukebox to disregard seeming "outliers," or simply not provide recommendations to a group.

It will be appreciated that the camera may detect lighting levels and adjust jukebox elements so as to take a good quality picture. This may in certain example instances involve adjusting display, LED, and/or rim lighting intensities in connection with a camera flash in a dark or partially lit environment, lowering lighting levels to reduce washout in a bright environment, etc. In certain exemplary embodiments, the users may select an effect such as, for example, washout, saturation, overexposure, etc., and the camera and/or lighting elements may be made to respond according to known photographic techniques for accomplishing the desired effect(s).

In certain exemplary embodiments, a large glass or other panel may be placed over a substantial portion of the jukebox. The panel in certain exemplary embodiments may be made to function as a touch screen panel in certain instances, thereby giving or at least simulating interactive functionality to jukebox elements that otherwise would not be user manipulable. Thus, the panel may serve as a proxy for communication with elements with which a user ordinarily could not interact. The jukebox software may communicate the position of the touched area and take a corresponding action. Fore example, it may be possible to emulate a touch screen LED by placing it beneath a transparent, veritable tactile screen, where the underlying LED array otherwise would not be user manipulable. Examples of functionality that may be imparted to otherwise static elements include, for instance, tracing a user's finger as the user spells out the user's name or other text (e.g., on an LED array), playing a classic "whack-a-mole" type game, detecting when a user is leaning on or otherwise touching the jukebox (which may cause the jukebox to display a message asking the user to avoid leaning on it, inviting the user to make a selection, etc.), and the like.

The camera and/or proximity sensors on the jukebox may be used as a part of a security system for the venue in certain exemplary embodiments. That is, in certain exemplary embodiments, the jukebox's camera may be used to detect and/or report an unwanted present. The camera may be used to create an image or video of the unwanted present, if detected. For instance, after closing, the jukebox may be set to a security mode where it appears to be powered down but its camera continues to function. If an intrusion is detected, e.g., via motion detectors, proximity sensors, and/or the jukebox's camera, the camera may create an image or video of the unwanted presence. The jukebox's audio capabilities to communicate with the unwanted presence, e.g., by sounding an alarm, playing music as loud as possible, etc. The jukeboxes LEDs and/or main screen may communicate that the presence has been detected, and/or the main screen may display a captured or live image or video of the intruders. Furthermore, the jukebox may use its network connection, e.g., to email, text message, or otherwise send an alert to the jukebox owner and/or appropriate authorities to apprise the owner and/or the authorities of the unwanted present, initiate a voice or VoIP call to the jukebox owner and/or appropriate authorities, etc. Similar to the techniques described above, in a more "passive" mode, the camera may provide a live look-in mode for the owner and/or authorities to monitor the situation from a local or remote location. In certain exemplary embodiments, the camera on the jukebox may serve as and sometimes even take the place of a closed circuit monitoring system.

In certain example embodiments, a security mode may be entered into at a predefined time (e.g., after closing), upon an input from an authorized person (e.g., shutting down the jukebox for the night), etc. The security mode may in certain exemplary embodiments power down or otherwise deactivate the display screen so that the jukebox as a whole does not appear to be operation. However, the camera disposed on or otherwise connected to the jukebox may capture a stream of images and/or video. That stream may be related to a security subsystem operating in the jukebox network or a separate network. Authorized users may remotely log into the security subsystem (e.g., using a username/password combination, by inputting a unique address or other identifying information) to obtain live look-ins. The jukebox and/or security subsystem may monitor for abnormalities such as, for example, unexpected motion at the venue, etc.

Upon the detection of a disturbance, the security subsystem may generate or relay a message to an authorized person. For example, a VoIP call may be initiated to the venue's proprietor, to law enforcement personnel, to a private security company, etc. The jukebox also may be made to sound an alarm, display flashing lights, etc., as a security measure against intrusion into the location.

It will be appreciated that many of the same streaming techniques may be used in connection with other, recreational live look-in techniques described herein. For instance, the jukebox network or other appropriate server system may obtain streaming information from the jukebox and enable users (e.g., registered users) to remotely view the venue, e.g., from an Internet browser. In certain example embodiments, the jukeboxes themselves may act as the servers.

In certain example embodiments, a jukebox device comprises a display; a camera; a non-transitory computer readable storage medium storing a plurality of instances of media available for playback on or via the jukebox device; and at least one processor configured to: obtain images and/or video from the camera, display said obtained images and/or video from the camera on the display of the jukebox device substantially in real time so that the display substantially mirrors what is detected by the camera, and enable a remote user to view said obtained images and/or video from the camera. The at least one processor may be further configured to cause said obtained images and/or video to be displayed on one or more external display devices provided in a common location with the jukebox device. Similarly, a web server may be configured to enable the remote user to view said obtained images and/or video from the camera.

The at least one processor may be further configured to enter into a security mode at a user-specified time or upon a signal from an authorized user. The at least one processor causes the camera to act as a motion detector when said security mode is entered. The at least one processor is configured to raise an alarm when motion is unexpectedly detected. The alarm may include initiation of a VoIP call to one or more specified parties; sending SMS, emails or other messages; causing the display and/or lighting on the jukebox to become illuminated and/or flash; an audible alarm; and/or the like.

Methods of making and/or using such jukebox devices also may be provided, as may non-transitory computer readable storage mediums tangibly storing instructions for using such jukebox devices/providing such user interfaces. Jukebox systems including plural jukebox devices, for example, also may be provided in different exemplary embodiments.

Certain exemplary embodiments also provide adaptive jukebox personalization features including, for example, personality generation and personality expression. Personality generation relates to the process of collecting various pieces of information and using them to characterize the personality of the jukebox. This may be an ongoing process. For example, each time a user interacts with the jukebox, new information is generated and may be collected.

Different types of information may be considered to define the personality of a jukebox. These factors may include some or all of the following and/or other factors: the jukebox's geographic location, the most popular songs played on a jukebox, the type of music played on a jukebox (i.e., genre, style, mood, etc.), plays made on the whole jukebox network, information as to whether additional weight should be given to a current patron's selections (e.g., if they are a member of MyTouchTunes or bar staff), etc.

The jukebox then may be assigned a personality type, e.g., based on the collected information. Personality types may be discrete in the sense that any given jukebox is assigned only one type at any given time. The personality types, and the criteria matching those types, may be defined by the jukebox provider. For example, as a basic implementation, the most popular music genre in a location may be used to define personality types. In such a case, jukeboxes may be referred to as "Rock type," "R&B type," etc.

Personality generation may also involve adjustments and refinements to the jukebox personality type over time, e.g., as new information is collected. For instance, a jukebox initially be categorized as a "Rock type" jukebox, but may be refined over time to indicate a preference for "energetic" rock songs rather than "slow" rock songs or "rock ballads."

Thus, it will be appreciated that information may be gathered, an initial assignment as to one of plural predefined categories may be made, and that adjustments or refinements to the initial assignment may be made over time, e.g., as more data is collected. It will be appreciated that the adjustments or refinements may be sub-classifications within a particular category, re-classification into a new category or sub-category, etc.

The personality expression of a jukebox may be understood as how the user experience is affected as a result of the jukebox's personality. For instance, the general appearance of the jukebox may be modified to match the jukebox personality. Such modifications may include some or all of the following and/or other characteristics: displaying information about the jukebox's location, a custom UI theme representing the personality of the jukebox, a lightshow pattern and coloration that reflects the personality of the jukebox, background image of an artist as a UI backdrop according to the location's personality (see artist portal above), etc.

The example techniques described above also may apply to jukebox adaptive music browsing and/or searching. For instance, when browsing music on the jukebox, emphasis may be placed on preferred music genres, styles, moods, etc., based on the jukebox personality. The same or a similar approach may be applied to music searching. That is, in certain example instances, more emphasis may be placed on preferred music types in search results, e.g., such that songs that match the personality are listed first or near the top of the results, or at least higher than they might otherwise be, etc.

Along similar lines, in certain exemplary embodiments, a jukebox search algorithm may provide incremental auto-complete suggestions to patrons with respect to the songs, artists, and albums most played on that jukebox, and/or that match the personality of the jukebox. The algorithm may draw from a variety sources that identify the preferences of the user such as, for example, the DMA, city, MyTouchTunes user profile, and possibly the Facebook user profile. Similar techniques may be applied as to the jukebox personality, e.g., for unregistered or not recognized patrons.

For example, as a patron enters the letters "Rol" into the search field, the auto-complete may recognize the user, and determine that the Latin artist Rolando should be listed higher on the auto-complete suggestions than the Rolling Stones, who are more popular across the jukebox network, but not necessarily more popular to the jukebox user or on the jukebox in use.

The notion of jukebox personality also may be used to send music content packages to jukeboxes according to their personalities in certain example implementations.

Personalization of the jukebox and/or the user also may be used for targeted advertisements. For instance, the personality of a jukebox may be used to help determine which ads it will receive or display based on some or all of the following and/or other factors: location specific events (e.g., Happy Hour, Ladies' Night, New Year's Party, etc.), local concerts (e.g., Arcade Fire, your favorite indie band is playing in New York this weekend), local events (e.g., local fund-raising, blood collections at the local community center, etc.), and/or the like.

Furthermore, contextual advertisements may be based on the personality of the jukebox and/or the jukebox user. For recognized users who have logged in, the personality may be known. However, for anonymous users, advertisements may be displayed based on a more current browsing behavior and song selection (e.g., during a current selection). For instance, as the user browses the alternative rock genre on the jukebox, the jukebox may display advertisements for an upcoming Lollapalooza event.

Further personalization may be possible in connection with contextual advertisements by taking a picture at the time of the user's interaction (or from an archive if the user is a recognized user) and then incorporating the user's likeness into the advertisement. For example, if the user is browsing Jimmy Buffett music, a picture of the user may be taken and incorporated into a picture with the user on the beach and an advertisement for cheap travel to the islands.

Certain exemplary embodiments may enable a user to create set lists for play. For example, a user may browse the catalog of songs, etc., and select songs for potential playback on the jukebox. The user may reorder songs, delete songs, add songs, etc., to the working set list during a session, much like a person may place items in a shopping cart and remove some other items. Once the set list is defined by the user, it may be submitted for play in whole or in part as one or more packages. Similarly, the user may make some or all of the songs in the set list play immediately for a premium. In that regard, the user may simply drag and drop the set list, or a portion thereof, into a predefined area of the user interface designated for causing immediate play of the song(s). Thus, it will be appreciated that the jukebox user interface may be configured to allow a user to create of a group of songs that are then queued for play by the user in a single action, and an advanced set list may enable the user to modify the set list's contents before it is executed (e.g., such that songs may be added, removed, reordered, given a higher priority via the play next or jump the queue function, etc.). This set list may be executed using a user interface element or a physical activator on the jukebox The set list may be advantageous in certain exemplary embodiments because it does not require a user to be logged in to the jukebox. In other words, it will be appreciated that the set list techniques described herein may be particularly advantageous for ad hoc creation of a list of songs for playback by an anonymous user. It will be appreciated that the user may be able to save the set list as a playlist for subsequent use, e.g., by registering with the jukebox and/or logging in to an already existing account.

Figure 24:
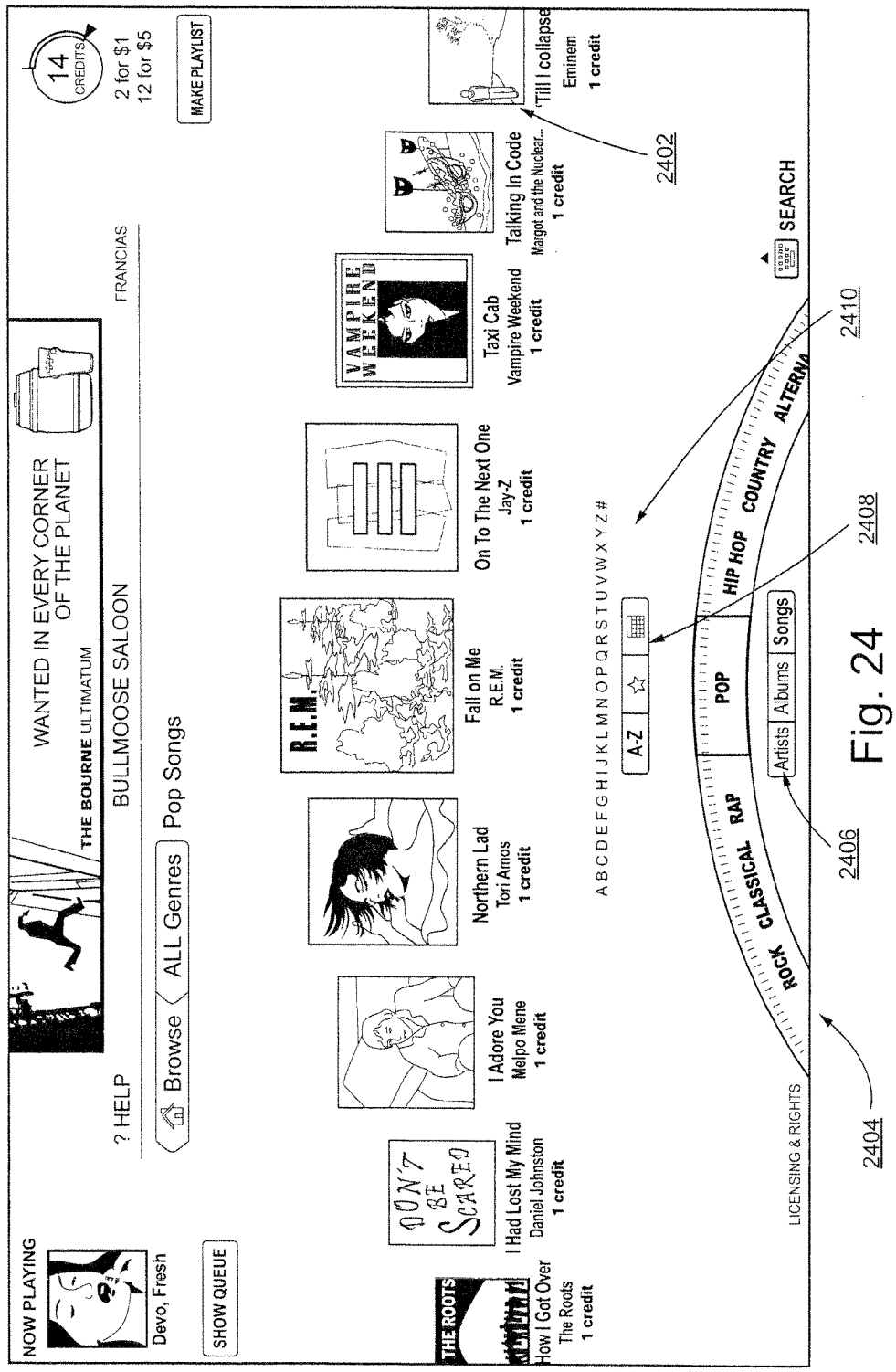
FIG. 24 is an example screenshot of an improved music discovery user interface in accordance with certain exemplary embodiments.

FIG. 24 is an example screenshot of an improved music discovery user interface in accordance with certain exemplary embodiments. As shown in FIG. 24, the elements in a collection of media are displayed in the fan-like arrangement 2402 in the approximate center of the screen. The collection may be, for example, selections from a genre, a playlist, etc. The collection may include a predetermined number of elements. The elements in the selection may be user determined (e.g., in the case of a playlist), determined by the provider of the jukebox (e.g., in the case of a genre), a proprietor of the location (e.g., for a theme night or for the location in general), etc. In the FIG. 24 example, genres 2404 are listed in the arc at the bottom of the screen, and the "pop" genre is selected.

Once a collection is determined, a collection type may be further specified. There are three buttons 2406 on the FIG. 24 example screen for specifying the collection type. These options include artists, albums, and songs. Thus, the elements in the collection may be grouped or organized according to the collection type. In the FIG. 24 example, the collection type is "songs." Accordingly, pop music selections are provided in the fan-like arrangement at the approximate center of the screen. All pop music selections in the collection are listed separately as songs because that is the specified collection type. If the albums collection type were specified, the albums containing the songs in the collection would be displayed. Similarly, if the artists collection type were specified, the artists who perform songs in the collection would be displayed. In the latter cases, a user could browse by album or artist, make a selection, and then further select a song from a selected album or artist. Regardless of how the elements are grouped by collection type, the same songs are represented, just in different ways.

Once a collection type is specified, the items in the collection may be ordered, e.g., using an ordering indicator 2408. For instance, three illustrative ordering buttons are provided below the fan-like arrangement of songs 2402. The "A-Z" button organizes the elements in alphabetical order, the star button organizes the elements in terms of popularity, and the calendar button provides a time-based arrangement of the elements (e.g., by release date).

The selection of a particular order will, in turn, cause a "scrubber bar" 2440 to appear. In the FIG. 24 example, the order selected is alphabetical order and, thus, the scrubber bar shows the letters of the alphabet. A user may quickly navigate through the collection using the scrubber bar (and, in particular, in the FIG. 24 case, by selecting a letter). The selection of a letter may cause it to glow or become larger for emphasis. It will be appreciated that the elements shown in the scrubber may change based on the order selected. For popularity, a series of numbers ranging from 1 to the number of elements in the selection may be provided, and a series of dates, years, or the like may be provided if the calendar order is selected. It will be appreciated that the selection of an artist may not allow the calendar order to selected in certain example instances, as an artist typically is not associated with a year the same way an album or song has a release date. However, in certain cases, the date of an artist's first single or first album may be used as a relevant date.

Thus, in certain exemplary embodiments, a jukebox device comprises a display; a non-transitory computer readable storage medium storing a plurality of instances of media available for playback on or via the jukebox device; and at least one processor configured to cause a user interface to be displayed on the display and further configured to respond to inputs to the user interface. The user interface includes: at least one first user interface element configured to enable a user to select a collection of instances of media available for playback from a plurality of possible collections of instances of media each said collection representing a different partial subset of media available for playback on or via the jukebox device, at least one second user interface element configured to enable the user to select one of plural possible grouping modes for grouping the instances of media in the collection, the grouping modes including artist, album, and song groupings, wherein the selected grouping mode determines items to be presented to the user for possible selection, at least one third user interface element configured to enable the user to select one of plural possible ordering modes for ordering the items to be presented to the user for possible selection, and a display area for displaying at least some of the items to be presented to the user for possible selection, the items being ordered within the display area according to the selected ordering mode. The at least one first user interface element, the at least one second user interface element, and the at least one third user interface element are all displayable on the display at the same time. The collections may include predefined genres and/or musical themes, playlists, and/or the like in different implementations.

The ordering modes may include, for example, an alphabetical order mode, a popularity-based order mode, and a chronological or date order mode. Each item to be presented to the user for possible selection may be assigned a popularity value, with the popularity-based order mode ordering the items to be presented to the user for possible selection based on the assigned popularity values. The popularity values may be assigned based on one or more of: item popularity across a jukebox network, item popularity at a venue at which the jukebox device is located, item popularity on an industry chart, and/or item popularity at one or more social networking sites. The chronological or date order mode may in some cases be disabled when the artist grouping mode is selected.

The user interface may in certain exemplary embodiments further display at least one fourth user interface element, with the at least one fourth user interface element being adaptable based on the selected ordering mode. The at least one fourth user interface element may include letters when the alphabetical order mode is selected, numbers or lines corresponding to popularity values when the popularity-based order mode is selected, a date or calendar display when the chronological or date order mode is selected, etc. In certain implementations, the display area may include a partial subset of the items to be presented to the user for possible selection, with the partial subset being determined based on a selection made with respect to the at least one fourth user interface element.

A partial subset of items may be displayable in the display area in a fan-like arrangement across a general center area of the display, where the exact items displayed are changeable based on user manipulation of the at least one fourth user interface element and/or user input to the display area. In certain exemplary embodiments, a user selection of a displayed album item causes the display of songs within the selected collection and associated with the selected album item to be displayed in the display area, and/or a user selection of a displayed artist item causes the display of songs within the selected collection and associated with the selected artist item to be displayed in the display area. In certain exemplary embodiments, a user selection of a displayed song item causes a popup screen to be displayed, with the popup screen enabling the user to confirm that the selected song is to be played back. The display of the popup screen may be accompanied by the blurring, fading, and/or reduction to grayscale of user interface elements behind the popup screen.

Methods of making and/or using such jukebox devices also may be provided, as may non-transitory computer readable storage mediums tangibly storing instructions for using such jukebox devices/providing such user interfaces. Jukebox systems including plural jukebox devices, for example, also may be provided in different exemplary embodiments.

Many jukeboxes, kiosks, gaming devices, and the like have used exterior lights to attract and/or emphasize various events. These devices typically issue direct commands to a color-processing device. Unfortunately, however, this control technique oftentimes makes it difficult to tailor the overall experience (e.g., acoustic, user interface, electromechanical, environmental, and peripheral) to changing or event-related situations, e.g., to adopt a different appearance in a coordinated fashion. More particularly, what has been absent is the ability to contextually alter these behaviors in a way that allows the device and its user interface to collaborate as an integrated system. A solution to this problem is to create a control system that couples the behavior of visual peripherals and displays to a theme. The theme thus in certain exemplary embodiments would help describe the standard behavior for the user interface and the peripheral lights.

Figure 25A:
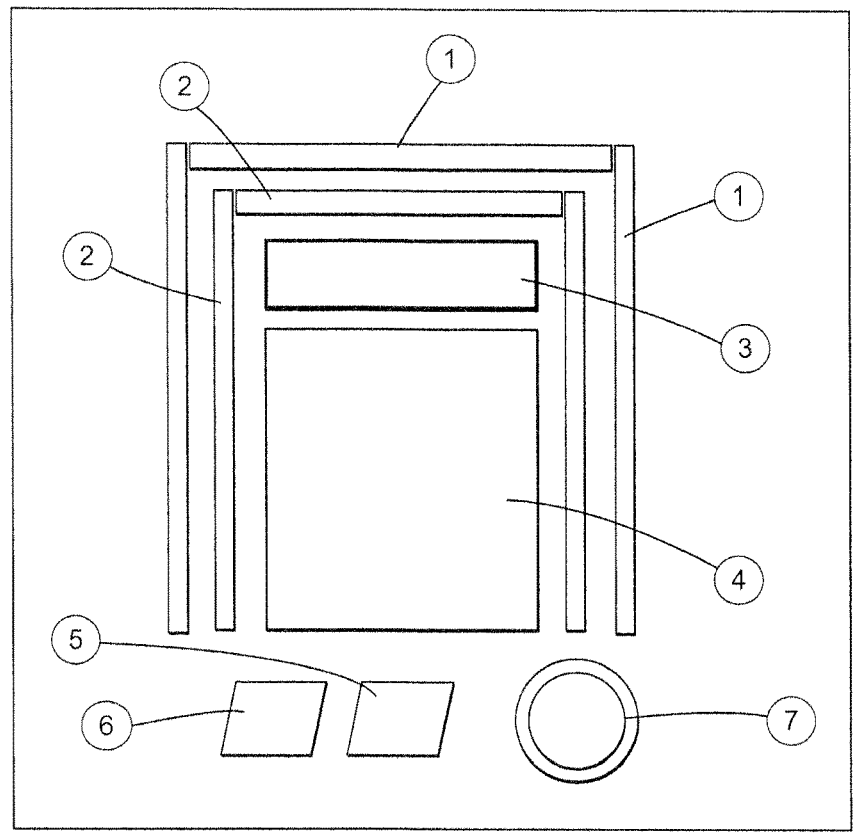
FIGS. 25a-b show components of a jukebox device in accordance with certain exemplary embodiments.
Figure 25B:
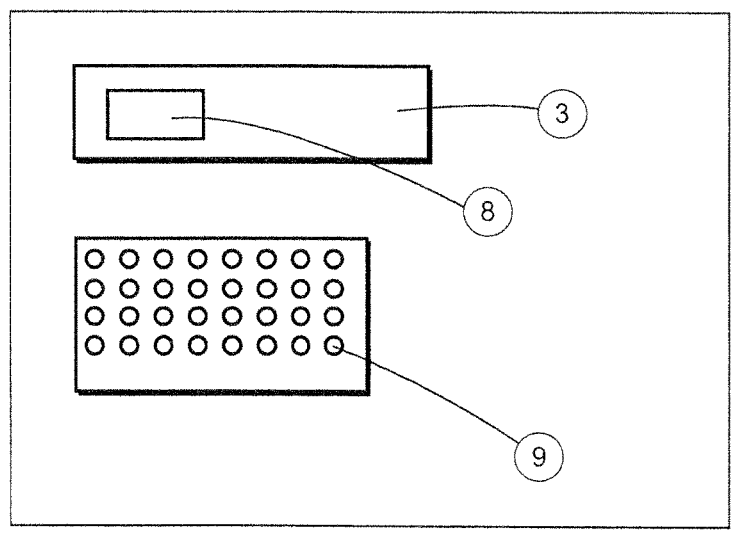
Figure 26:
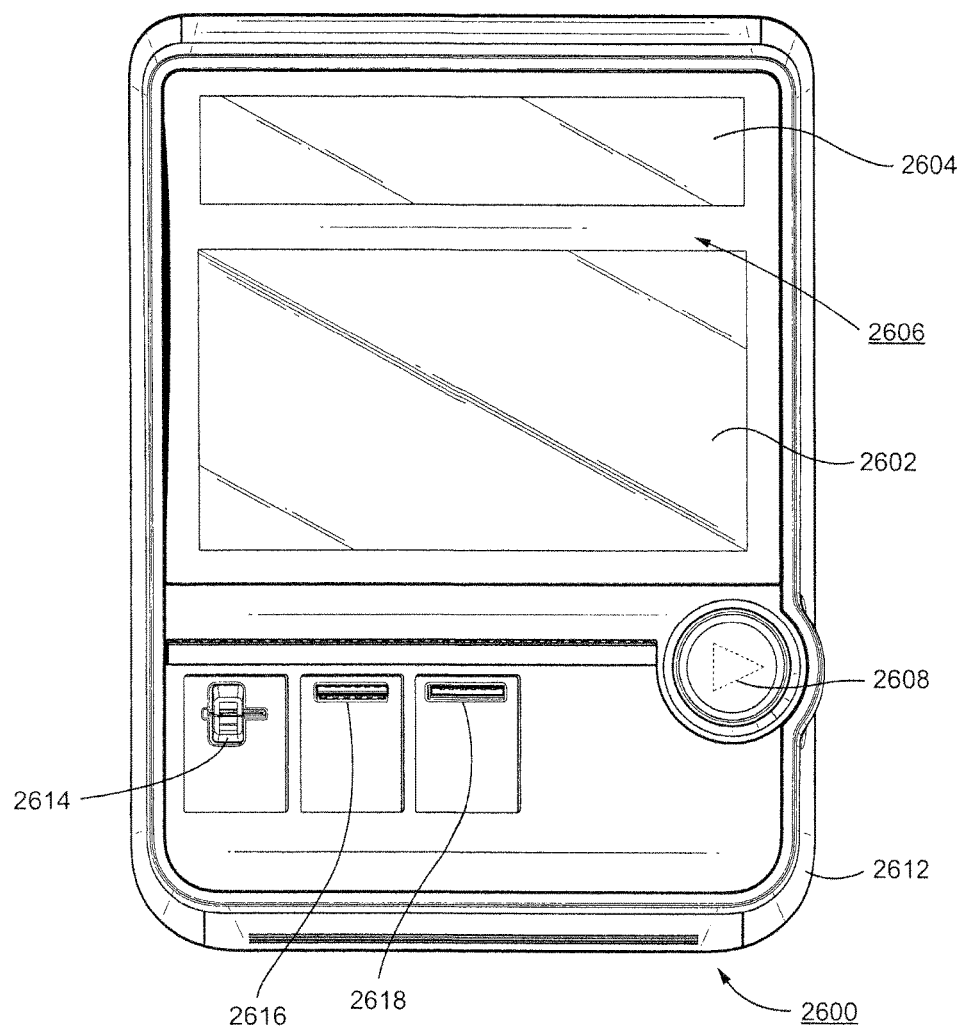
FIG. 26 is an image of an example jukebox device in accordance with certain example embodiments.

The exemplary embodiments described herein may be used in connection with a jukebox of the type shown and described in, for example, U.S. Application Serial No. 29/371,255, the entire contents of which are hereby incorporated herein by reference. FIGS. 25*a-b* show components of a jukebox device in accordance with certain exemplary embodiments, and FIG. 26 is an image of an example jukebox device in accordance with certain example embodiments. As can be seen from FIG. 25*a*, a backwash light segment (1) is provided, along with a rim light segment (2). An LED display (3) is located above a payment mechanism attract light (4), the latter of which helps serve as a main display screen and main portion of the user interface. A near field communication attract light (5) may be provided. A user may provide payment via a payment acceptor that is proximate to a payment mechanism attract light (6). A main activation switch light (7) also may be provided around a main activation switch. FIG. 25*b* is a close-up of the LED display (3) shown in FIG. 25*a*, in accordance with certain exemplary embodiments. As can be seen from FIG. 25*b*, the LED display (3) may comprise a portion of an array of individual LED elements (9). At least the LED display (3) and the main display screen may be covered with a common touch-sensitive panel in certain exemplary embodiments.

As shown in FIG. 26, the jukebox device 2600 includes a main display screen 2602 that is configured to display a main user interface, e.g., under the control of at least one processor built into the jukebox device 2600. A secondary display 2604 (which may, in certain example embodiments comprise an LED array) also is provided above the main display screen 2602. In certain example embodiments, the secondary display 2604 may be configured to display FFT-like data, welcome messages, kinetic or static text, etc. In certain example embodiments, the main display 2602 and/or the secondary display 2604 may be fully or partially covered with a glass or other touch-sensitive substrate 2606. This touch-sensitive substrate 2606 may provide interoperability to otherwise static elements such as, for example, the secondary display 2604. In certain example embodiments, the main display screen 2602 may be a first touch screen display itself, and a touch-sensitive may be provided over only the secondary display 2604. Other arrangements are, of course, possible in different embodiments.

A physical interaction button 2608 may be provided for taking an action designated by the user interface. In certain exemplary embodiments, lighting elements may be disposed around the button 2608. A decorate "play" or other symbol may be placed on the button 2608 to improve its aesthetic appearance.

One or more lighting elements 2610 may be provided around the periphery of the jukebox device 2600. The one or more lighting elements 2610 may be operable as a single element, as segments, etc., in different embodiments. In certain exemplary embodiments, the one or more lighting elements 2610 may be provided, constructed, and/or controlled so as to simulate more classic or vintage-looking neon lights. Although not shown, one or more light elements may be disposed at or pointing towards the rear of the jukebox device, e.g., so as to provide for a "wall wash" or back light. A frame 2612 also may be provided around the outer periphery of the jukebox device 2600, e.g., so as to give it a completed or "seamless" look and feel.

One or more payment acceptors may be provided. As shown in the FIG. 26 example, a credit card acceptor 2614 is provided, as are first and second bill acceptors 2616 and 2618. Coin acceptors may be provided in certain example embodiments, as may RF-ID readers.

A common color palette and themed behavior type may be applied to some or all of these visual assets so that they are coordinated and attractive rather than harsh and random. For example, rear facing lights (1), a front facing light rim (2) the text or graphics on LED display (3) and all usage of accent color (12) occurring within the User Interface could be set to the same color attribute. Then, this attribute could change according to a set periodicity and by using a color range or a sequence of specific colors (defined by RGB, pantone or other color description method). The effect of this would be a highly coordinated visual appearance.

A common script or data set may be provided for synchronizing the display elements, e.g., in terms of color or colors, periodicity for change, synchronization rules, etc. It will be appreciated that by substituting a new data set, the complete overall appearance of the device and the rendered user interface may be changed without altering any of the software or hardware. This would, in turn, allow the same system to be used in diverse commercial and/or residential establishments, and further provide the ability to adapt the established design and often trademarked color usage that identifies the brand.

Such techniques also may allow independent locations that have invested in specific lighting and design to tailor the color, intensity, and pace of all lighting so that it would fit with their established décor, all the while benefiting from the manual or automatic coordination of the on-screen user interface that would appear to have been customer colored for this location.

In certain exemplary embodiments, the system may be set to use a preplanned color palette but to apply this palette to different rhythms, e.g., either the actual beat and/or frequency of the song being played at this instant, or a set pace that was established for the location. The combination of this color and pattern may help constitute the location's lighting theme.

The customization may be enhanced with a set of images that is gathered into an image collection such as "Country" or "Urban," and these images may have associated metadata that describes a lighting theme.

As the images are presented on the system's embedded screen, or on remote screens that are provided with content from the system, the lighting may follow the entrance and exit animations of the images. This lighting rhythm may be "with slideshow" and the light color, luminosity, and rhythm that is to be followed as the image may be presented based on metadata associated with each image, e.g., as in a matte for a print, the lighting color may enhance or complement certain colors within the image. This advantageously may help provide the ability to extend the visual impact of an image beyond its actual size, e.g., by projecting a complementary color or colors at the same time.

In certain exemplary embodiments, the coordination of the presentation of an image and the lighting attributes may involve the presenting of a still or full-motion advertisement on the local or remote screen. The brand colors or signature contrasts could be presented temporarily, e.g., in accordance with the display of the advertisement. The pattern may be overridden based on a defined event. For example, if a music playing event occurs, then the light pattern on a device may adopt the rhythm and color choices to provide accompanying song visualization. In other words, in certain exemplary embodiments, priorities may be defined, and the advertisement coloration effects may be made secondary to music related events, etc.

Each colorization pattern may be described in terms of "key frames" in certain exemplary embodiments. For example, for each channel, there may be multiple key frames, with each one being defined by the end value for the color of the channel to be computed starting from the current color, to a specific point in time, using a given easing mode. The point in time may be defined using a color value representing the progress in the interval of [0, 1]. The easing mode may be a mathematical function that translates the time into a dimensional progress factor used when going from key frame to key frame.

Below is an illustrative script that defines a lightshow pattern in accordance with certain exemplary embodiments. More particularly, the example script below defines a lightshow pattern with a duration of 10 seconds and operating on the color of the 6 channels that constitute the wash wall. For the first channel, the first key frame will move the color from black to blue in the first 10 percent of the duration of the pattern. The second will move the color from blue to green from 10 percent to 20 percent of the duration. The third will move the color from green to red from the following 20 percent of the duration to the 30 percent of the duration, and the last key frame will move the color from red to black from 30 to 40 percent of the duration.

For the second channel, the first key frame will move the color from black to blue from 10 to 20 percent of the duration of the pattern. The second will move the color from blue to green from 20 to 30 percent of the duration. The third will move the color from green to red from the following 30 percent of the duration to the 40 percent of the duration, and last key frame will move the color from red to black from 40 to 50 percent of the duration, and so forth.

```
[
/* channels declaration */
    [
        {
            "type" : "TTChannel",
            "id" : "channel-0",
            "index" :0
        },
        {
            "type" : "TTChannel",
            "id" : "channel-1",
            "index" : 1
        },
        {
            "type" : "TTChannel",
            "id" : "channel-2",
```

```
            "index" : 2
    },
    {
        "type" : "TTChannel",
        "id" : "channel-3",
        "index" : 3
    },
    {
        "type" : "TTChannel",
        "id" : "channel-4",
        "index" : 4
    },
    {
        "type" : "TTChannel",
        "id" : "channel-5",
        "index" : 5
    },
    {
        "type" : "TTChannel",
        "id" : "channel-6",
        "index" : 6
    }
],
/* pattern declaration */
[
    {
        "type" : "TTAnimator",
        "id" : "animator-default",
        "duration" : 10000, /* duration in milliseconds
*/
        "is-default" : true, /* if true, the pattern
will loop indefinitely */
        "properties" :
        [
            {
                "object" : "channel-0",
                "name" : "rgb",
                "ease-in" : false,
                "interpolation" : "linear",
                "keys" :
                [
                    [ 0.10,  "linear", "blue" ],
                    [ 0.20,  "linear", "green" ],
                    [ 0.30,  "linear", "red" ],
                    [ 0.40,  "linear", "black"]
                ]
            },
            {
                "object" : "channel-1",
                "name" : "rgb",
                "ease-in" : false,
                "interpolation" : "linear",
                "keys" :
                [
                    [ 0.20,  "linear", "blue" ],
                    [ 0.30,  "linear", "green" ],
                    [ 0.40,  "linear", "red" ],
                    [ 0.50,  "linear", "black"]
                ]
            },
            {
                "object" : "channel-2",
                "name" : "rgb",
                "ease-in" : false,
                "interpolation" : "linear",
                "keys" :
                [
                    [ 0.30,  "linear", "blue" ],
                    [ 0.40,  "linear", "green" ],
                    [ 0.50,  "linear", "red" ],
                    [ 0.60,  "linear", "black"]
                ]
            },
            {
                "object" : "channel-3",
                "name" : "rgb",
                "ease-in" : false,
                "interpolation" : "linear",
                "keys" :
                [
                    [ 0.40,  "linear", "blue" ],
                    [ 0.50,  "linear", "green" ],
                    [ 0.60,  "linear", "red" ],
                    [ 0.70,  "linear", "black"]
                ]
            },
            {
                "object" : "channel-4",
                "name" : "rgb",
                "ease-in" : false,
                "interpolation" : "linear",
                "keys" :
                [
                    [ 0.50,  "linear", "blue" ],
                    [ 0.60,  "linear", "green" ],
                    [ 0.70,  "linear", "red" ],
                    [ 0.80,  "linear", "black"]
                ]
            },
            {
                "object" : "channel-5",
                "name" : "rgb",
                "ease-in" : false,
                "interpolation" : "linear",
                "keys" :
                [
                    [ 0.60,  "linear", "blue" ],
                    [ 0.70,  "linear", "green" ],
                    [ 0.80,  "linear", "red" ],
                    [ 0.80,  "linear", "black"]
                ]
            },
        ]
    }
]
```

Figure 27:
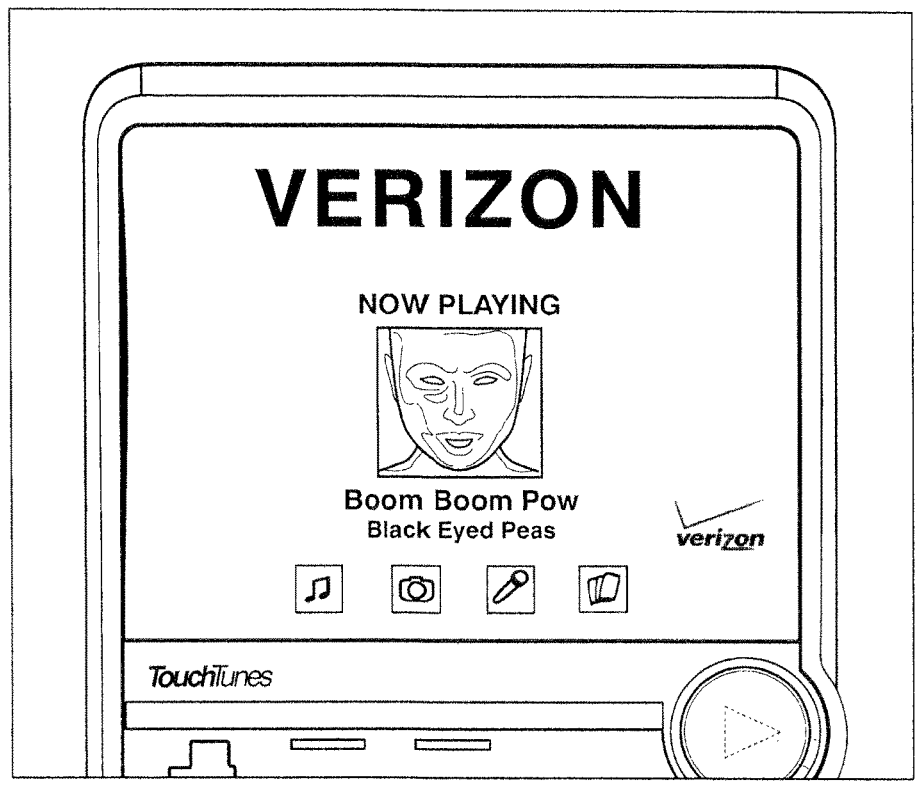
FIG. 27 is an illustrative view of visual components on a jukebox device being color matched and synchronized in accordance with certain exemplary embodiments.

FIG. 27 is an illustrative view of visual components on a jukebox device being color matched and synchronized in accordance with certain exemplary embodiments. In the FIG. 27 example, an advertisement for Verizon is being shown. In that regard, the LED display says Verizon, and the Verizon logo appears in the main display area. In addition, the LED display text is red, as is a portion of the main display. The wall wash also is red, and the rim light segment is white for contrast. The red Verizon theme may be applied during song play, as shown in FIG. 27 in which the Black Eyed Peas song "Boom Boom Pow" is being played. In certain exemplary embodiments, a custom message may be designated for the song, e.g., to display "BOOM BOOM BOOM!!!" in the LED display when the artists sing the same. In such a case, precedence may be given to the song-specific text. However, the red Verizon theme may be maintained, such that the text is displayed in that color pattern.

In certain example implementations, the coloration might not be exact as between different display elements, even when the same colors are specified. For instance, the LEDs in the array may have a certain CRI or other value influencing the color produced, whereas the main display may have a second CRI or other value influencing the color produced. The LEDs in the LED array may be different still from the rim light segment, etc. The wall wash may be influenced by the paint on the wall, ambient light, etc.

To provide a consistent coloration, the system may specify different colors for output such that they seem to be the same to a viewer. The differences may be predetermined in some respects, e.g., for the LED array, the main display area, and the rim lights. However, it may not be possible to always predict and pre-compensate for location-specific factors that may influence the ultimate coloration. In such cases, the camera may be used to help determine the characteristics of the environment. Data from the camera may be analyzed and/or used to adjust the coloration of one or more elements so that a consistent coloration is possible. A software-based color filtering module may be provided in certain exemplary embodiments for helping to collect the data, calculate offset values (e.g., in accordance with a mathematical formula), and providing instructions or color offset codes for the operating system to consider when indicating what colors are to be output for each of the display elements.

In certain exemplary embodiments, a jukebox device is provided. It may include, for example, at least one display device; a generally elongate array of LED elements provided above the at least one display device; a backwash light arranged at a rear portion of the jukebox device and configured to generate light behind the jukebox device; a rim light disposed around a periphery of the jukebox device; a substantially circular activation switch or button; a non-transitory computer readable storage medium storing a plurality of instances of media available for playback on or via the jukebox device; and at least one processor configured to provide a user interface and further configured to coordinate lighting events based at least in part on events associated with the user interface. At least one payment collector having an associated payment mechanism attract light provided in close relative proximity thereto also may be provided.

The at least one processor may coordinate lighting events in dependence on a script (e.g., an XML-based script), and the script may include indications as to what lights are to be activated, when the lights are to be activated, and what color is to be displayed.

At least some instances of media may have themes associated therewith, with the themes being recognizable by the at least one processor such that, when played, the at least one processor creates lighting events in connection with the corresponding theme. Similarly, the jukebox device may be configured to display advertisements, with at least some of the advertisements having themes associated therewith, and with the themes being recognizable by the at least one processor such that, when displayed, the at least one processor creates lighting events in connection with the corresponding theme.

A single touch sensitive substrate may be disposed over both the at least one display device and the array of LED elements. The at least one processor may be configured to monitor for inputs to the touch sensitive substrate and selectively activate LED elements in the array of LED elements in response to a detected touch to an overlying area.

The at least one processor may be configured to coordinate lighting events having consistent colors produced by different light sources by offsetting the color values to be generated to account for differences in the light generated by the light sources and/or in response to the surrounding environment. In certain exemplary embodiments, the jukebox device may further comprise a camera. The at least one processor may be configured to use data from the camera to determine ambient conditions.

Methods of making and/or using such jukebox devices also may be provided, as may non-transitory computer readable storage mediums tangibly storing instructions for using such jukebox devices/providing such user interfaces. Jukebox systems including plural jukebox devices, for example, also may be provided in different exemplary embodiments.

In certain exemplary embodiments, karaoke features may be provided. Karaoke features may be enabled, for example, by linking songs to lyrical scripts. Such scripts may have lyrics associated with times in a song and optionally may further include animation information (e.g., kinetic text) for highlighting text as it is to be sung, removing text once it has been sung, introducing new text that it about to be sung, etc.

In certain exemplary embodiments, the jukebox may receive live streams. For instance, in certain exemplary embodiments, a DJ may simultaneously stream music to multiple jukeboxes at multiple locations. Similarly, a DJ in a location may tie into a venue's jukebox system and turn some or all jukeboxes in the venue into a speaker system.

It will be appreciated that the flowcharts and use cases presented above are provided by way of example and without limitation. Other flowcharts and use cases are possible in connection with different exemplary embodiments of this invention.

The metadata and/or tags associated with the songs may be provided by a commercial service, by the jukebox system, users, and/or some combination of these and/or other providers. Some such data may be determined automatically (e.g., through Fourier analysis and/or other transforms). For music, metadata and/or tags may be representative of information including, for example, artist name, album name, song name, genre/style (which may be hierarchical in some instances), Billboard position (when applicable), release year, popularity based on network plays information, lyrics, tempo, beats per minute (BPM), mood, instrumental characteristics (e.g., strident electric guitars, booming drums, twangy guitar, etc.), vocal characteristics (e.g., aggressive, prominent vocal harmonies, screaming, etc.), intensity characteristics (e.g., high energy, moderate, laid back, etc.) timbre (e.g., bright, dark, rich, etc.), and/or the like. Potential suppliers of this and/or other information include, for example, AMG, BMAT, DoubleV3, EchoNest MixZing, Gracenote, Mufin MusicIP, Music Box, Music Genome Project, and Syntonetic.

Certain exemplary embodiments relate to an entertainment center comprising a computer capable of communicating with networks, wherein said computer is further connected to at least one display through standard analog, digital, or network-addressable displays, said computer being operable to interact with a remote device connected to one of said networks in communication with said computer, said remote device being operable to accept a code and transmit said code to said computer, and wherein said computer can validate against a database or against an algorithm the validity of said code and, upon positive validation, said computer is configured to allocate a monetary value or a credit value to said remote device. The remote device may be operable to browse content contained on said computer and said remote device may be further operable to select and pay for said content using said monetary or said credit value, said computer may be operable to reduce said monetary or said credit value upon a selection by said remote device. The code may instead or in addition be sent to the remote device and entered on the computer.

Certain exemplary embodiments relate to an out-of-home entertainment center coupled with at least one Internet-based messaging system and/or a social networking site and coupled with at least one remote device, said remote device being connected to the out of home entertainment center by a wired or wireless local area network or through the Internet, wherein the use of some of the entertainment center services by said remote device causes said entertainment center to send messages to said at least one Internet-based messaging system. Connecting the system through the Internet may require a user to input a code to the remote device that uniquely identifies the entertainment center.

Some of the handheld devices referred to herein may be those described, for example, in application Ser. No. 11/902,790, the entire contents of which is incorporated herein by reference.

The present disclosure has used certain terms that should not be interpreted as limiting the invention to a particular embodiment, hardware components and configurations, software configurations, etc. For example, many features and examples have been described in relation to their existence within a bar, pub, or other environment. However, it will be appreciated that the features present in the exemplary embodiments of the present invention are adaptable for use in any location where a jukebox (or multiple jukeboxes) may be located. Similarly, while certain features and functions are described with reference to usage by "users," "owners," "operators," "patrons," etc., it will be appreciated that these terms are generic and may, in most cases, be used interchangeably depending on the embodiment chosen and the feature employed. For example, while it may be advantageous to limit the initial song selection to owners and/or operators, in certain exemplary embodiments, patrons may play a role in the initial song selection. It will be appreciated that the term "display" includes, for example, monitors connected to computers directly or remotely, or embedded ICs such as IP TV technology. Displays may be network addressable. Also, standard digital signs (LED based) also may be considered displays and/or may be provided as network addressable displays.

Although certain exemplary embodiments have been described in connection with out-of-home locations, it will be appreciated that the techniques described herein may be adapted for use in an in-home or personal jukebox.

Still further, particular hardware combinations and configurations are disclosed which represent only one way which the embodiments may be constructed. Central servers may, in some exemplary embodiments, be comprised of one or more servers acting together or separately to coherently provide the full range of services necessary to enable a functioning jukebox. For example, a cluster of servers may comprise a virtual central server, with one server providing media, another tracking membership, still another processing licensing, etc.

Similarly, the local servers described herein may be incorporated into the jukeboxes. For example, the local servers may appear to function independently, even though they exist as part (e.g. partition) of an integrated mass storage device within the jukebox. Indeed, as hard disks become larger and less expensive, they may preferably serve the functions of local servers.

Also, although the term "song" has been used sometimes in the above-description, this term is not intended to be limiting to the scope of the invention, and any instance or instances of media (e.g., song, video, song/video combination, data, information etc.) can be used in any embodiment herein and still fall within the intended scope of the invention.

Lastly, it will be appreciated that the screen shots and software arrangements presented herein are only one exemplary method for organizing and displaying the features disclosed herein. Other configurations are possible and are therefore contemplated herein.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A jukebox device, comprising:
    a first display device and a second display device arranged with a separation between them on a front surface of the jukebox device, the second display device having a larger display area than the first display device and arranged below the first display device;
    a generally elongate array of LED elements provided above at least one of the display devices;
    a backwash light arranged at a rear portion of the jukebox device and configured to generate light behind the jukebox device;
    a rim light disposed around a periphery of the jukebox device so as to encompass at least on three sides the display devices;
    a substantially circular activation switch or button arranged below the second display device;
    a radio frequency identifier reader and a near field communication attract light arranged below the second display device on the front surface;
    a non-transitory computer readable storage medium storing a plurality of instances of media available for playback on or via the jukebox device; and
    at least one processor configured to provide a user interface and further configured to:
        control the jukebox device to, simultaneously and in accordance with a display theme associated with an advertising event, display a first portion of the advertising event on the first display device and a second portion of the advertising event on the second display device;
        upon receiving an indication from the substantially circular activation switch or button in response to an item displayed on the second display device, control the jukebox device to change display events displayed on the second display device to include a display event representing a song that is currently being played on the jukebox while continuing to display the first portion of the advertising event on the first display device and the second portion of the advertising event on the second display device in accordance with the display theme.

2. The jukebox device of claim 1, further comprising at least one payment collector having an associated payment mechanism attract light provided in close relative proximity thereto.

3. The jukebox device of claim 1, wherein the at least one processor coordinates lighting events in dependence on a script.

4. The jukebox device of claim 3, wherein the script is an XML-based script.

5. The jukebox device of claim 3, wherein the script includes indications as to what lights are to be activated, when the lights are to be activated, and what color is to be displayed.

6. The jukebox device of claim 1, wherein at least some instances of media have themes associated therewith, the themes being recognizable by the jukebox device such that, when played, the jukebox device is configured to create lighting events in connection with the corresponding theme.

7. The jukebox device of claim 1, wherein the jukebox device is configured to display advertisements, at least some of the advertisements having themes associated therewith, the themes being recognizable by the jukebox device such that, when displayed, the jukebox device is configured to create lighting events in connection with the corresponding theme.

8. The jukebox device of claim 1, further comprising a single touch sensitive substrate disposed over both the at least one display device and the array of LED elements.

9. The jukebox device of claim 8, wherein the at least one processor is configured to monitor for inputs to the touch sensitive substrate and selectively activate LED elements in the array of LED elements in response to a detected touch to an overlying area.

10. The jukebox device of claim 1, wherein the at least one processor is configured to coordinate lighting events having consistent colors produced by different light sources by offsetting the color values to be generated to account for differences in the light generated by the light sources and/or in response to the surrounding environment.

11. The jukebox device of claim 10, further comprising a camera.

12. The jukebox device of claim 11, wherein the at least one processor is configured to use data from the camera to determine ambient conditions.

13. A method of making a jukebox device, the method comprising:
providing a first display device and a second display device arranged with a separation between them on a front surface of the jukebox device, the second display device having a larger display area than the first display device and being arranged below the first display device;
providing a generally elongate array of LED elements provided above at least one of the display devices;
providing a backwash light arranged at a rear portion of the jukebox device and configured to generate light behind the jukebox device;
providing a rim light disposed around a periphery of the jukebox device so as to encompass at least on three sides the display devices;
providing a substantially circular activation switch or button arranged below the second display device;
providing a radio frequency identifier reader and a near field communication attract light arranged below the second display device on the front surface;
providing a plurality of instances of media available for playback on or via the jukebox device; and
providing at least one processor configured to provide a user interface and further configured to:
control the jukebox device to, simultaneously and in accordance with a display theme associated with an advertising event, display a first portion of the advertising event on the first display device and a second portion of the advertising event on the second display device;
upon receiving an indication from the substantially circular activation switch or button in response to an item displayed on the second display device, control the jukebox device to change display events displayed on the second display device to include a display event representing a song that is currently being played on the jukebox while continuing to display the first portion of the advertising event on the first display device and the second portion of the advertising event on the second display device in accordance with the display theme.

14. A method of operating a jukebox device, the method comprising:
enabling a plurality of instances of media to be played back on or via the jukebox device;
having installed in and/or on the jukebox device:
a first display device and a second display device arranged with a separation between them on a front surface of the jukebox, the second display device having a larger display area than the first display device and arranged below the first display device,
a generally elongate array of LED elements provided above at least one of the display devices,
a backwash light arranged at a rear portion of the jukebox device and configured to generate light behind the jukebox device,
a rim light disposed around a periphery of the jukebox device so as to encompass at least on three sides the display devices,
a radio frequency identifier reader and a near field communication attract light arranged below the second display device on the front surface;
a substantially circular activation switch or button arranged below the second display device, and
at least one processor configured to:
provide a user interface;
control the jukebox device to, simultaneously and in accordance with a display theme associated with an advertising event, display a first portion of the advertising event on the first display device and a second portion of the advertising event on the second display device; and
upon receiving an indication from the substantially circular activation switch or button in response to an item displayed on the second display device, change display events displayed on the second display device to include a display event representing a song that is currently being played on the jukebox while continuing to display the first portion of the advertising event on the first display device and the second portion of the advertising event on the second display device in accordance with the display theme.

15. The method of claim 14, wherein the jukebox device further comprises at least one payment collector having an associated payment mechanism attract light provided in close relative proximity thereto.

16. The method of claim 14, further comprising coordinating lighting events in dependence on a script.

17. The method of claim 16, wherein the script is an XML-based script.

18. The method of claim 16, wherein the script includes indications as to what lights are to be activated, when the lights are to be activated, and what color is to be displayed.

19. The method of claim 14, wherein at least some instances of media have themes associated therewith, the themes being recognizable by the jukebox device such that, when played, the jukebox device is configured to create lighting events in connection with the corresponding theme.

20. The method of claim 14, further comprising displaying advertisements, at least some of the advertisements having themes associated therewith, the themes being recognizable by the jukebox device such that, when displayed, the jukebox device is configured to create lighting events in connection with the corresponding theme.

21. The method of claim 14, wherein the jukebox device further comprises a single touch sensitive substrate disposed over both the at least one display device and the array of LED elements.

22. The method of claim 21, further comprising monitoring for inputs to the touch sensitive substrate and selectively activating LED elements in the array of LED elements in response to a detected touch to an overlying area.

23. The method of claim 14, further comprising coordinating lighting events having consistent colors produced by different light sources by offsetting the color values to be generated to account for differences in the light generated by the light sources and/or in response to the surrounding environment.

24. The method of claim 23, wherein the jukebox device further comprises a camera.

25. The method of claim 24, further comprising using data from the camera to determine ambient conditions.

* * * * *